US007965846B2

(12) United States Patent
Masuhiro et al.

(10) Patent No.: US 7,965,846 B2
(45) Date of Patent: Jun. 21, 2011

(54) CLIENT DISTRIBUTED SYSTEM AND INTER-CLIENT RTP ENCRYPTING METHOD

(75) Inventors: Mao Masuhiro, Tokyo (JP); Yasuhiro Watanabe, Tokyo (JP)

(73) Assignee: NEC Infrontia Corporation, Tokyo (JP)

( * ) Notice: Subject to any disclaimer, the term of this patent is extended or adjusted under 35 U.S.C. 154(b) by 886 days.

(21) Appl. No.: 11/781,705

(22) Filed: Jul. 23, 2007

(65) Prior Publication Data

US 2008/0025516 A1 Jan. 31, 2008

(30) Foreign Application Priority Data

Jul. 28, 2006 (JP) ................................. 2006-206689

(51) Int. Cl.
*H04L 9/08* (2006.01)
(52) U.S. Cl. ....................................................... 380/279
(58) Field of Classification Search .................. 380/279
See application file for complete search history.

(56) References Cited

U.S. PATENT DOCUMENTS

| 7,174,452 | B2 * | 2/2007 | Carr ............................... 713/151 |
| 7,219,223 | B1 | 5/2007 | Bacchus |
| 7,266,683 | B1 * | 9/2007 | Nag ............................... 713/154 |
| 7,483,532 | B2 * | 1/2009 | Alkove et al. .................... 380/37 |
| 7,577,258 | B2 * | 8/2009 | Wiseman et al. ............. 380/281 |
| 7,693,278 | B2 * | 4/2010 | Hiramatsu et al. ............. 380/37 |
| 2002/0141585 | A1 | 10/2002 | Carr |
| 2003/0149892 | A1 | 8/2003 | Robinson |
| 2006/0010321 | A1 | 1/2006 | Nakamura et al. |
| 2006/0276209 | A1 | 12/2006 | Neves et al. |
| 2007/0157026 | A1 | 7/2007 | Zimmermann |

FOREIGN PATENT DOCUMENTS

| EP | 1 139 198 A2 | 10/2001 |
| EP | 1646238 A1 | 4/2006 |
| JP | 2002-64479 A | 2/2002 |
| JP | 2003-178352 A | 6/2003 |
| JP | 2004-192134 A | 7/2004 |
| JP | 2005-045741 A | 2/2005 |
| JP | 2005-295468 A | 10/2005 |

(Continued)

OTHER PUBLICATIONS

"Introduction to encrypting Technology—Alice in Secret Country, Chapter 14, SSL/TLS" (Hiroshi Yuuki, Soft Bank Publishing, Sep. 27, 2003, pp. 346-367).
MIKEY: Multimedia Internet KEYing, J. Arkko, et al., The Internet Society (RFC3830, Aug. 2004).
ZRTP (Extensions to RTP for Diffie-Hellman Key Agreement for SRTP), P. Zimmermann, et al., The Internet Society, Mar. 2006.

(Continued)

*Primary Examiner* — Kambiz Zand
*Assistant Examiner* — Amare Tabor
(74) *Attorney, Agent, or Firm* — Sughrue Mion, PLLC

(57) ABSTRACT

When an SIP interface unit of a server apparatus receives an SIP message for call connection from a client apparatus and an SIP message analyzing unit can confirm that the SIP message is normal, a call controller recognizes that an RTP communication is carried out between the client apparatus and another client apparatus and instructs an encrypting capability management unit to determine RTP encrypting information which is used between the client apparatuses. The encrypting capability management unit determines the RTP encrypting information between these client apparatuses based on the instruction. With this arrangement, there can be provided a client-server distributed system that can realize an encrypting security function without requiring a certificate authentification function at a low cost in order to deliver an encrypting key as well as without necessity of holding or managing a certificate and preparing an authenticating server in a system.

42 Claims, 33 Drawing Sheets

FOREIGN PATENT DOCUMENTS

| | | |
|---|---|---|
| JP | 2005-303485 A | 10/2005 |
| JP | 2005-346556 A | 12/2005 |
| JP | 2006-32997 A | 2/2006 |
| JP | 2006-054876 A | 2/2006 |

OTHER PUBLICATIONS

"The Secure Real-time Transport Protocol (SRTP)", Baugher, et al., The Internet Society, (RFC3711), Mar. 2004.

* cited by examiner

FIG.4

SERVER SIDE ENCRYPTING INFORMATION TABLE 20

| RTP NO. OF CLIENT | 1 | 2 | ... | n | ... | x |
|---|---|---|---|---|---|---|
| PRESENCE OR ABSENCE OF ENCRYPTING | PRESENT | PRESENT | ... | ABSENT | ... | PRESENT |
| ENCRYPTING RULE LIST | 1:xxx<br>2:yyy<br>... | 1:yyy<br>2:zzz<br>... | ... | 1:xxx<br>2:yyy<br>... | ... | 1:yyy<br>... |
| ENCRYPTING RULE | xxx | yyy | ... | ... | ... | ... |
| ENCRYPTING KEY | ... | ... | ... | ... | ... | ... |
| ... | | | | | | |

FIG.5

CLIENT SIDE ENCRYPTING INFORMATION TABLE 40

| ENCRYPTING RULE LIST | 1:xxx<br>2:yyy<br>: | | | | | |
|---|---|---|---|---|---|---|
| SESSION NO. | 1 | 2 | ... | n | ... | x |
| PRESENCE OR ABSENCE OF ENCRYPTING | PRESENT | ABSENT | ... | PRESENT | ... | ABSENT |
| ENCRYPTING RULE | xxx | ... | ... | yyy | ... | ... |
| ENCRYPTING KEY | ... | ... | ... | ... | ... | ... |
| ... | | | | | | |

FIG.14

SERVER SIDE ENCRYPTING INFORMATION TABLE 20

| RTP NO. OF CLIENT | | 1 | 2 | ... | n | ... | x |
|---|---|---|---|---|---|---|---|
| SIP MESSAGE ENCRYPTING INFORMATION | ENCRYPTING RULE | xxx | yyy | ... | xxx | ... | yyy |
| | ENCRYPTING KEY | ... | ... | ... | ... | ... | ... |
| | PRESENCE OR ABSENCE OF ENCRYPTING | PRESENT | PRESENT | ... | ABSENT | ... | PRESENT |
| RTP ENCRYPTING INFORMATION | ENCRYPTING RULE LIST | 1:xxx 2:yyy ... | 1:yyy 2:zzz ... | ... | 1:xxx 2:yyy ... | ... | 1:yyy ... |
| | ENCRYPTING RULE | xxx | yyy | ... | ... | ... | ... |
| | ENCRYPTING KEY | ... | ... | ... | ... | ... | ... |
| ... | | | | | | | |

FIG.15

CLIENT SIDE ENCRYPTING INFORMATION TABLE 40

| | | | | | | | | |
|---|---|---|---|---|---|---|---|---|
| SIP MESSAGE ENCRYPTING INFORMATION | ENCRYPTING RULE LIST | 1:xxx 2:yyy ... | | | | | | |
| | ENCRYPTING RULE | xxx | | | | | | |
| | ENCRYPTING KEY | ... | | | | | | |
| RTP ENCRYPTING INFORMATION | ENCRYPTING RULE LIST | 1:xxx 2:yyy ... | | | | | | |
| | SESSION NO. | 1 | 2 | ... | n | ... | x | |
| | PRESENCE OR ABSENCE OF ENCRYPTING | PRESENT | ABSENT | ... | PRESENT | ... | ABSENT | |
| | ENCRYPTING RULE | xxx | ... | ... | yyy | ... | ... | |
| | ENCRYPTING KEY | ... | ... | ... | ... | ... | ... | |
| | ... | | | | | | | |

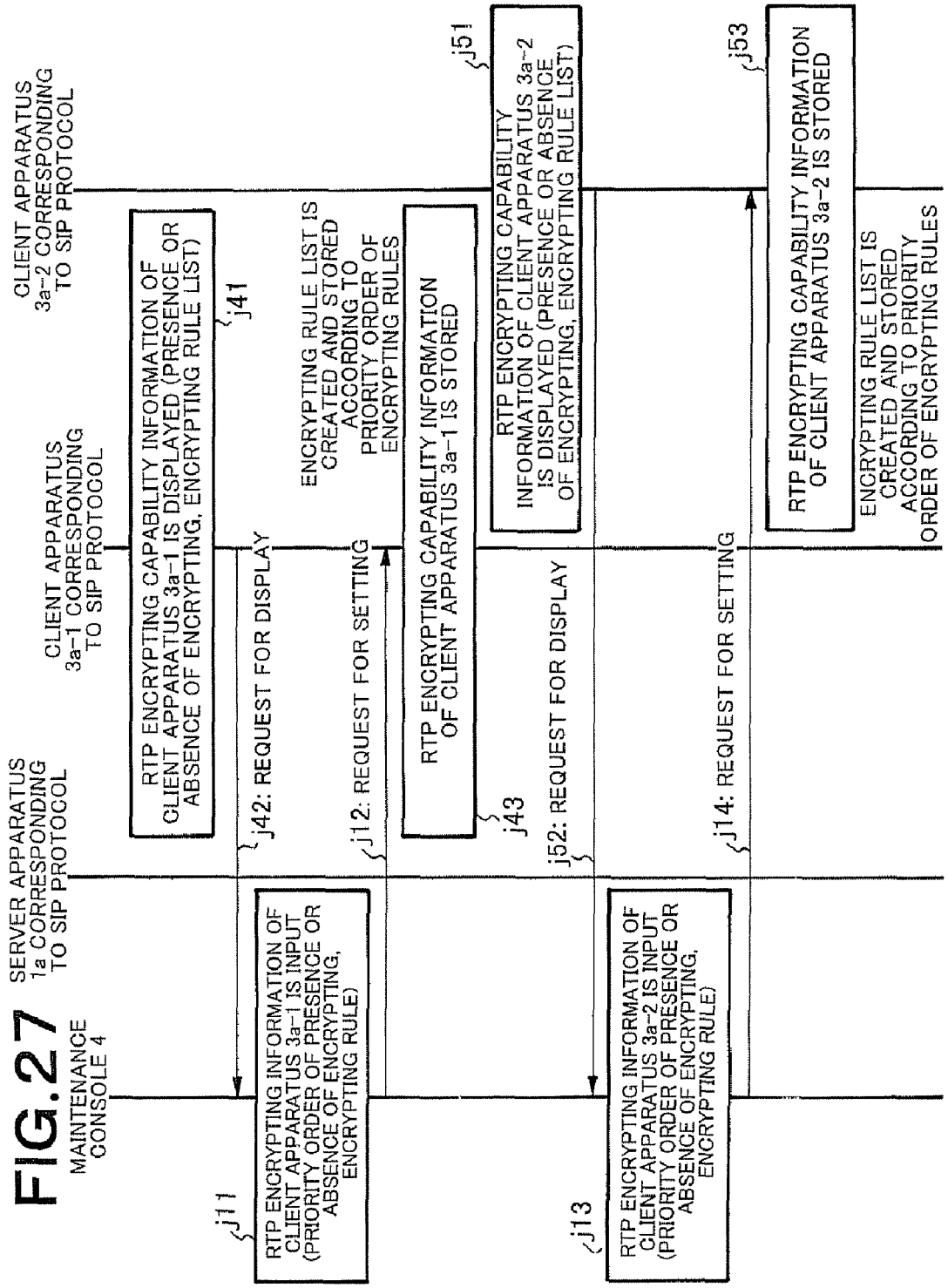

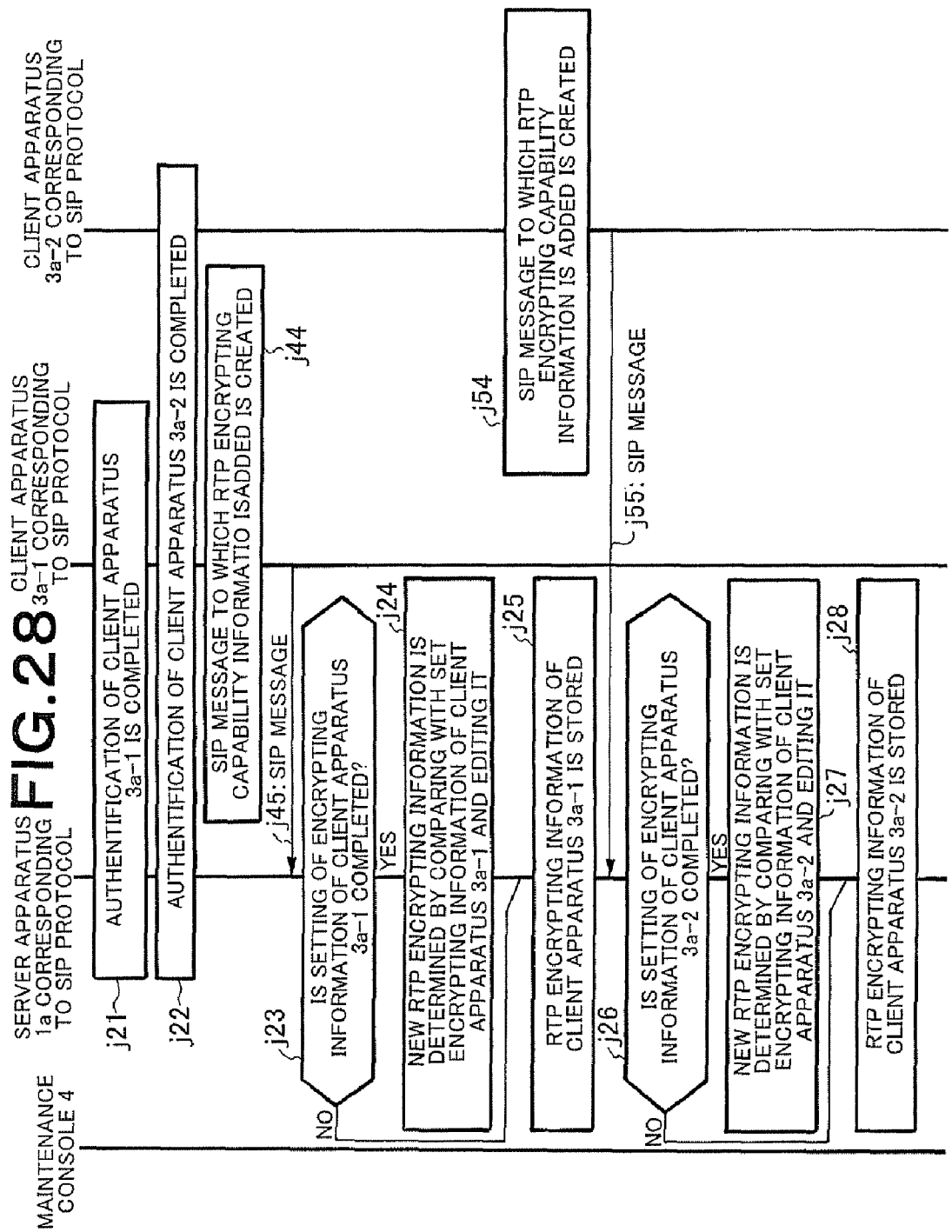

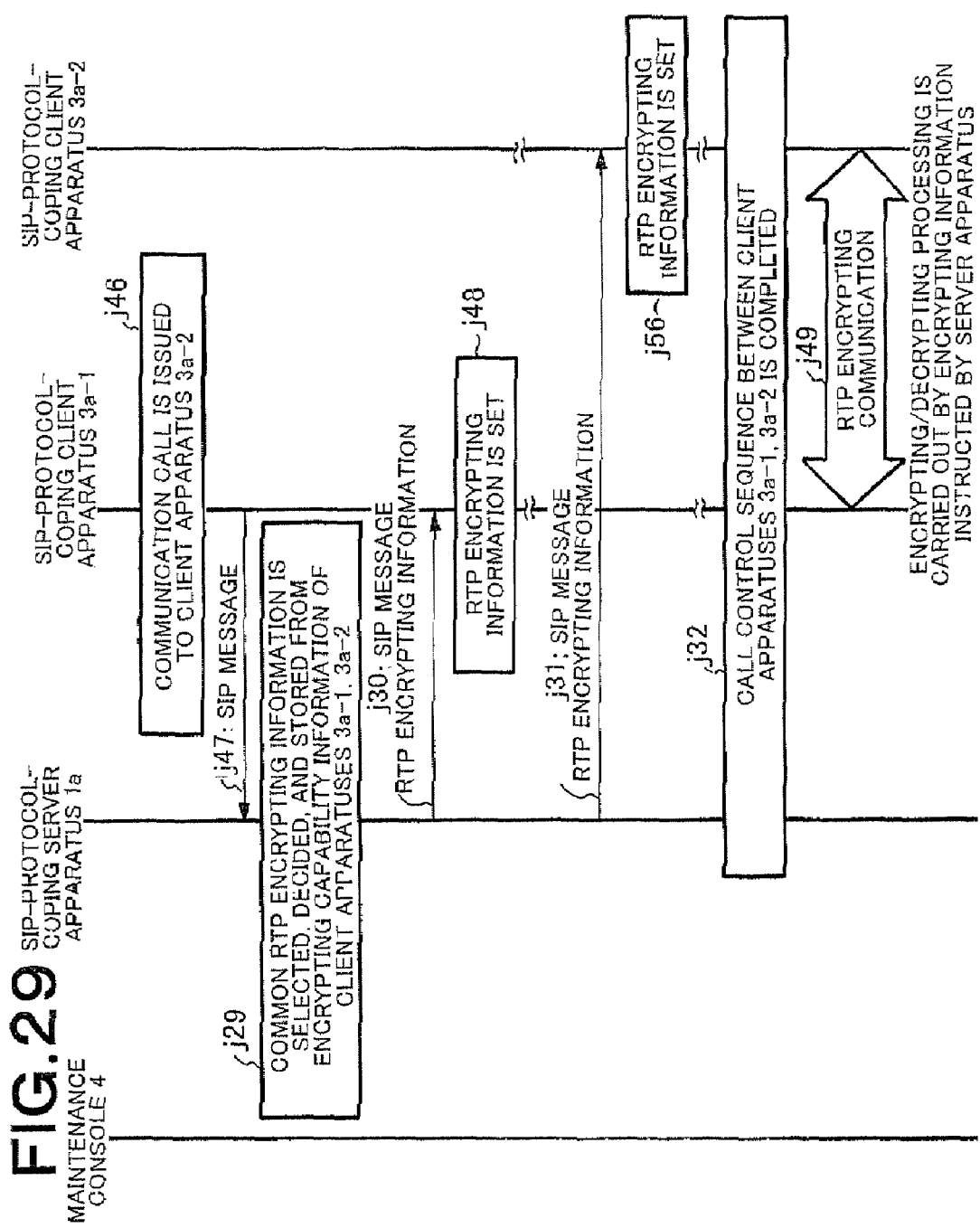

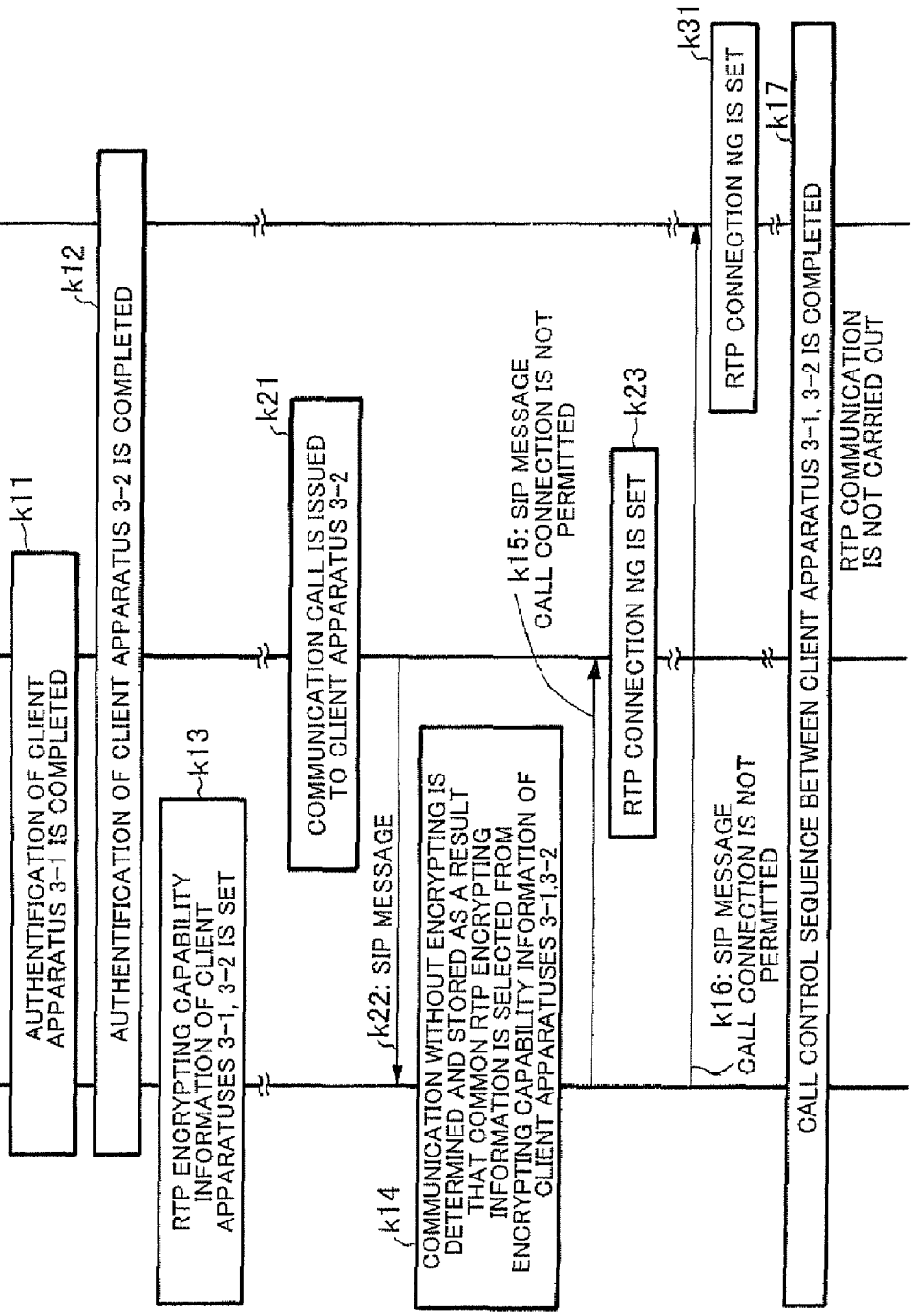

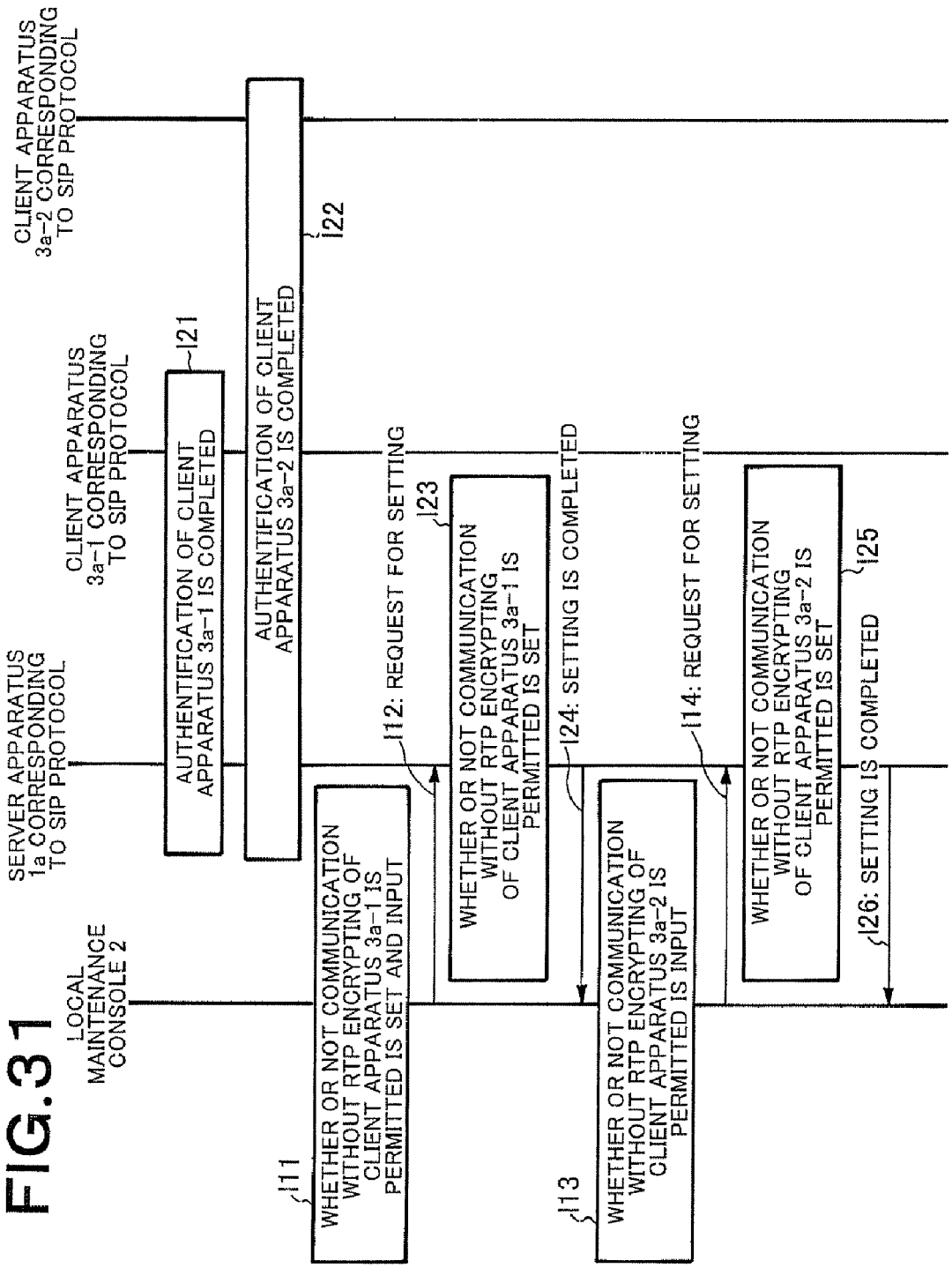

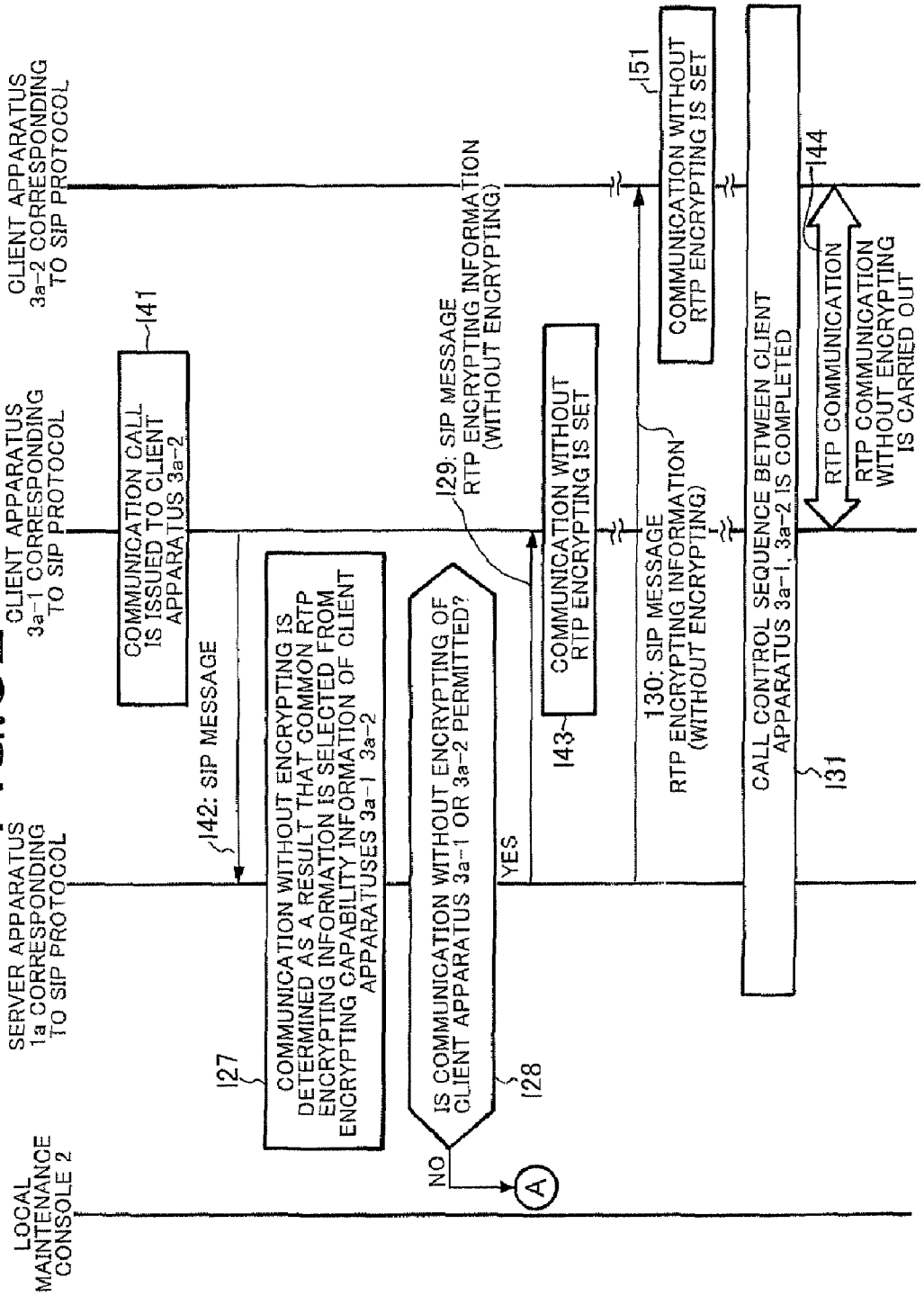

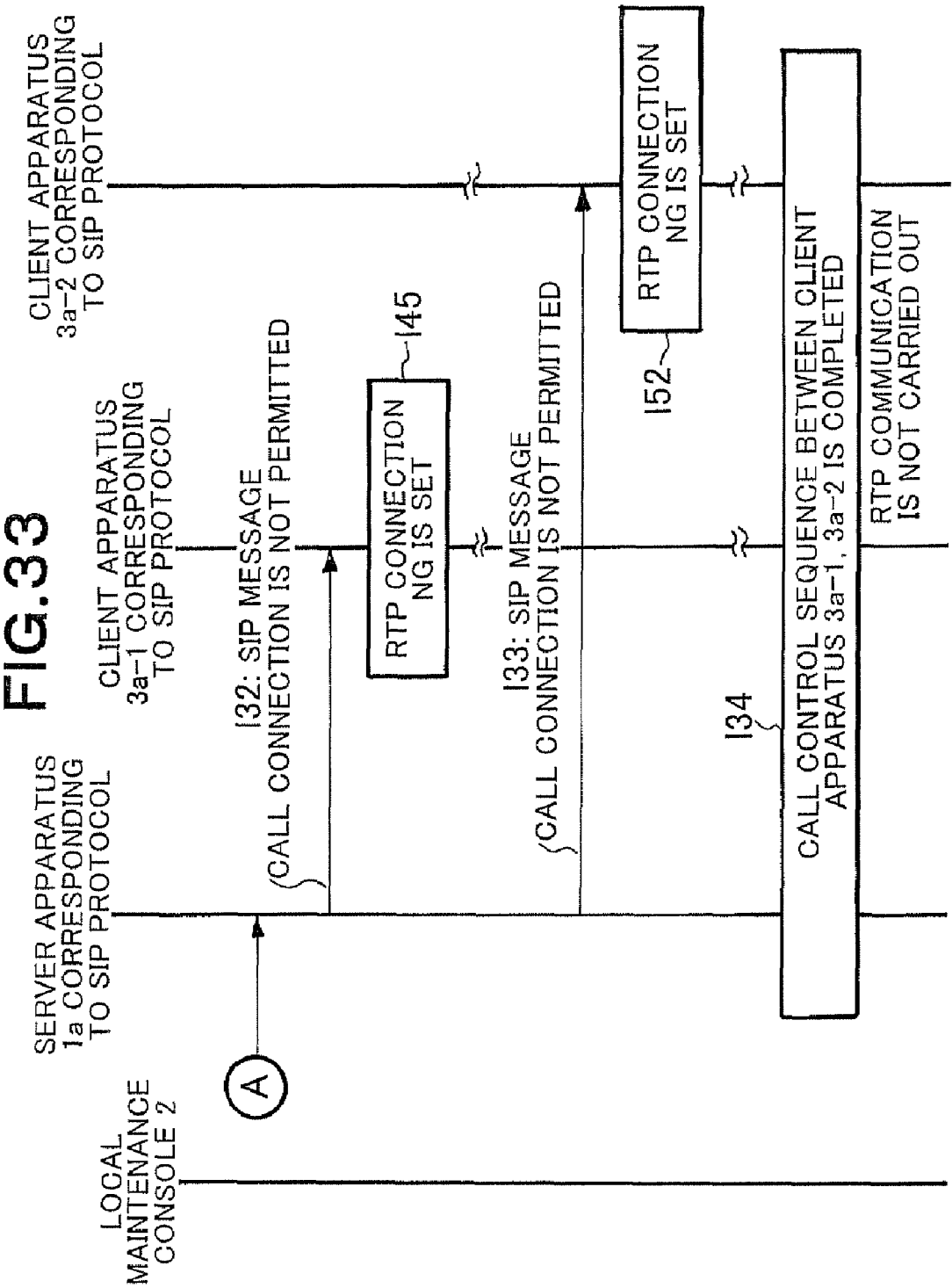

CLIENT DISTRIBUTED SYSTEM AND INTER-CLIENT RTP ENCRYPTING METHOD

This application is based upon and claims the benefit of priority from Japanese patent application No. 2006-206689, filed on Jul. 28, 2006, the disclosure of which is incorporated herein in its entirety by reference.

BACKGROUND OF THE INVENTION

1. Field of the Invention

The present invention relates to a client-server distributed system, a server apparatus, client apparatus, and an inter-client RTP encrypting method used for them, and more particularly to an inter-client RTP (Real-time Transport Protocol) encrypting method in a client-server type distributed system corresponding to SIP (Session Initiation Protocol).

2. Description of the Related Art

Since a client-server type distributed system corresponding to SIP protocol is a system connected on LAN (Local Area Network), it is necessary to ensure security, and an inter-client RTP packet encrypting system is defined as a countermeasure to ensure the security.

SSL/TLS (Secure Socket Layer/Transport Layer Security) and the like are defined as an ordinary encrypting system (refer to, for example, "Introduction to encrypting Technology—Alice in Secret Country, Chapter 14, SSL/TLS" (Hiroshi Yuuki, Soft Bank Publishing, Sep. 27, 2003, pp 346-367), and SRTP (Secure Real-time Transport Protocol) is defined as an RTP encrypting system (refer to, for example, "The Secure Real-time Transport Protocol (SRTP)" (RFC3711), March 2004)).

Further, MIKEY (Multimedia Internet KEYing) (refer to, for example, "MIKEY: Multimedia Internet KEYing" (RFC3830, August 2004)), ZRTP (Extensions to RTP for Diffie-Hellman Key Agreement for SRTP) (refer to, for example, "ZRTP: Extensions to RTP for Diffie-Hellman Key Agreement for SRTP draft-zimmermann-avt-zrtp-01" (AVT WG Internet-Draft Expirres: Sep. 6, 2006) (http://www.ietf.org/internet-drafts/draft-zimmermann-avt-zrtp-01)) and the like are defined as a procedure of encrypting key delivery and the like.

Since certificates are required to each other in the SSL/TLS system, certificates must be previously delivered to client apparatuses. Further, an authentification server must be prepared in the system, and a certificate must be authenticated to deliver an encrypting key each time a call is issued.

Since TCP (Transmission Control Protocol) is used as the protocol of Layer 4, the protocol is not optimum in a VoIP (Voiceover Internet Protocol) communication in which a real time property is important, and thus UDP (User Datagram Protocol) is generally employed as a protocol in the Volp communication.

In a MIKEY system which is defined as an ordinary key delivery system in SRTP, Pre-shared Key is set or a key is delivered by providing an encrypting by a public key each time communications are combined. When Pre-shared Key is used, a key must be previously delivered to each client apparatus, and when the public key is used, authentification using digital signature is necessary.

In this case, a certificate must be also previously delivered to client apparatuses. Further, an authentification server must be prepared, and a certificate must be authenticated to deliver an encrypting key each time a call is issued. Since it is time-consuming to process a public encrypting key, the public encrypting key is not optimum in the VoIP communication in which the real time property is important.

In a ZRTP system, since authentification must be carried out using Short Authentication string (SAS) having End to End, it is necessary to previously deliver SAS as well as to authenticate a certificate by preparing an authentification server to deliver an encrypting key each time a call is issued. However, since it is redundant to carry out authentification each time the call is issued, the ZRTP system is not optimum in the Volp communication in which the real time property is important.

Further, a key is managed using an RTP packet in perfect P2P. An encrypting is started after an RTP communication starts and the encrypting is set in an RTP communication without encrypting, which is disadvantageous in security.

When the SSL/TLS system is used in the related inter-client RTP encrypting method described above, since authentification must be carried out by a certificate each time a call is issued in order to notify an encrypting key, the certificate must be delivered to client apparatus, and thus a certificate management function is required, from which a problem arises in that the man-hour of a maintenance person increases.

Further, in the MIKEY system defined by SRTP, Pre-shared Key must be previously delivered when a key is delivered by Pre-shared Key. Thus, when the public key is used, since authentification by a digital signature is required, a certificate must be previously delivered, from which a problem arises in that the man-hour of a maintenance person increases.

In ZRTP, since SAS must be previously delivered to carry out authentification using SAS likewise, which is disadvantageous in an increase of the man-hour of a maintenance person. Further, since TCP is used as the protocol of Layer 4, a problem arises in that it is difficult to secure the real time property in the VoIP communication.

Therefore, the related technologies have problems in that a high cost is required to realize an encrypting security function because the man-hour of the maintenance person is necessary to manage the certificate, the authentification server is necessary to carry out authentification each time a call is issued, and the like. Further, the related technologies are disadvantageous in that it is difficult to secure the real time property when they are applied to ensure security to the VoIP communication.

SUMMARY OF THE INVENTION

Accordingly, an object of the present invention is to overcome the above problems and to provide a client-server distributed system, a server apparatus, client apparatus, and an inter-client RTP encrypting method used for them which can realize an encrypting security function at a low cost without requiring a certificate authenticating function to deliver an encrypting key and without the necessity of holding or managing a certificate and preparing an authentification server in the system.

According to the sent invention, there is provided a client-server type distributed system corresponding to the SIP (Session Initiation Protocol) connected to The Internet/intranet/LAN (Local Area Network), wherein when authentification between SIP-protocol-coping client apparatuses and an SIP-protocol-coping server apparatus is finished, and an RTP (Real-time Transport Protocol) connection between the client apparatuses is an SIP call connection through the server apparatus, the server apparatus comprises: means for setting at least one type of RTP encrypting information used in an RTP packet transmission/reception to each unit of the client apparatuses and managing it as the encrypting capability information of the client apparatuses; means for determining one type of RTP encrypting information used between the client apparatuses each time an RTP communication occurs between the client apparatuses; and means for notifying the client apparatuses of the RTP encrypting information, and each of the client apparatuses comprises: means for receiving and setting RTP encrypting information used in an RTP packet transmission/reception to other client apparatus; and a function for encrypting an RTP packet and transmitting it to confronting client apparatuses in the P2P (Peer-to-Peer) between the client apparatuses in the RTP communication according to the RTP encrypting information received from the server apparatus as well as for receiving the encrypted RTP packet from the confronting client apparatuses and decrypting it.

The server apparatus according to the present invention may include the means and the functions of the client-server type distributed system.

Each of the client apparatuses according to the present invention may include the means and the function of the client-server type distributed system.

According to the present invention, there is provided an inter-client RTP (Real-time Transport Protocol) encrypting method used for a client-server type distributed system corresponding to the SIP (Session Initiation Protocol) connected to the Internet/intranet/LAN (Local Area Network), wherein when authentification between SIP-protocol-coping client apparatuses and an SIP-protocol-coping server apparatus is finished, and an RTP (Real-time Transport Protocol) connection between the client apparatuses is an SIP call connection through the server apparatus, the server apparatus carries out: a processing for setting at least one type of RTP encrypting information used in an RTP packet transmission/reception to each unit of the client apparatuses and managing it as the encrypting capability information of the client apparatuses; a processing for determining one type of RTP encrypting information used between the client apparatuses each time an RTP communication occurs between the client apparatuses; and means for notifying the client apparatuses of the RTP encrypting information, and each of the client apparatuses carries out: a processing for receiving and setting RTP encrypting information used in an RTP packet transmission/reception to other client apparatus; and a processing for encrypting an RTP packet and transmitting it to confronting client apparatuses in the P2P (Peer-to-Peer) between the client apparatuses in the RTP communication according to the RTP encrypting information received from the server apparatus as well as for receiving the encrypted RTP packet from the confronting client apparatuses and decrypting it.

That is, the client-server distributed system of the present invention may be a client-server type distributed system corresponding to SIP (Session Initiation Protocol) protocol connected to the Internet-intranet-LAN (Local Area Network).

In the client-server distributed system of the present invention, authentification may be finished between the client apparatuses and the server apparatus that correspond to SIP protocol, and an RTP (Real-time Transport Protocol) connection between the client apparatuses is in an SIP call connection through the server apparatus.

In the client-server distributed system of the present invention, the server apparatus may comprise a means for setting one type or a plurality of types of RTP encrypting information (presence or absence of encrypting, an encrypting rule), which is used when an RTP packet is transmitted and received between the client apparatuses and input from the outside, to each unit of the client apparatuses, a means for determining one type of RTP encrypting information used between the client apparatuses each time an RTP communication is carried out between the client apparatuses, a means for creating an encrypting key and setting it as the RTP encrypting information, and a means for notifying the client apparatuses of the RTP encrypting information including the encrypting key.

Further, in the client-server distributed system of the present invention, the server apparatus comprises a means for receiving and setting RTP encrypting capability information from the client apparatuses, and a means for determining the RTP encrypting information between the client apparatuses each time an RTP communication is carried out between the client apparatuses from the RTP encrypting information and the RTP encrypting capability information and notifying both confronting client apparatuses of it.

In the client-server distributed system of the present invention, the server apparatus comprises a means for changing the RTP encrypting information between the client apparatuses each time a call is issued, at an arbitrary timing, or periodically, and a means operated by different RTP encrypting information set each time client apparatuses to be connected is combined or at each timing of communication.

Each client apparatus comprises a means for receiving RTP encrypting information, which is used when it transmits and receives an RTP packet to and from other client apparatus, from the server apparatus and setting it, and a function for encrypting and transmitting an RTP packet to a confronting client apparatus in P2P (Peer to Peer) between client apparatuses according to the RTP encrypting information received from the server apparatus when an RTP communication is carried out and receiving the encrypted RTP packet from the confronting client apparatus and decrypting it.

With this arrangement, the client-server distributed system of the present invention can provide an encrypting security function at a low cost without necessity of carrying out authentification each time a call is issued in order to deliver an encrypting key, preparing an authentification server in the system, and previously delivering information for authentification such as a certificate and the like.

Further, in the client-server distributed system of the present invention, it is possible to realize an encrypting security function without sacrificing a real time property which is important to a VoIP (Voice over Internet Protocol) communication by using UDP (User Datagram Protocol) as the protocol of Layer 4.

In the client-server distributed system of the present invention, the RTP encrypting information (presence or absence of encrypting-an encrypting rule-encrypting key) can be updated from the server apparatus, different RTP encrypting information can be set to each apparatus, and the RTP encrypting information can be updated each time a call is issued, arbitrarily, or periodically, thereby an encrypting security function can be enhanced by preventing an encrypting state from being presumed.

Further, in the client-server distributed system of the present invention, an encrypting capability (presence or absence of encrypting, the priority order of usable encrypting rules) can be notified from the client apparatuses to the server apparatus, and the RTP encrypting of the highest level whose combination is possible can be set regardless of the difference of the RTP encrypting capabilities of the apparatuses, thereby the encrypting security function can be enhanced.

The present invention is advantageous in that it can realize the encrypting security function at a low cost by making it unnecessary to provide a certificate authenticating function for delivering an encrypting key, to hold or manage a certificate, and to prepare an authentification server in the system.

BRIEF DESCRIPTION OF THE DRAWINGS

FIG. 4 is a view showing an example of arrangement of an encrypting information table of a server apparatus of FIG. 1;

FIG. 5 is a view showing an example of arrangement of an encrypting information table of a client apparatus of FIG. 1;

FIG. 14 is a view showing an example of arrangement of an encrypting information table on a server apparatus side of a client-server type distributed system according to a fifth embodiment of the present invention;

FIG. 15 is a view showing an example of arrangement of an encrypting information table on a client apparatus side of the client-server type distributed system according to the fifth embodiment of the present invention;

FIG. 27 is a sequence chart showing the operation of a client-server type distributed system according to a ninth embodiment of the present invention;

FIG. 28 is a sequence chart showing the operation of the client-server type distributed system according to the ninth embodiment of the present invention;

FIG. 29 is a sequence chart showing the operation of the client-server type distributed system according to the ninth embodiment of the present invention;

FIG. 30 is a sequence chart showing the operation of a client-server type distributed system according to a tenth embodiment of the present invention;

FIG. 31 is a sequence chart showing the operation of a client-server type distributed system according to an eleventh embodiment of the present invention;

FIG. 32 is a sequence chart showing the operation of the client-server type distributed system according to the eleventh embodiment of the present invention; and FIG. 33 is a sequence chart showing the operation of the client-server type distributed system according to the eleventh embodiment of the present invention.

DESCRIPTION OF THE PREFERRED EMBODIMENTS

Figure 1:
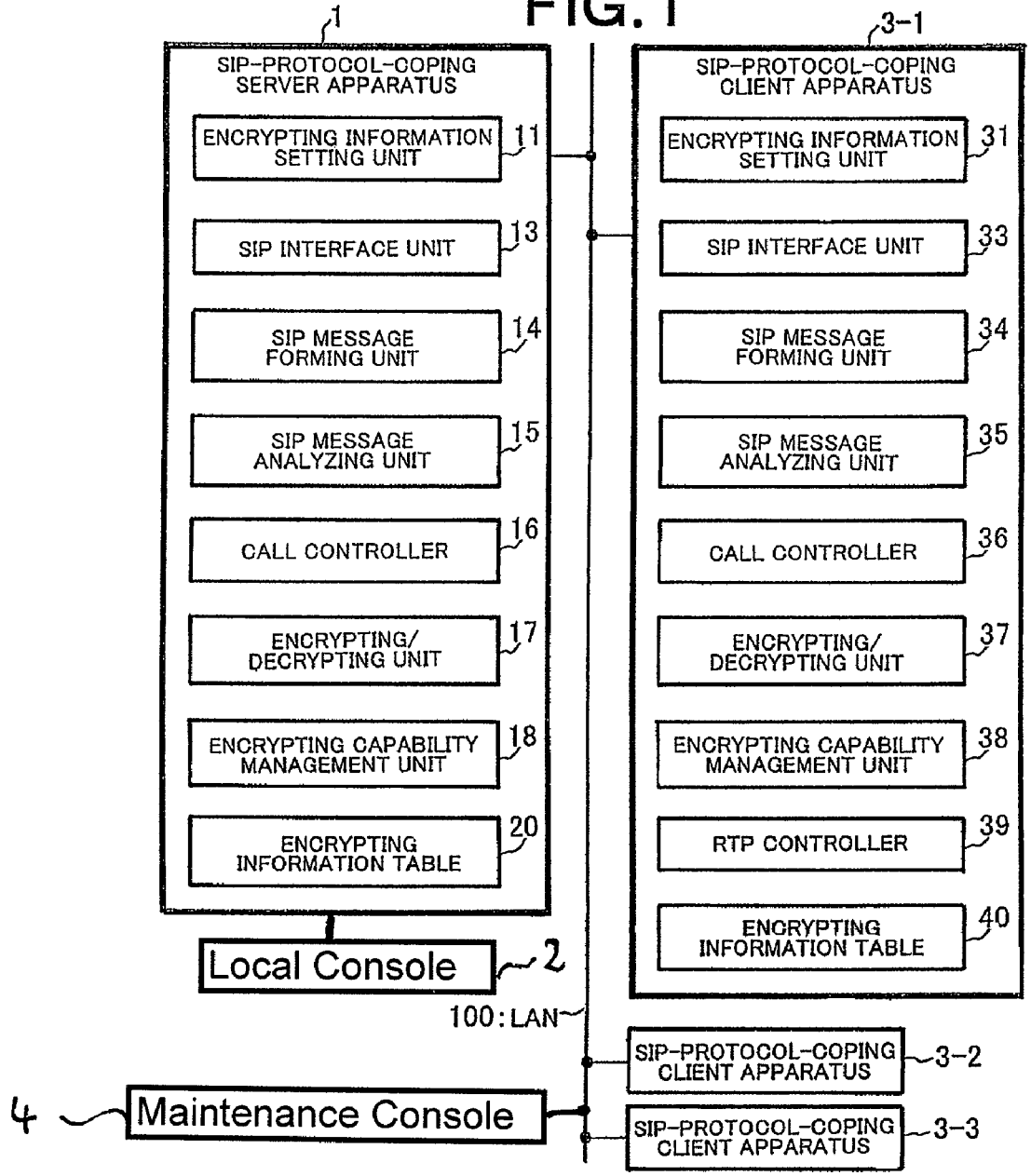
FIG. 1 is a block diagram showing the arrangement of a client-server type distributed system corresponding to the SIP protocol according to a first embodiment of the present invention.

Next, embodiments of the present invention will be explained referring to the drawings.

Embodiment 1

FIG. 1 is a block diagram showing the arrangement of a client-server type distributed system corresponding to the SIP (Session Initiation Protocol) according to a first embodiment of the present invention. In FIG. 1, the client-server type distributed system according to the first embodiment of the present invention comprises an SIP-protocol-coping server apparatus (hereinafter, referred to as a server apparatus) 1, a local maintenance console 2, client apparatuses 3-1 to 3-3 corresponding to the SIP protocol (hereinafter, referred to as client apparatuses), and a maintenance console 4. Further, the server apparatus 1, the client apparatuses 3-1 to 3-3, and the maintenance console 4 are connected to a LAN (Local Area Network) 100, respectively. Note that although an example in which the three client apparatuses 3-1 to 3-3 are connected is shown in the embodiment, it is also possible to connect, for example, two, four, or more client apparatuses, in addition to the example shown above. Further, although the local maintenance console 2 and the maintenance console 4 are provided in the embodiment, the embodiment can be also applied to a case in which these input/output means are not provided.

The server apparatus 1 comprises at least an encrypting information setting unit 11, an SIP interface unit 13, an SIP message forming unit 14, an SIP message analyzing unit 15, a call controller 16, an encrypting/decrypting unit 17, an encrypting capability management unit 18, and an encrypting information table 20. FIG. 4 shows an example of arrangement of the encrypting information table 20 on the server apparatus 1 side. Note that FIG. 4 shows a case that only one set of presence or absence of encrypting, an encrypting rule, and an encrypting key is stored, it is possible to store a plurality of sets of them. In this case, it is also possible to select one set of them from the plurality of sets of them based on a preset priority order or at random.

Further, in the server apparatus 1, a CPU (central processing unit) (not shown) can manage each of the encrypting information setting unit 11, the SIP interface unit 13, the SIP message forming unit 14, the SIP message analyzing unit 15, the call controller 16, the encrypting/decrypting unit 17, the encrypting capability management unit 18, and the encrypting information table 20 by executing a program.

The client apparatus 3-1 comprises at least an encrypting information setting unit 31, an SIP interface unit 33, an SIP message forming unit 34, an SIP message analyzing unit 35, a call controller 36, an encrypting/decrypting unit 37, an encrypting capability management unit 38, an RTP (Real-time Transport Protocol) controller 39, and an encrypting information table 40. FIG. 5 shows an example of arrangement of the encrypting information table 40 on the client apparatus 3-1 side. Note that although FIG. 5 shows a view in which only one set of presence or absence of encrypting, an encrypting rule, and an encrypting key is stored to an encrypting report table 40 as an example, it is also possible to store a plurality of sets of them. In this case, it is also possible select one set of them from the plurality of sets of them based on a preset priority order or at random.

Further, in the client apparatus 3-1, a CPU (central processing unit) (not shown) can manage each of the encrypting information setting unit 31, the SIP interface unit 33, the SIP message forming unit 34, the SIP message analyzing unit 35, the call controller 36, the encrypting/decrypting unit 37, the encrypting capability management unit 38, the RTP controller 39, and the encrypting information table 40 by executing a program. Further, client apparatuses 3-2, 3-3 are arranged similarly to the client apparatus 3-1.

When the server apparatus 1 and the client apparatuses 3-1 to 3-3 are arranged as described above, the server apparatus 1 can manage and automatically select encrypting information for encrypting an RTP packet and securely set it to the client apparatuses 3-1 to 3-3 when an RTP communication is carried out between the client apparatuses 3-1 to 3-3, thereby security can be enhanced.

Figure 2:
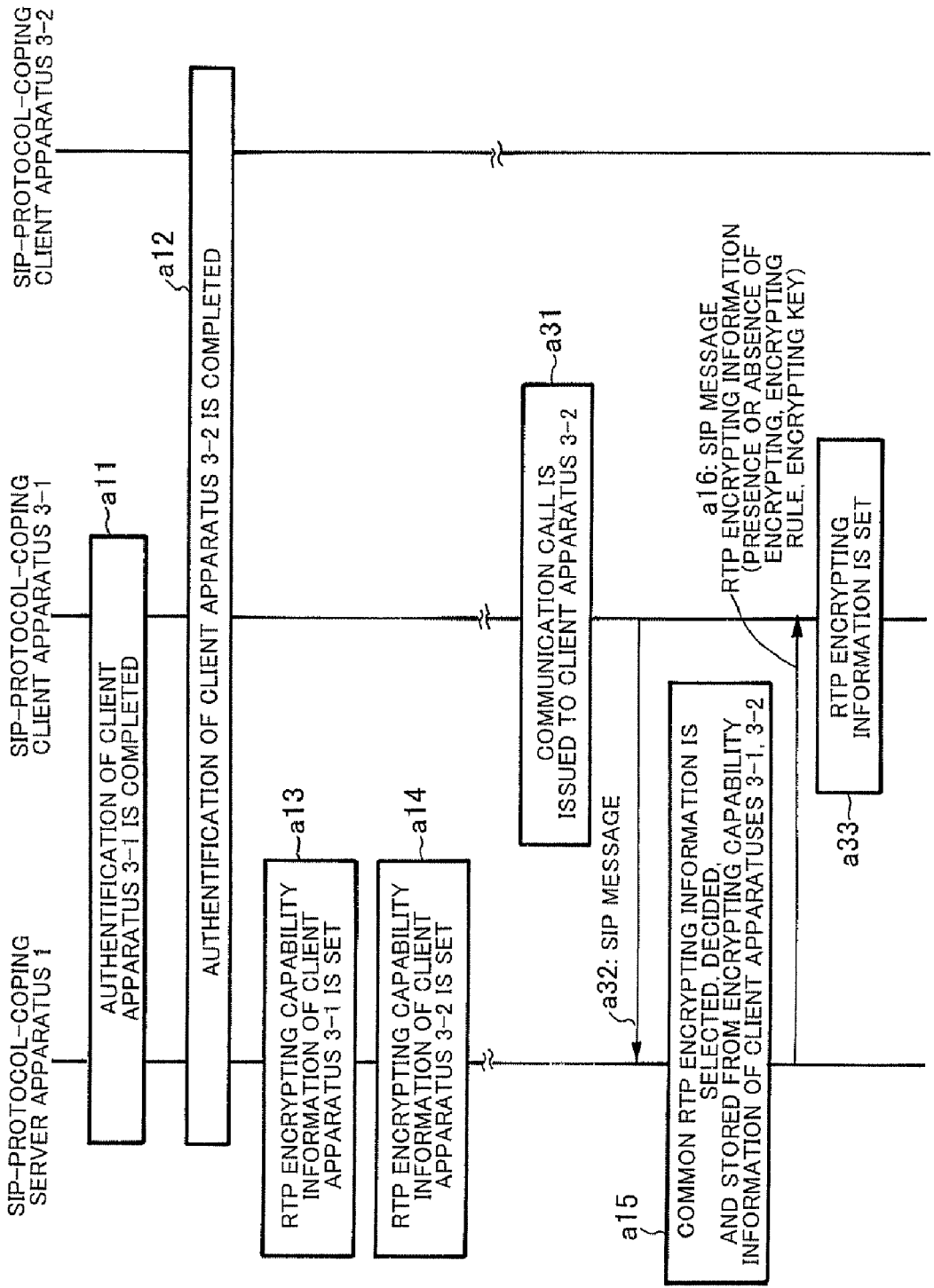
FIG. 2 is a sequence chart showing the operation of the client-server distributed system according to the first embodiment of the present invention.
Figure 3:
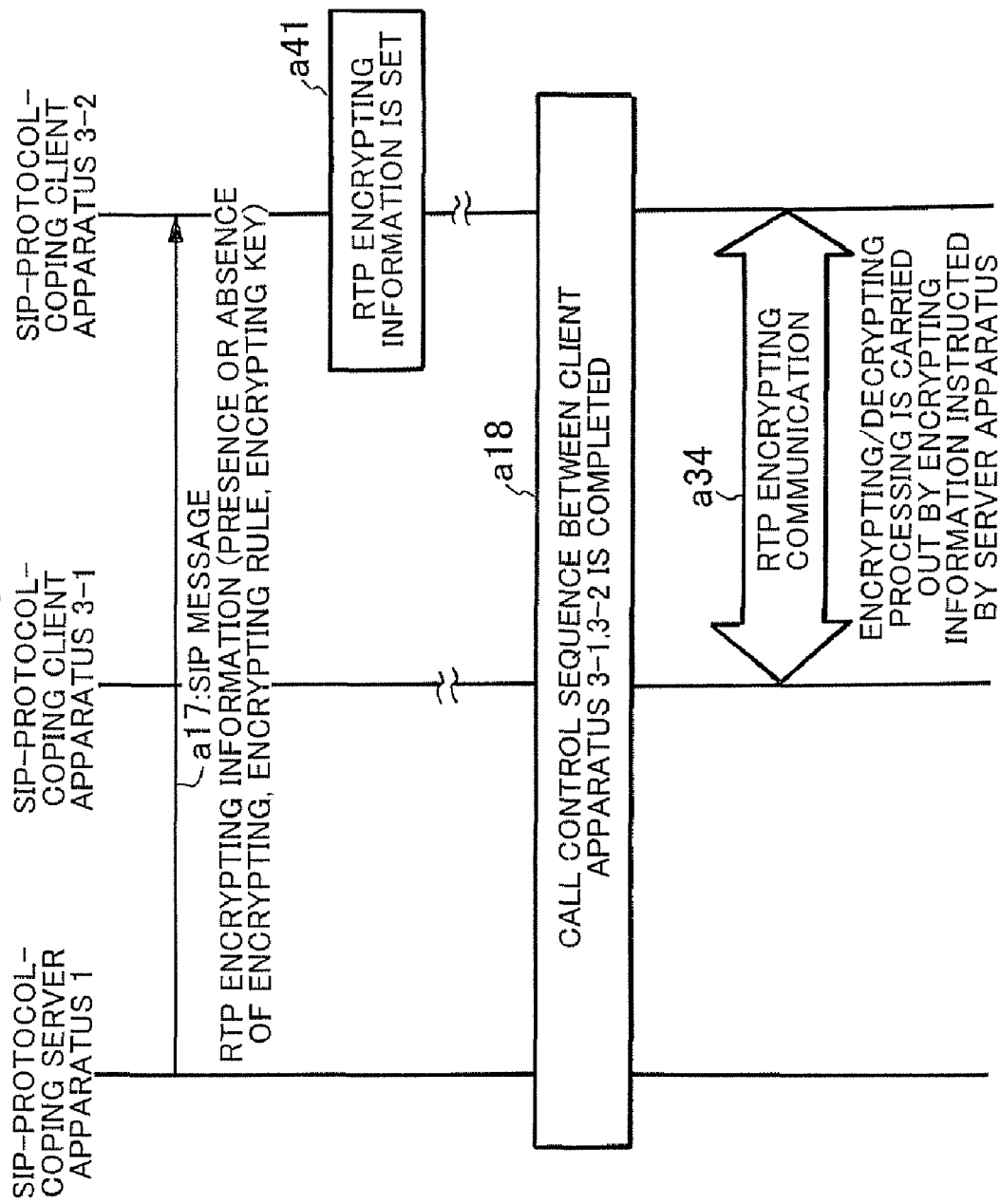
FIG. 3 is a sequence chart showing the operation of the client-server distributed system according to the first embodiment of the present invention.

FIGS. 2 and 3 are sequence charts showing the operation of the client-server type distributed system according to the first embodiment of the present invention. The operation of the client-server type distributed system according to the first embodiment of the present invention will be explained referring to FIGS. 1 to 3. Note that a CPU of the server apparatus 1 and CPUs of the client apparatuses 3-1, 3-2 carry out the processing of the server apparatus 1 and the processings of the client apparatuses 3-1, 3-2 shown in FIGS. 2 and 3 by executing programs.

Authentification processings between the server apparatus 1 and the client apparatuses 3-1, 3-2 are previously finished (a11, a12 of FIG. 2), and an SIP message can be securely transmitted and received between the server apparatus 1 and the client apparatus 3-1 and between the server apparatus 1 and the client apparatus 3-2.

The encrypting capability management unit 18 of the server apparatus 1 comprises at least one type of presence or absence of encrypting when the client apparatus 3-1 carries out an RTP communication and an encrypting rule/encrypting key (hereinafter, referred to as RTP encrypting information) which is used when an encrypting is present in the encrypting information table 20 and manages it as RTP encrypting capability information including an encrypting rule list to which the priority order of RTP encrypting rules to be used is attached (a13 of FIG. 2). Further, the RTP encrypting capability information of the client apparatus 3-2 is stored to the encrypting information table 20 of the server apparatus 1 likewise (a14 of FIG. 2).

When a communication call is issued from the client apparatus 3-1 to the client apparatus 3-2 (a31 of FIG. 2), the call controller 36 of the client apparatus 3-1 instructs the SIP message forming unit 34 to create an SIP message for call connection. The SIP message forming unit 34 creates the SIP message based on the instruction and transmits the created SIP message to the SIP interface unit 13 of the server apparatus 1 through the SIP interface unit 33 (a32 of FIG. 2).

When the SIP interface unit 13 of the server apparatus 1 receives the SIP message for call connection, it transfers the SIP message to the SIP message analyzing unit 15. When the SIP message analyzing unit 15 can confirm that the SIP message is normal, the SIP interface unit 13 transfers the SIP message to the call controller 16. The call controller 16 recognizes an RTP communication is carried out between the client apparatus 3-1 and the client apparatus 3-2 and instructs the encrypting capability management unit 18 to determine RTP encrypting information which is used between the client apparatus 3-1 and the client apparatus 3-2.

The encrypting capability management unit 18 determines the RTP encrypting information between the client apparatus 3-1 and the client apparatus 3-2 by the RTP encrypting capability information of both the client apparatuses 3-1, 3-2 stored to the encrypting information table 20 based on the instruction and transfers the RTP encrypting information to the encrypting information setting unit 11. Further, the encrypting capability management unit 18 stores the determined RTP encrypting information to the encrypting information table 20 as the RTP encrypting information of the client apparatuses 3-1, 3-2 (a15 of FIG. 2).

The encrypting information setting unit 11 notifies the call controller 16 of the RTP encrypting information between the client apparatus 3-1 and the client apparatus 3-2, and the call controller 16 instructs the SIP message forming unit 14 to create an SIP message, to which the received RTP encrypting information is added, to the client apparatus 3-1. The SIP message forming unit 14 creates the SIP message based on the instruction and transmits the created SIP message to the SIP interface unit 33 of the client apparatus 3-1 through the SIP interface unit 13 (a16 of FIG. 2).

When the SIP interface unit 33 of the client apparatus 3-1 receives the SIP message to which the RTP encrypting information is added, it transfers the SIP message to the SIP message analyzing unit 35. When SIP message analyzing unit 35 can confirm that the RTP encrypting information is normal, the SIP interface unit 33 transfers the RTP encrypting information to the encrypting information setting unit 31. The encrypting information setting unit 31 stores the RTP encrypting information to the encrypting information table 40 and sets the RTP encrypting information to the encrypting/decrypting unit 37 (a33 of FIG. 2).

The call controller 16 instructs the SIP message forming unit 14 to create an SIP message, to which the RTP encrypting information between the client apparatus 3-1 and the client apparatus 3-2 is added, to the client apparatus 3-2. The SIP message forming unit 14 creates the SIP message based on the instruction and transmits the created SIP message to an SIP interface unit 33 of the client apparatus 3-2 through the SIP interface unit 13 (a17 of FIG. 3).

When the SIP interface unit 33 of the client apparatus 3-2 receives the SIP message to which the RTP encrypting information is added, it transfers the SIP message to the SIP message analyzing unit 35. When the SIP message analyzing unit 35 can confirm that the RTP encrypting information is normal, the SIP interface unit 33 transfers the RTP encrypting information to the encrypting information setting unit 31. The encrypting information setting unit 31 stores the RTP encrypting information to the encrypting information table 40 and sets the RTP encrypting information to the encrypting/decrypting unit 37 (a41 of FIG. 2).

After the call control sequence between the client apparatus 3-1 and the client apparatus 3-2 is finished (a18 of FIG. 3) the RTP controller 39 of the client apparatus 3-1 and the RTP controller 39 of the client apparatus 3-2 transmit and receive the encrypted RTP using the RTP encrypting information set from the server apparatus 1 (a34 of FIG. 3).

With the above arrangement and operation, the embodiment is advantageous in that an encrypting security function can be realized at a low cost by making it unnecessary to carry out authentification to distribute an RTP encrypting key each time a call is issued, to prepare an authentification server in the system, and to previously distribute authentification information such as a certificate and the like.

Further, the embodiment is advantageous in that it can realize an encrypting security function of a highest level regardless that the client apparatuses 3-1, 3-2 have a plurality of types of different encrypting capabilities therebetween because the server apparatus 1 can manage the RTP encrypting capability information of the client apparatuses 3-1, 3-2 and automatically instruct the RTP encrypting information between the confronting client apparatuses 3-1, 3-2 when an RTP communication is carried out between the client apparatuses 3-1, 3-2.

Note that although how the client apparatus 3-3 is manipulated and operated is not explained above, the client apparatus 3-3 can obtain the same advantage as that when the client apparatuses 3-1, 3-2 are used.

Embodiment 2

Figure 6:
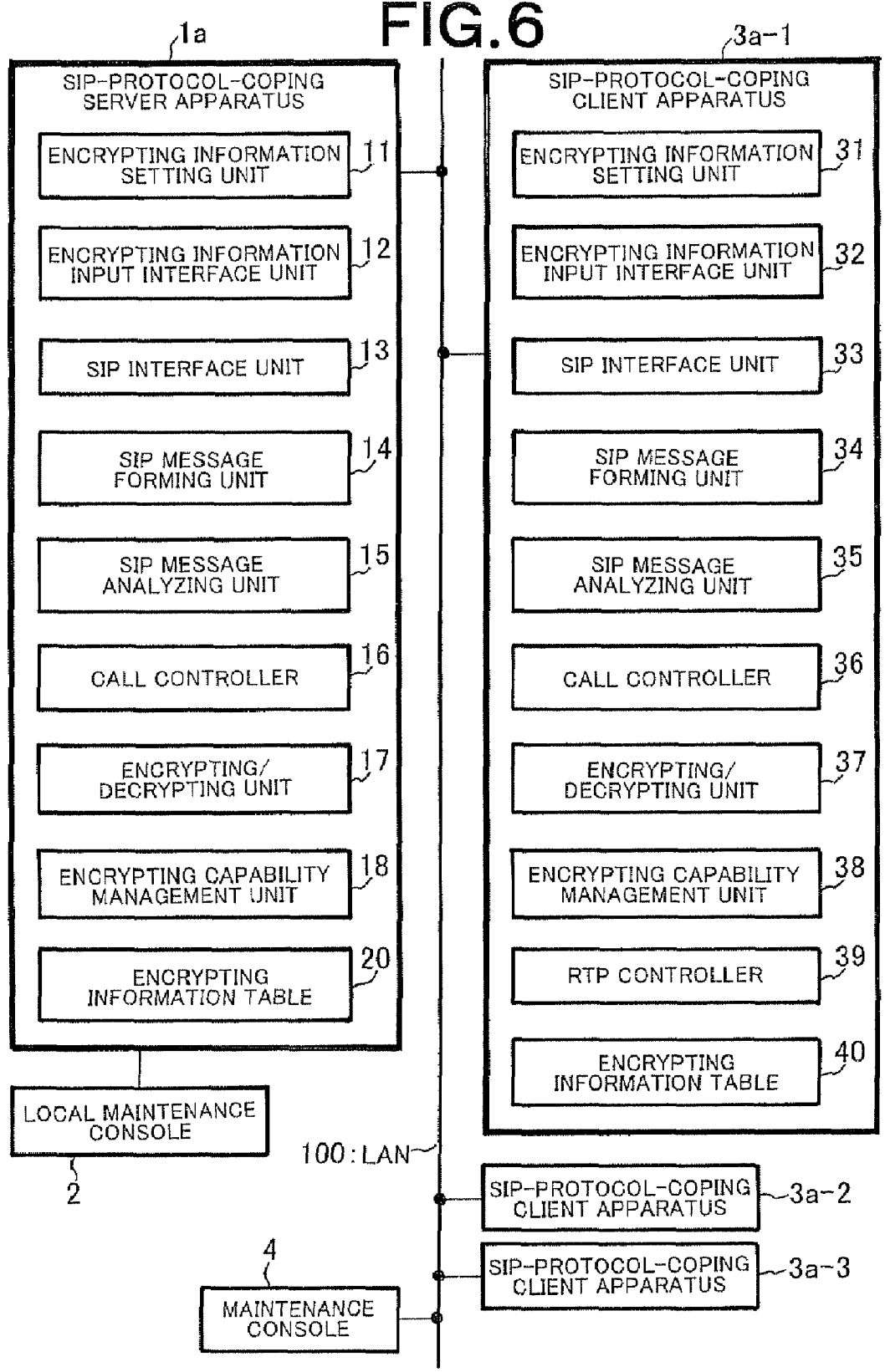
FIG. 6 is a block diagram showing the arrangement of a client-server type distributed system corresponding to the SIP protocol according to a second embodiment of the present invention.

FIG. 6 is a block diagram showing the arrangement of a client-server type distributed system according to a second embodiment of the present invention. In FIG. 6, since the client-server type distributed system according to the second embodiment of the present invention is arranged similarly to the client-server type distributed system according to the first embodiment of the present invention shown in FIG. 1 except that an encrypting information input interface unit 12 is added to a server apparatus 1a and an encrypting information input/output interface unit 32 is added to a client apparatus 3a-1, the same components are denoted by the same reference numerals.

In the embodiment, the above arrangement permits a maintenance person to securely set encrypting information for encrypting an RTP packet, when an RTP communication is carried out between the client apparatus 3a-1 to client apparatuses 3a-3, from the outside by an encrypting information input interface unit 12 through the server apparatus 1a based on a system design, thereby both security and easiness of maintenance can be simultaneously improved.

Further, in the embodiment, since the encrypting information for encrypting an RTP packet can be set by the encrypting information input/output interface unit 32 from the outside through the client apparatus 3a-1, the easiness of maintenance can be more improved.

Figure 7:
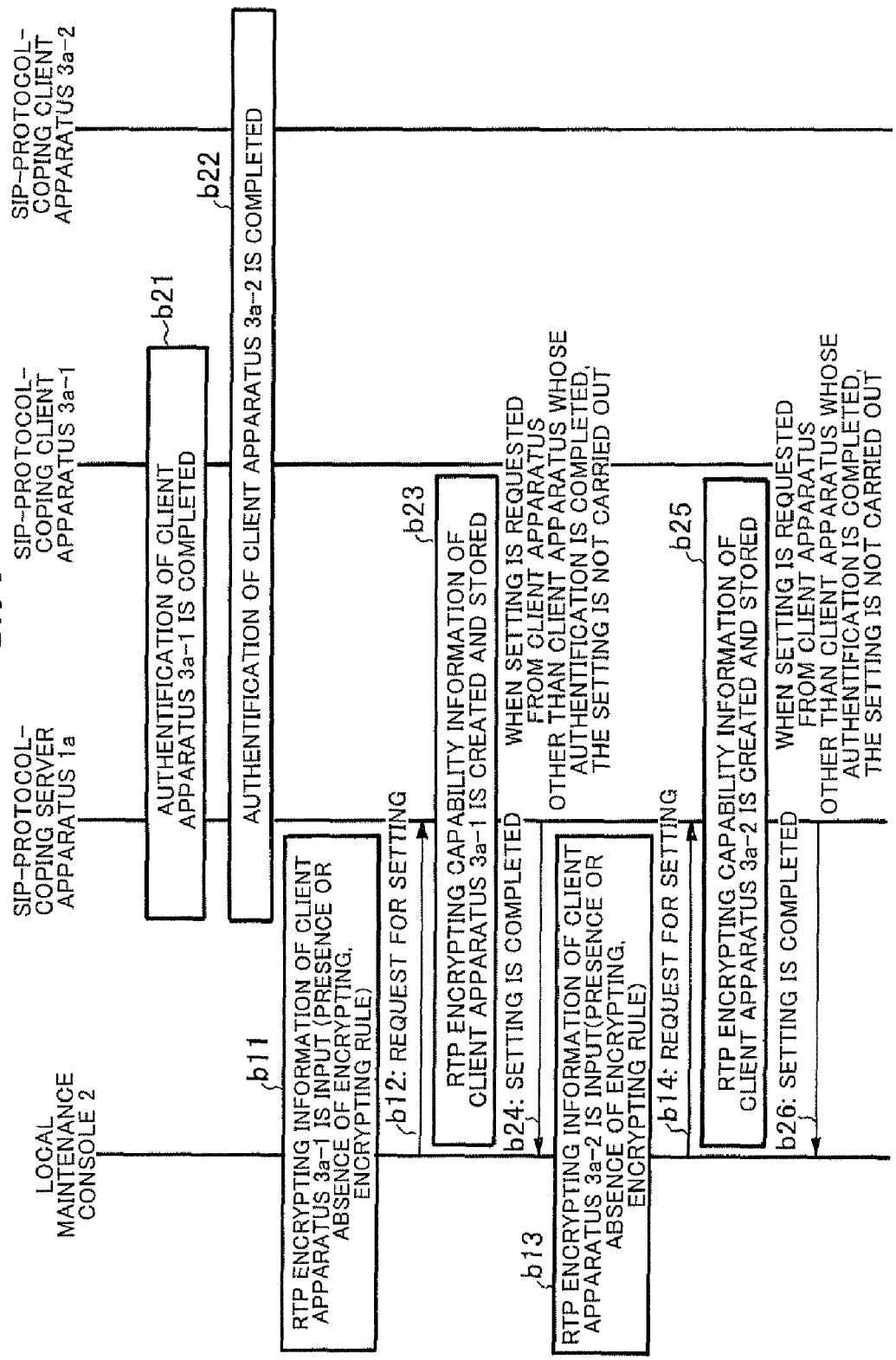
FIG. 7 is a sequence chart showing the operation of the client-server type distributed system according to the second embodiment of the present invention.
Figure 8:
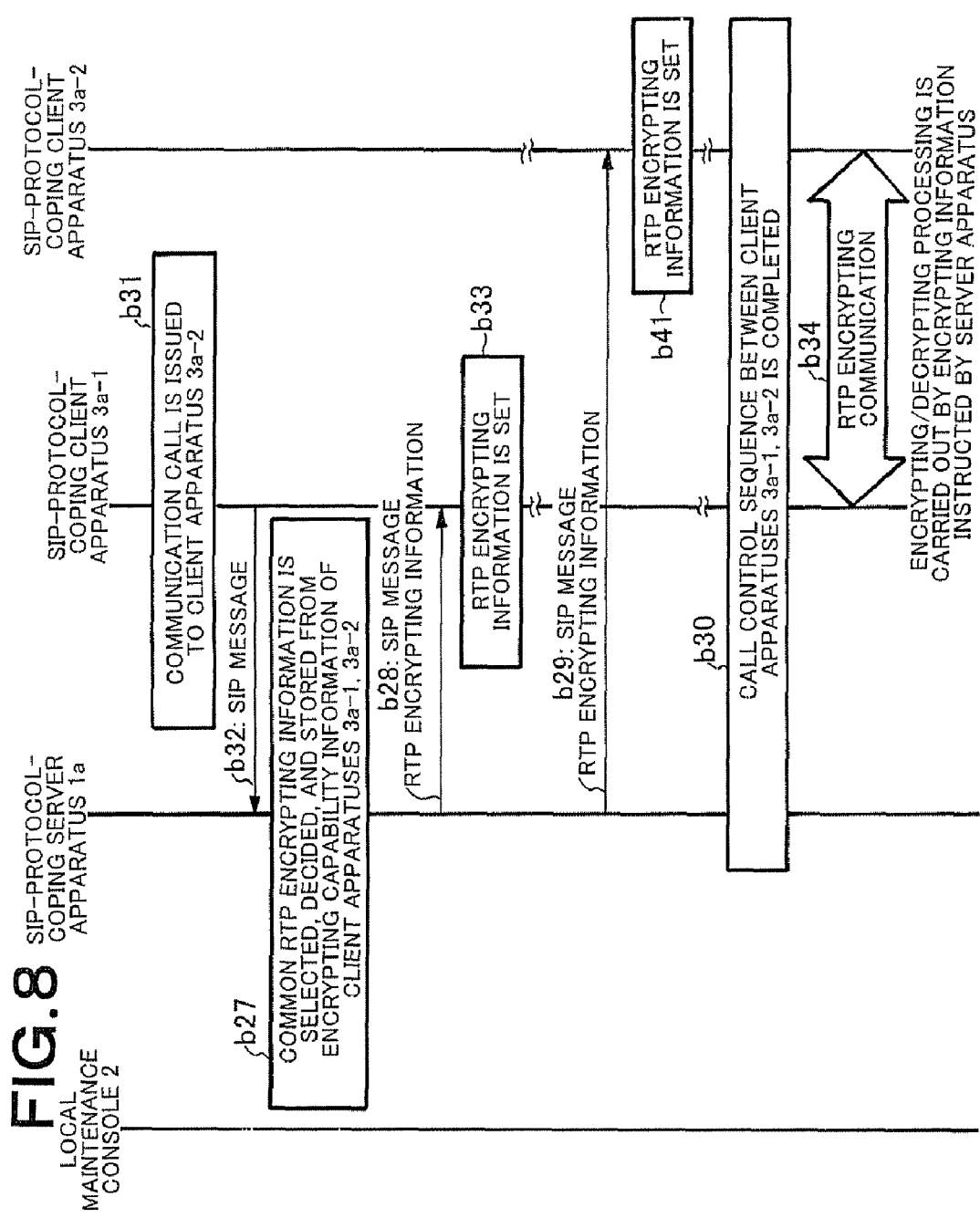
FIG. 8 is a sequence chart showing the operation of the client-server distributed system according to the second embodiment of the present invention.

FIGS. 7 and 8 are sequence charts showing the operation of the client-server type distributed system according to the second embodiment of the present invention. The operation of the client-server type distributed system according to the second embodiment of the present invention will be explained referring to FIGS. 6 to 8. Note that a CPU of the server apparatus 1a and CPUs of the client apparatuses 3a-1, 3a-2 carry out the processing of the server apparatus 1a and the processings of the client apparatuses 3a-1, 3a-2 shown in FIGS. 7 and 8 by executing programs. Further, FIGS. 7 and 8 show an example in which setting is carried out from the server apparatus 1a side.

Authentification processings between the server apparatus 1a and the client apparatuses 3a-1, 3a-2 are previously finished (b21, b22 of FIG. 7), and an SIP message can be securely transmitted and received between the server apparatus 1a and the client apparatus 3a-1 and the server apparatus 1a and the client apparatus 3a-2.

When at least one type of presence or absence of encrypting which is used when the client apparatus 3a-1 carries out an RTP communication and an encrypting rule/encrypting key (hereinafter, referred to as RTP encrypting information) which is used when an encrypting is present is previously input from the local maintenance console 2 connected to the server apparatus 1a (b11, b12 of FIG. 7), the encrypting information input interface unit 12 receives a request for setting including the RTP encrypting information and transfers the RTP encrypting information to an encrypting capability management unit 18 when it can be confirmed that the request for setting is normal.

The encrypting capability management unit 18, which has received the RTP encrypting information, creates RTP encrypting capability information including an RTP encrypting rule list held by the client apparatus 3a-1 and transfers it to an encrypting information setting unit 11. Further, the encrypting capability management unit 18 stores the RTP encrypting capability information to an encrypting information table 20 (b23 of FIG. 7) and notifies the local maintenance console 2 of that the encrypting information table 20 has been set through the encrypting information input interface unit 12 (b24 of FIG. 7).

Further, when at least one type of encrypting information of the client apparatus 3a-2 is set from the local maintenance console 2 by the same procedure as above (b13, b14 of FIG. 7), the RTP encrypting capability information of the client apparatus 3a-2 is created and stored to the encrypting information table 20 of the server apparatus 1a (b25 of FIG. 7), and the local maintenance console 2 is notified of that the RTP encrypting capability information has been set through an encrypting information input interface unit 12 (b26 of FIG. 7).

Since the operation carried out when a communication call is issued from the client apparatus 3a-1 to the client apparatus 3a-2 is the same as the first embodiment, explanation of the operation (operation shown in FIG. 8) is omitted.

Figure 9:
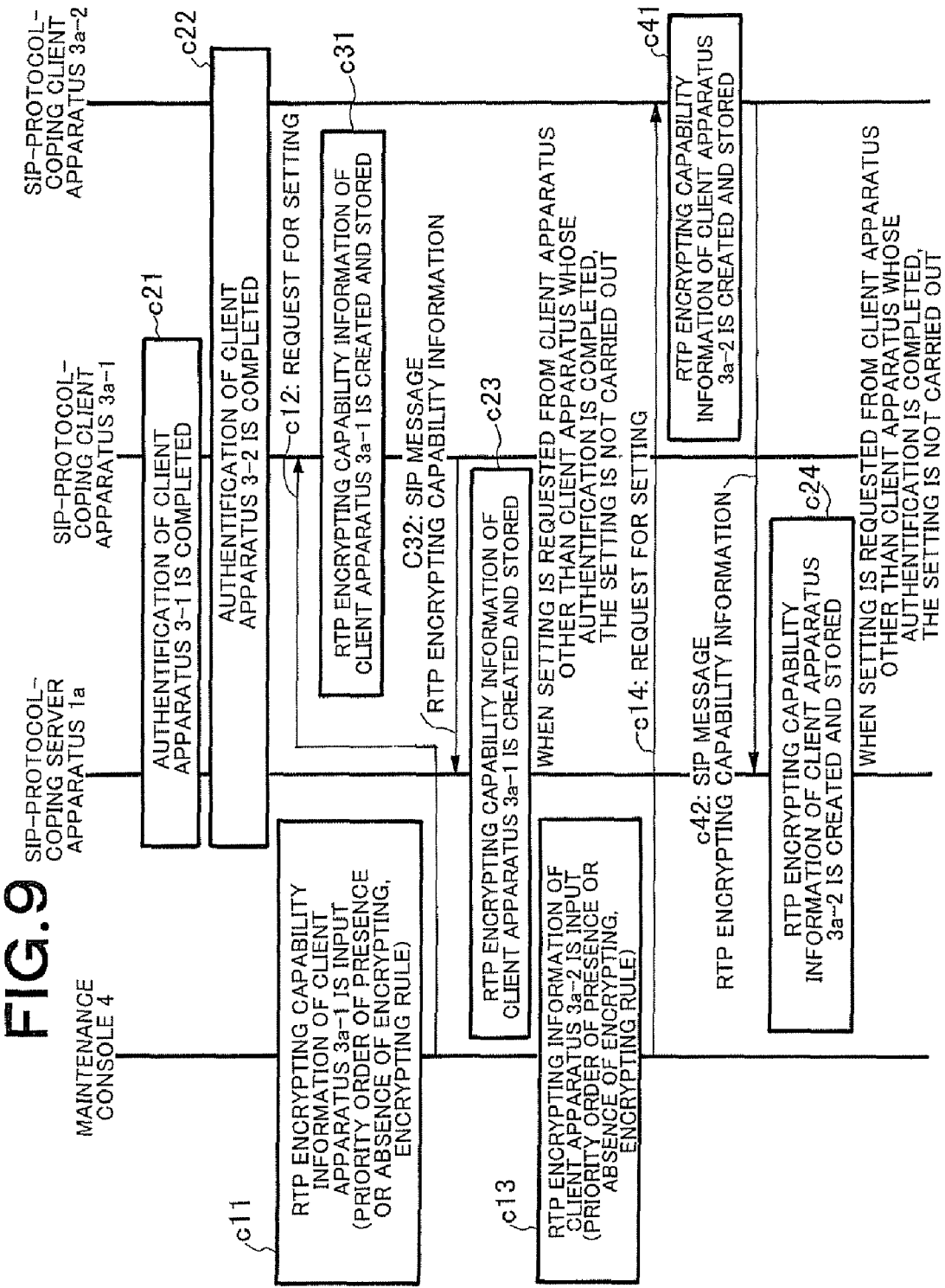
FIG. 9 is a sequence chart showing the operation of the client-server type distributed system according to the second embodiment of the present invention.

FIG. 9 is a sequence chart showing the operation of the client-server type distributed system according to the second embodiment of the present invention. An example in which setting is carried out from the client apparatus 3a-1 side will be explained referring to FIG. 9.

Since authentification processings are previously finished between the server apparatus 1a and the client apparatuses 3a-1, 3a-2 also in this case (c21, c22 of FIG. 9), an SIP message can be securely transmitted and received between the server apparatus 1a and the client apparatus 3a-1 and between the server apparatus 1a and the client apparatus 3a-2, respectively.

When at least one type of presence or absence of encrypting which is used when the client apparatus 3a-1 carries out an RTP communication and an encrypting rule/encrypting key (hereinafter, referred to as RTP encrypting information)

which is used when an encrypting is present is previously input from a maintenance console 4 connected to the client apparatus 3a-1 (c11, c12 of FIG. 9), the encrypting information input/output interface unit 32 receives a request for setting including the RTP encrypting information and transfers the RTP encrypting information to the encrypting capability management unit 38 when it can be confirmed that the request for setting is normal.

The encrypting capability management unit 38, which has received the RTP encrypting information, updates the RTP encrypting capability information including the RTP encrypting rule list held by the client apparatus 3a-1 and transfers it to an encrypting information setting unit 31. Further, the encrypting capability management unit 38 stores the RTP encrypting capability information to an encrypting information table 40 (c31 of FIG. 9).

The encrypting information setting unit 31 instructs an SIP message forming unit 34 to create an SIP message to which the RTP encrypting capability information is added, and the SIP message forming unit 34 creates the SIP message to which the RTP encrypting capability information is added based on the instruction and transmits the created SIP message to an SIP interface unit 13 of the server apparatus 1a through an SIP interface unit 33 (c32 of FIG. 9)

When the SIP interface unit 13 of the server apparatus 1a receives the SIP message to which the RTP encrypting capability information is added, it transfers the SIP message to an SIP message analyzing unit 15. When the SIP message analyzing unit 15 can confirm that the RTP encrypting capability information is normal, the SIP interface unit 13 notifies the encrypting capability management unit 18 of the RTP encrypting capability information. The encrypting capability management unit 18 stores the received RTP encrypting capability information to the encrypting information table 20 (c23 of FIG. 9).

Further, the RTP encrypting capability information of the client apparatus 3a-2 is stored to the encrypting information table 40 of the client apparatus 3a-2 by the same procedure as above (c13, c14, c41 of FIG. 9) as well as stored to the encrypting information table 20 of the server apparatus 1a (c41, c24 of FIG. 9)

Since the sequence chart of an operation carried out when a communication call is issued from the client apparatus 3a-1 to the client apparatus 3a-2 is the same as that shown in FIG. 8, and detailed explanation of the operation is omitted because it is the same as the first embodiment.

Accordingly, the embodiment is advantageous in that it can realize an encrypting security function of a highest level because the server apparatus 1a can input and manage the RTP encrypting capability information of the client apparatus 3a-1, 3a-2 from the outside and a maintenance person can set the encrypting information between the client apparatuses 3a-1, 3a-2 based on an idea of system design.

Further, the embodiment is advantageous in that easiness of maintenance can be more improved because the RTP encrypting capability information of the client apparatus 3a-1, 3a-2 can be input and managed from the outside of the client apparatuses 3a-1, 3a-2.

Further, the embodiment has the same advantage as that of the first embodiment of the present invention described above as an advantage resulting from the RTP encrypting function obtained by the set RTP encrypting information. Note that although how the client apparatus 3a-3 is manipulated and operated is not explained above, the client apparatus 3a-3 can obtain the same advantage as that when the client apparatuses 3a-1, 3a-2 are used.

Embodiment 3

Figure 10:
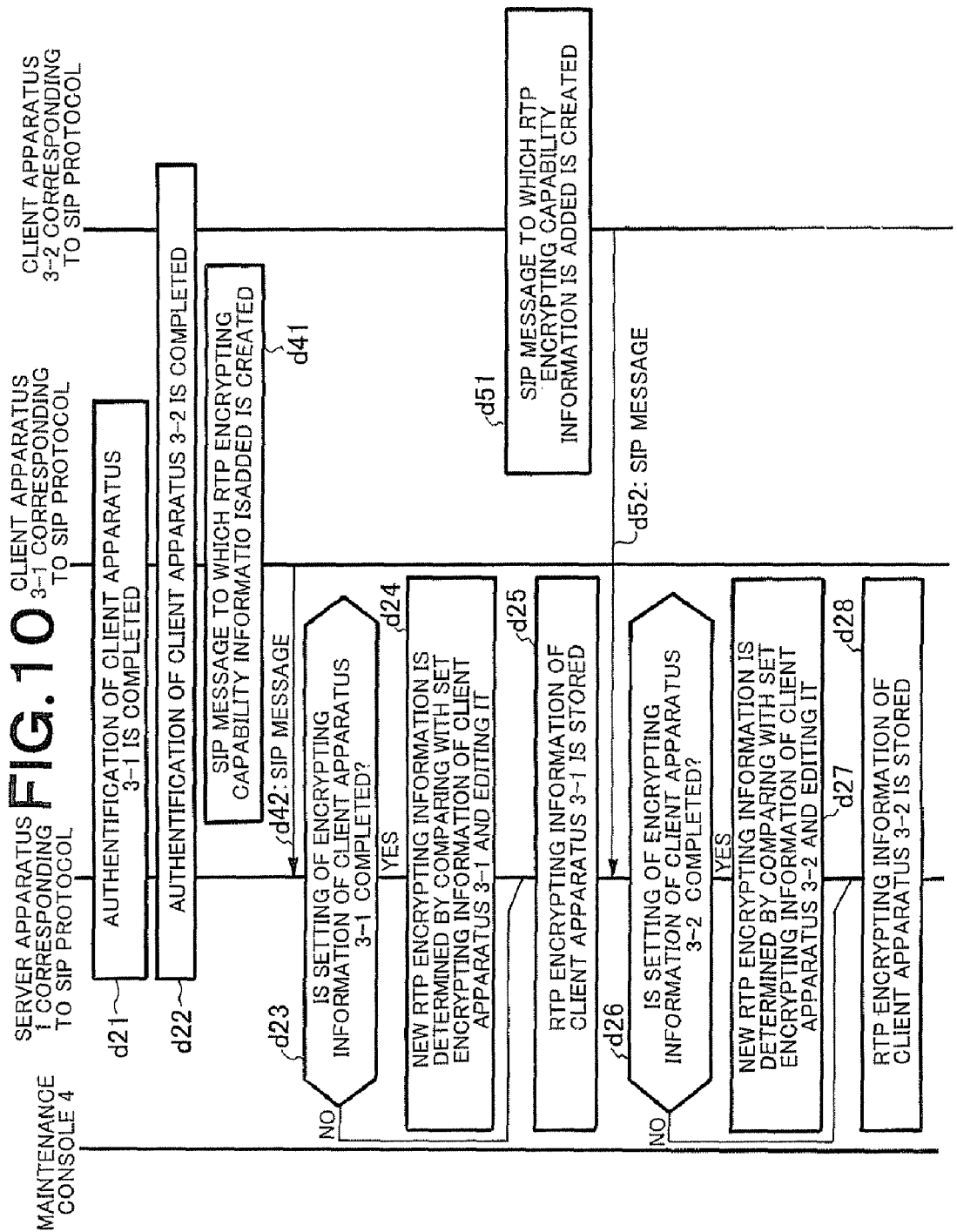
FIG. 10 is a sequence chart showing the operation of a client-server type distributed system according to a third embodiment of the present invention.
Figure 11:
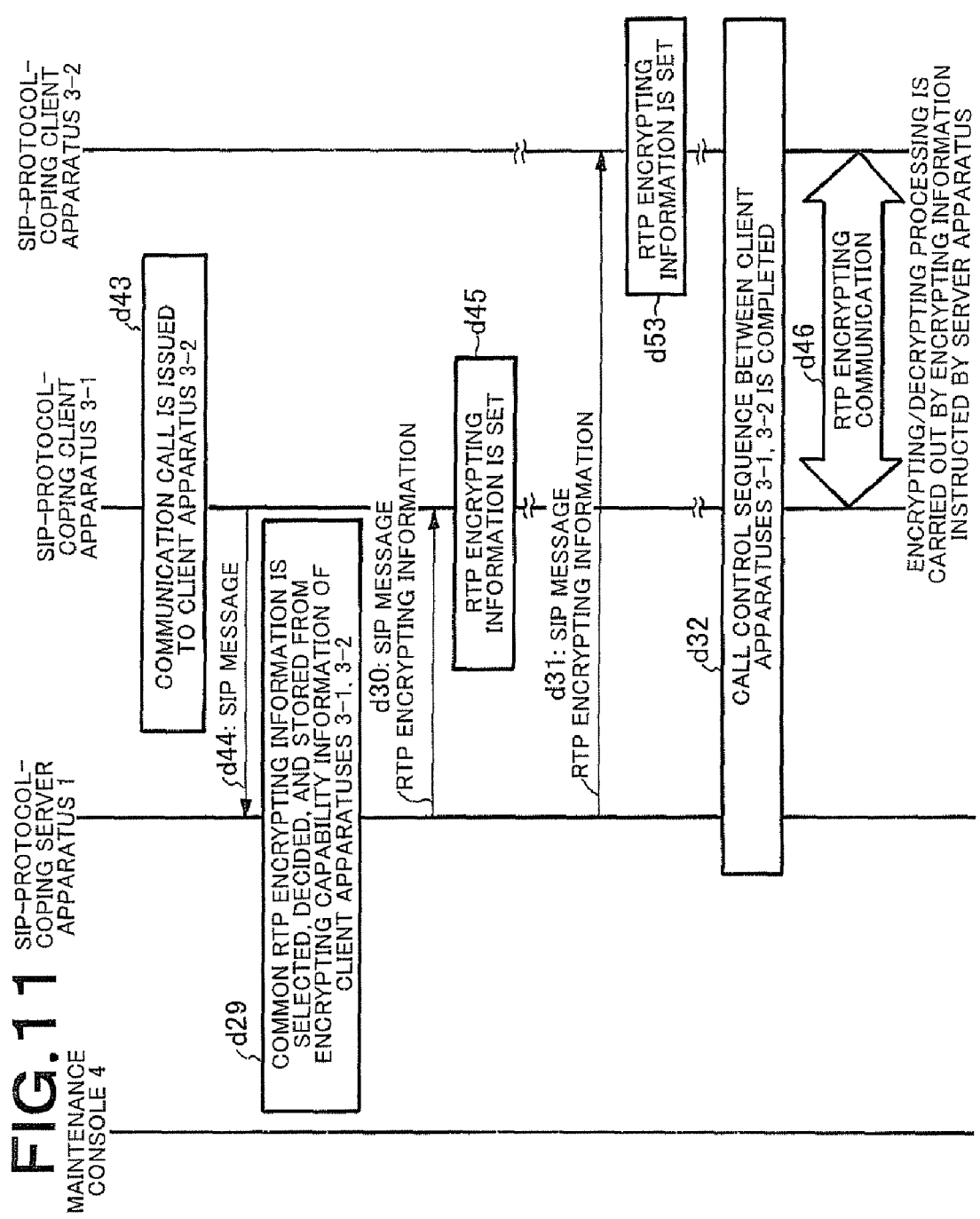
FIG. 11 is a sequence chart showing the operation of the client-server type distributed system according to the third embodiment of the present invention.

FIGS. 10 and 11 are sequence charts showing the operation of a client-server type distributed system according to a third embodiment of the present invention. Since the client-server type distributed system according to the third embodiment of the present invention is arranged similarly to the client-server type distributed system according to the first embodiment of the present invention shown in FIG. 1, explanation of the arrangement thereof is omitted. The operation of the client-server type distributed system according to the third embodiment of the present invention will be explained below referring to FIGS. 1, 10 and 11. Note that a CPU of a server apparatus 1 and CPUs client apparatuses 3-1, 3-2 carry out the processing of the server apparatus 1 and the processings of the client apparatuses 3-1, 3-2 shown in FIGS. 10 and 11 by executing programs.

In the embodiment, since the arrangement and operation described above is realized, encrypting information, which can be used in an RTP encrypting, can be notified from the client apparatus 3-1 to the server apparatus 1, the server apparatus 1 can manage the RTP encrypting capability information between the client apparatuses 3-1, 3-2, and the RTP encrypting information, which can be realized by both the client apparatuses 3-1, 3-2 without fail, can be automatically instructed to the RTP encrypting between the confronting client apparatuses 3-1, 3-2 when an RTP communication is carried out between the client apparatuses 3-1, 3-2. As a result, a user can effectively realize an encrypting security function between the client apparatuses 3-1, 3-2 having a plurality of types RTP encrypting capabilities without being conscious of an encrypting rule.

It is assumed that authentification is completed between the server apparatus 1 and the client apparatus 3-1 and between the server apparatus 1 and the client apparatus 3-2 at an arbitrary timing from the start of operation of the client apparatuses 3-1, 3-2 up to now (d21, d22 of FIG. 10). Further, it is assumed that encrypting capability management unit 38 of the client apparatuses 3-1, 3-2 store the RTP encrypting capability information to an encrypting information table 40 on a client side.

An SIP message forming unit 34 of the client apparatus 3-1 creates an SIP message to which the RTP encrypting capability information is added (d41 of FIG. 10) and transmits the created SIP message to an SIP interface unit 13 of the server apparatus 1 through an SIP interface unit 33 (d42 of FIG. 10).

The SIP interface unit 13 of the server apparatus 1 transfers the SIP message received from the client apparatus 3-1 to an SIP message analyzing unit 15. When the SIP message analyzing unit 15 can confirm that the RTP encrypting capability information is normal, the SIP interface unit 13 notifies an encrypting capability management unit 18 of the RTP encrypting capability information.

The encrypting capability management unit 18 checks whether or not the RTP encrypting capability information of the client apparatus 3-1 has been set to an encrypting information table 20 (d23 of FIG. 10). When the encrypting information table 20 includes the RTP encrypting capability information having been set thereto, the encrypting capability management unit 18 compares the RTP encrypting capability information with the RTP encrypting capability information received from the client apparatus 3-1 and edits it, newly creates RTP encrypting capability information by which the client apparatus 3-1 can be securely operated (d24 of FIG. 10), stores the RTP encrypting capability information to the encrypting information table 20 (d25 of FIG. 10), and notifies an encrypting information setting unit 11 of it. Further, when the encrypting information table 20 includes no RTP encrypting capability information having been set thereto, the encrypting capability management unit 18 stores the RTP encrypting capability information received from the client apparatus 3-1 to the encrypting information table 20 (d25 of FIG. 10).

Further, the RTP encrypting capability information of the client apparatus 3-2 is stored to an encrypting information table 1a of the server apparatus 1 by the same procedure as above (d51, d52, and d26 to d28 of FIG. 10).

When a communication call is issued from the client apparatus 3-1 to the client apparatus 3-2 (d43 of FIG. 11), a call controller 36 of the client apparatus 3-1 instructs the SIP message forming unit 34 to create an SIP message for call connection, and the SIP message forming unit 34 creates the SIP message based on the instruction and transmits the created SIP message to the SIP interface unit 13 of the server apparatus 1 through the SIP interface unit 33 (d44 of FIG. 11).

When the SIP interface unit 13 of the server apparatus 1 receives the SIP message for call connection, it transfers the SIP message to the SIP message analyzing unit 15. When the SIP message analyzing unit 15 can confirm that the SIP message is normal, the SIP interface unit 13 transfers the SIP message to a call controller 16. The call controller 16 recognizes that an RTP communication is carried out between the client apparatus 3-1 and the client apparatus 3-2 and instructs the encrypting capability management unit 18 to determine RTP encrypting information which is used between the client apparatus 3-1 and the client apparatus 3-2.

The encrypting capability management unit 18 determines the RTP encrypting information between the client apparatus 3-1 and the client apparatus 3-2 based on the instruction by the RTP encrypting capability information of the client apparatuses 3-1, 3-2 stored to the encrypting information table 20 and transfers the RTP encrypting information to the encrypting information setting unit 11. Further, the encrypting capability management unit 18 stores the determined RTP encrypting information to the encrypting information table 20 as the RTP encrypting information of the client apparatuses 3-1, 3-2 (d29 of FIG. 11).

The encrypting information setting unit 11 creates an encrypting key which is used in the RTP encrypting between the client apparatus 3-1 and the client apparatus 3-2 and stores it to the encrypting information table 20 as the RTP encrypting information of the client apparatuses 3-1, 3-2.

The encrypting information setting unit 11 notifies the call controller 16 of the RTP encrypting information including the created encrypting key between the client apparatus 3-1 and the client apparatus 3-2, and the call controller 16 instructs an SIP message forming unit 14 to create an SIP message, to which the RTP encrypting information is added, to the client apparatus 3-1. The SIP message forming unit 14 creates the SIP message based on the instruction and transmits the created SIP message to the SIP interface unit 33 of the client apparatus 3-1 through the SIP interface unit 13 (d30 of FIG. 11).

When the SIP interface unit 33 of the client apparatus 3-1 receives the SIP message to which the RTP encrypting information is added, it transfers the SIP message to an SIP message analyzing unit 35. When the SIP message analyzing unit 35 confirms that the RTP encrypting information is normal, the SIP interface unit 33 transfers the RTP encrypting information to an encrypting information setting unit 31. The encrypting information setting unit 31 stores the RTP encrypting information to the encrypting information table 40 and sets the RTP encrypting information to an encrypting/decrypting unit 37 (d45 of FIG. 11).

The call controller 16 instructs the SIP message forming unit 14 to create an SIP message, to which the RTP encrypting information between the client apparatus 3-1 and the client apparatus 3-2 is added, to the client apparatus 3-2. The SIP message forming unit 14 creates the SIP message based on the instruction and transmits the created SIP message to an SIP interface unit 33 of the client apparatus 3-2 through the SIP interface unit 13 (d31 of FIG. 12).

When the SIP interface unit 33 of the client apparatus 3-2 receives the SIP message to which the RTP encrypting information is added, it transfers the SIP message to the SIP message analyzing unit 35. When the SIP message analyzing unit 35 confirms that the RTP encrypting information is normal, the SIP interface unit 33 transfers the RTP encrypting information to the encrypting information setting unit 31. The encrypting information setting unit 31 stores the RTP encrypting information to the encrypting report table 40 and sets the RTP encrypting information to the encrypting/decrypting unit 37 (d53 of FIG. 11).

After the call control sequence between the client apparatus 3-1 and the client apparatus 3-2 is completed (d32 of FIG. 11), an RTP controller 39 of the client apparatus 3-1 and an RTP controller 39 of the client apparatus 3-2 transmit and receive an encrypted RTP using the RTP encrypting information set from the server apparatus 1 (d46 of FIG. 11).

In the embodiment, the arrangement and operation described is employed, encrypting information, which can be used in an RTP encrypting, can be notified from the client apparatus 3-1 to the server apparatus 1, the server apparatus 1 can manage the RTP encrypting capability information between the client apparatuses 3-1, 3-2, and the RTP encrypting information, which can be realized by both the client apparatuses 3-1, 3-2 without fail, can be automatically instructed to the RTP encrypting between the confronting client apparatuses 3-1, 3-2 when an RTP communication is carried out between the client apparatuses 3-1, 3-2. As a result, there is an advantage in that a user can effectively realize an encrypting security function between the client apparatuses 3-1, 3-2 having a plurality of types RTP encrypting capabilities without being conscious of an encrypting rule.

Further, the embodiment has an advantage similar to that of the first and the second embodiments of the present invention described above as an advantage achieved by the RTP encrypting information set as shown above. Note that although how the client apparatus 3-3 is manipulated and operated is not explained above, the client apparatus 3-3 can obtain the same advantage as that when the client apparatuses 3-1, 3-2 are used.

Embodiment 4

Figure 12:
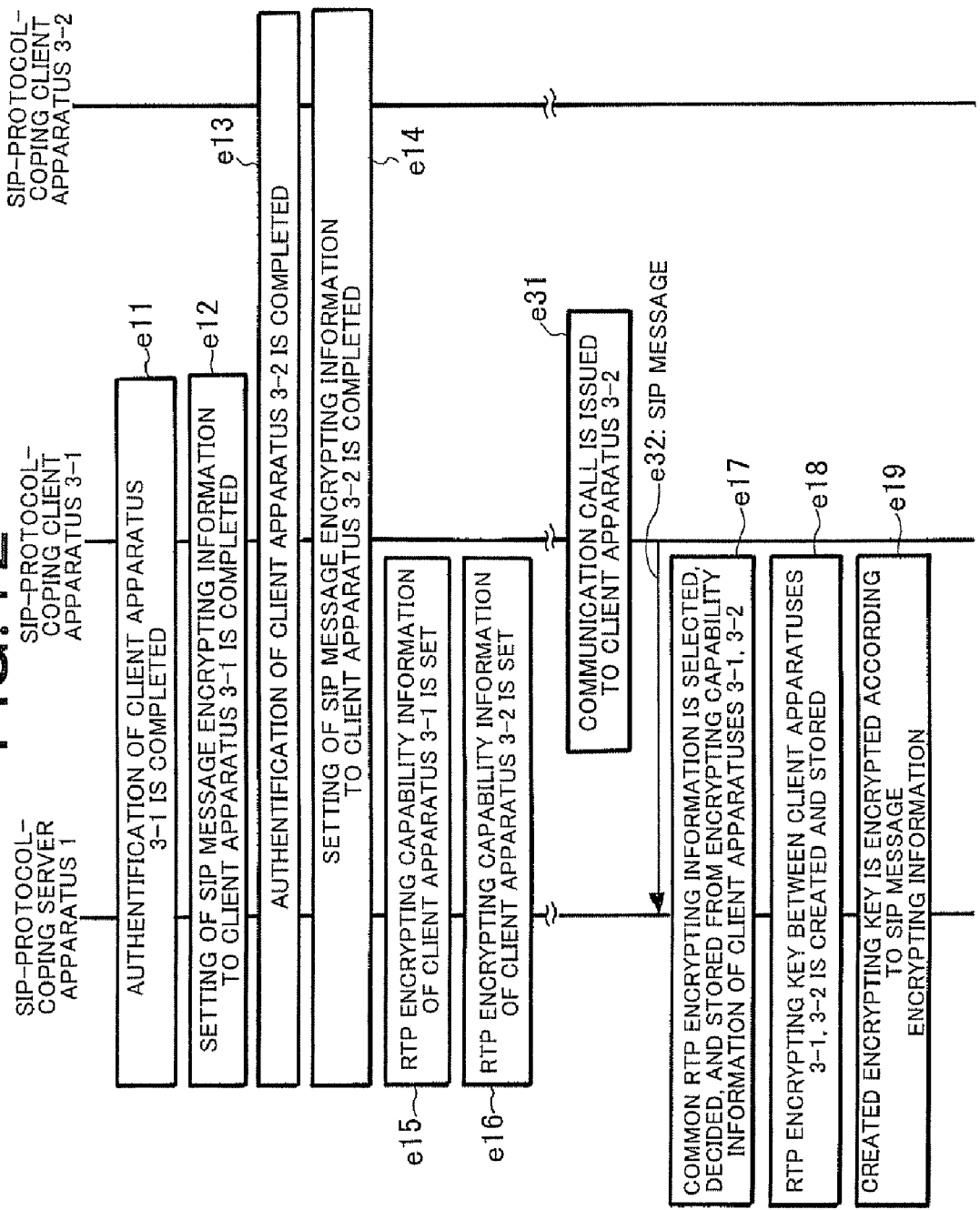
FIG. 12 is a sequence chart showing the operation of a client-server type distributed system according to a fourth embodiment of the present invention.
Figure 13:
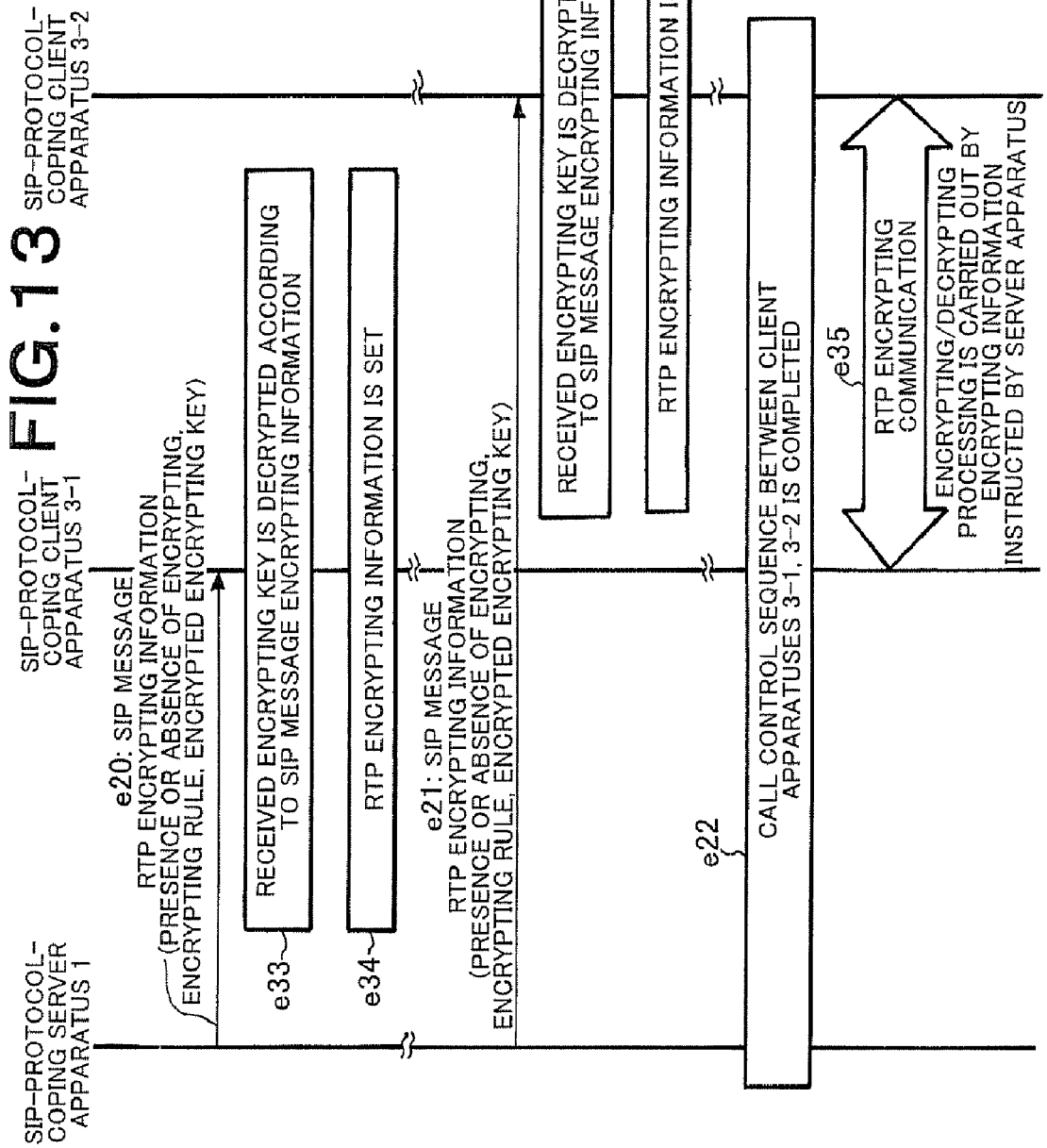
FIG. 13 is a sequence chart showing the operation of the client-server type distributed system according to the fourth embodiment of the present invention.

FIGS. 12 and 13 are sequence charts showing the operation of a client-server type distributed system according to a fourth embodiment of the present invention. Since the client-server type distributed system according to the fourth embodiment of the present invention is arranged similarly to the client-server type distributed system according to the first embodiment shown in FIG. 1, explanation of the arrangement thereof is omitted. The operation of the client-server type distributed system according to the fourth embodiment of the present invention will be explained below referring to FIGS. 1, 12, and 13. Note that a CPU of a server apparatus 1 and CPUs of client apparatuses 3-1, 3-2 carry out the processing of the server apparatus 1 and the processings of the client apparatuses 3-1, 3-2 shown in FIGS. 12 and 13 by executing programs.

In the embodiment, an RTP encrypting key can be securely notified when an RTP communication is carried out between the client apparatuses 3-1 to 3-3 by employing the arrangement and operations as described above, thereby security can be enhanced.

Authentification processings between the server apparatus 1 and the client apparatuses 3-1, 3-2 are previously completed (e11, e13 of FIG. 12), SIP message encrypting information is set between the server apparatus 1 and the client apparatus 3-1 and between the server apparatus 1 and the client apparatus 3-2, respectively (e12, e14 of FIG. 12), and an SIP message encrypting can be securely transmitted and received according to the SIP message encrypting information. In this case, the encrypting capability information of the client apparatuses 3-1, 3-2 is previously set to the encrypting information table 20 of the server apparatus 1 (e15, e16 of FIG. 12).

When a communication call is issued from the client apparatus 3-1 to the client apparatus 3-2 (e31 of FIG. 12), a call controller 36 of the client apparatus 3-1 instructs an SIP message forming unit 34 to create an SIP message for call connection, and the SIP message forming unit 34 creates the SIP message based on the instruction and transmits the created SIP message to the SIP interface unit 13 of the server apparatus 1 through the SIP interface unit 33 (e32 of FIG. 12).

When the SIP interface unit 13 of the server apparatus 1 receives the SIP message for call connection, it transfers the received SIP message to the SIP message analyzing unit 15, and when the SIP message analyzing unit 15 can confirm that the SIP message is normal, the SIP interface unit 13 transfers the SIP message to the call controller 16. The call controller 16 recognizes that an RTP communication is carried out between the client apparatus 3-1 and the client apparatus 3-2 and instructs the encrypting capability management unit 18 to determine RTP encrypting information which is used between the client apparatus 3-1 and the client apparatus 3-2.

The encrypting capability management unit 18 determines the RTP encrypting information between the client apparatus 3-1 and the client apparatus 3-2 by the RTP encrypting capability information of the client apparatuses 3-1, 3-2 stored to the encrypting information table 20 based on the instruction and transfers it to the encrypting information setting unit 11. Further, the encrypting capability management unit 18 stores the determined RTP encrypting information to the encrypting report table 20 as the RTP encrypting information of the respective the client apparatuses 3-1, 3-2 (e17 of FIG. 12).

When the determined RTP encrypting capability information is transferred to the encrypting information setting unit 11, it creates an encrypting key which is used to the RTP encrypting between the client apparatus 3-1 and the client apparatus 3-2 and stores it to the encrypting report table 20 as the RTP encrypting information of the respective client apparatuses 3-1, 3-2 (e18 of FIG. 12).

The encrypting information setting unit 11 instructs the encrypting/decrypting unit 17 to encrypte the created encrypting key, and the encrypting/decrypting unit 17 encryptes the encrypting key by the SIP message encrypting information which is used to the SIP message encrypting to the client apparatus 3-1 (e19 of FIG. 12).

The encrypting information setting unit 11 notifies the call controller 16 of the RTP encrypting information including the encrypted encrypting key between the client apparatus 3-1 and the client apparatus 3-2, and the call controller 16 instructs the SIP message forming unit 14 to create an SIP message, to which the received RTP encrypting information is added, to the client apparatus 3-1. The SIP message forming unit 14 creates the SIP message based on the instruction and transmits the created SIP message to the SIP interface unit 33 of the client apparatus 3-1 through the SIP interface unit 13 (e20 of FIG. 13).

When the SIP interface unit 33 of the client apparatus 3-1 receives the SIP message to which the RTP encrypting information is added, it transfers the SIP message to the SIP message analyzing unit 35, and when the SIP message analyzing unit 35 can confirm that the RTP encrypting information is normal, the SIP interface unit 33 instructs the encrypting/decrypting unit 37 to decrypte the encrypted encrypting key in the received RTP encrypting information. The encrypting/decrypting unit 37 decryptes the encrypted encrypting key (e33 of FIG. 13) and transfers the RTP encrypting information including the decrypted encrypting key to the encrypting information setting unit 31. The encrypting information setting unit 31 stores the RTP encrypting information to the encrypting information table 40 and sets the RTP encrypting information to the encrypting/decrypting unit 37 (e34 of FIG. 13).

The encrypting information setting unit 11 instructs the encrypting/decrypting unit 17 to encrypte the created encrypting key, and the encrypting/decrypting unit 17 encryptes the encrypting key by the SIP message encrypting information used as an SIP message encrypting to the client apparatus 3-2 (e19 of FIG. 12).

The encrypting information setting unit 11 notifies the call controller 16 of the RTP encrypting information including the encrypted encrypting key between the client apparatus 3-1 and the client apparatus 3-2, and the call controller 16 instructs the SIP message forming unit 14 to create an SIP message, to which the RTP encrypting information is added, to the client apparatus 3-2. The SIP message forming unit 14 creates the SIP message based on the instruction and transmits the created SIP message to an SIP interface unit 33 of the client apparatus 3-2 through the SIP interface unit 13 (e21 of FIG. 13).

When the SIP interface unit 33 of the client apparatus 3-2 receives the SIP message to which the RTP encrypting information is added, it transfers the SIP message to the SIP message analyzing unit 35, and when the SIP message analyzing unit 35 can confirm that the RTP encrypting information is normal, the SIP interface unit 33 instructs the encrypting/decrypting unit 37 to decrypte the encrypted encrypting key in the received RTP encrypting information. The encrypting/decrypting unit 37 decryptes the encrypted encrypting key (e41 of FIG. 13) and transfers the RTP encrypting information including the decrypted encrypting key to the encrypting information setting unit 31. The encrypting information setting unit 31 stores the RTP encrypting information to the encrypting information table 40 and sets the RTP encrypting information to the encrypting/decrypting unit 37 (e42 of FIG. 13).

After the call control sequence between the client apparatus 3-1 and the client apparatus 3-2 is completed (e22 of FIG. 13), the RTP controller 39 of the client apparatus 3-1 and the RTP controller 39 of the client apparatus 3-2 transmit and receive the encrypted RTP using the RTP encrypting information set from the server apparatus 1 (e35 of FIG. 13).

The embodiment is advantageous in that security can be enhanced because when the RTP encrypting information is notified from the server apparatus 1, the RTP encrypting key can be securely notified by employing the arrangement and operation described above.

Further, the embodiment has an advantage similar to that of the first embodiment of the present invention described above as an advantage resulting from an RTP encrypting function obtained by the set RTP encrypting information. Note that although how the client apparatus 3-3 is manipulated and operated is not explained above, the client apparatus 3-3 can obtain the same advantage as that when the client apparatuses 3-1, 3-2 are used.

Embodiment 5

FIG. 14 is a view showing an example of arrangement of an encrypting information table on a server apparatus side of a client-server type distributed system according to a fifth embodiment of the present invention, and FIG. 15 is a view showing an example of arrangement of an encrypting information table on a client apparatus side of the client-server type distributed system according to the fifth embodiment of the present invention. Since the client-server type distributed system according to the fifth embodiment of the present invention is arranged similarly to the client-server type distributed system of the first embodiment shown in FIG. 1, and the operation of the client-server type distributed system according to the fifth embodiment of the present invention is the same as that of the fourth embodiment of the present invention shown in FIGS. 12 and 13, explanation of the arrangement and operation thereof is omitted.

In FIG. 14, an encrypting information table 20 of a server apparatus 1 stores an encrypting rule and an encrypting key used to an SIP message encrypting/decrypting processing, in addition to the information stored to the encrypting information table 20 according to the first embodiment of the present invention shown in FIG. 4, and an encrypting/decrypting unit 17 is set such that it uses the encrypting rule and the encrypting key when an SIP message is encrypted and decrypted.

The encrypting information table 20 stores an encrypting rule list to be used to an RTP encrypting/decrypting processing, presence or absence of encrypting, an encrypting rule, and an encrypting key to be used likewise the encrypting information table 20 according to the first embodiment of the present invention shown in FIG. 4, and the encrypting/decrypte unit 17 is set such that it uses the encrypting rule list, the presence or absence of encrypting, the encrypting rule, and the encrypting key to be used when it encryptes and decryptes RTP. Note that although FIG. 14 shows a view in which only one set of the presence or absence of encrypting, the encrypting rule, and the encrypting key which are used to an SIP message encrypting/decrypting processing and an RTP, it is also possible to store a plurality of sets of them as an example, it is also possible to store a plurality of sets of them. In this case, it is also possible to select one set of them from the plurality of sets of them based on a preset priority order or at random.

An encrypting information table 40 of client apparatuses 3-1, 3-2 stores an encrypting rule and an encrypting key to be used to an SIP message encrypting/decrypting processing, in addition to the information stored to the encrypting information table 40 according to the first embodiment of the present invention shown in FIG. 5, and an encrypting/decrypting unit 37 is set such that it can use the encrypting rule and the encrypting key when an SIP message encrypting/decrypting processing is carried out.

Further, the encrypting information table 40 of the client apparatuses 3-1, 3-2 stores an encrypting rule list to be used to an RTP encrypting/decrypting processing, presence or absence of encrypting, an encrypting rule, and an encrypting key to be used likewise the encrypting information table 40 according to the first embodiment of the present invention shown in FIG. 5, and the encrypting/decrypting unit 37 is set such that it uses the encrypting rule list, the presence or absence of encrypting, the encrypting rule, and the encrypting key to be used when it an RTP emcrypts and decryptes RTP. Although FIG. 5 shows a view in which only one set of the presence or absence of encrypting, the encrypting rule, and the encrypting key, which are used to the SIP message encrypting/decrypting processing and the RTP encrypting/decrypting processing, is stores as an example, it is possible to store a plurality of sets of them. In this case, it is also possible to select one set of them from the plurality of sets of them based on a preset priority order or at random.

In the embodiment, it is possible to set the SIP message encrypting information, which is used when an SIP message is transmitted and received between the server apparatus 1 and the client apparatuses 3-1 to 3-3, and the RTP encrypting information, which is used when an RTP communication is carried out, as independent encrypting information by arranging the encrypting information table as described above.

The embodiment is advantageous in that security can be enhanced because the SIP message encrypting information, which is used when the SIP message is transmitted and received between the server apparatus 1 and the client apparatuses 3-1 to 3-3, and the RTP encrypting information, which is used when the RTP communication is carried out, can be set as independent encrypting information by arranging the encrypting information tables 20, 40 as described above as well as by setting the encrypting information as described. Further, the embodiment has the same advantage as that of the first embodiment of the present invention described above as an advantage resulting from the set RTP encrypting information.

Embodiment 6

FIG. 16 to FIG. 19 are sequence charts showing the operation of a client-server type distributed system according to a sixth embodiment of the present invention. Since the client-server type distributed system according to the sixth embodiment of the present invention is arranged similarly to the client-server type distributed system according to the first embodiment of the present invention shown in FIG. 1, explanation of the arrangement thereof is omitted. The operation of the client-server type distributed system according to the sixth embodiment of the present invention will be explained referring to FIGS. 1 and 16 to 19. Note that a CPU of a server apparatus 1 and CPUs of client apparatuses 3-1 to 3-3 shown in FIGS. 16 to 19 carry out the processing of the server apparatus 1 and the processings of the client apparatuses 3-1 to 3-3 shown in FIGS. 16 to 19 by executing programs.

An authentification processing between the server apparatus 1 and the client apparatuses 3-1 to 3-3 is previously completed (f11 to f13 of FIG. 16), SIP message encrypting information is set between the server apparatus 1 and the client apparatus 3-1, between the server apparatus 1 and the client apparatus 3-2, and between the server apparatus 1 and the client apparatus 3-3, and an SIP message encrypting can be securely transmitted and received according to the SIP message encrypting information. In this case, the encrypting capability information of the client apparatuses 3-1 to 3-3 is set to the encrypting information table 20 of the server apparatus 1 (f14 of FIG. 16).

Figure 16:
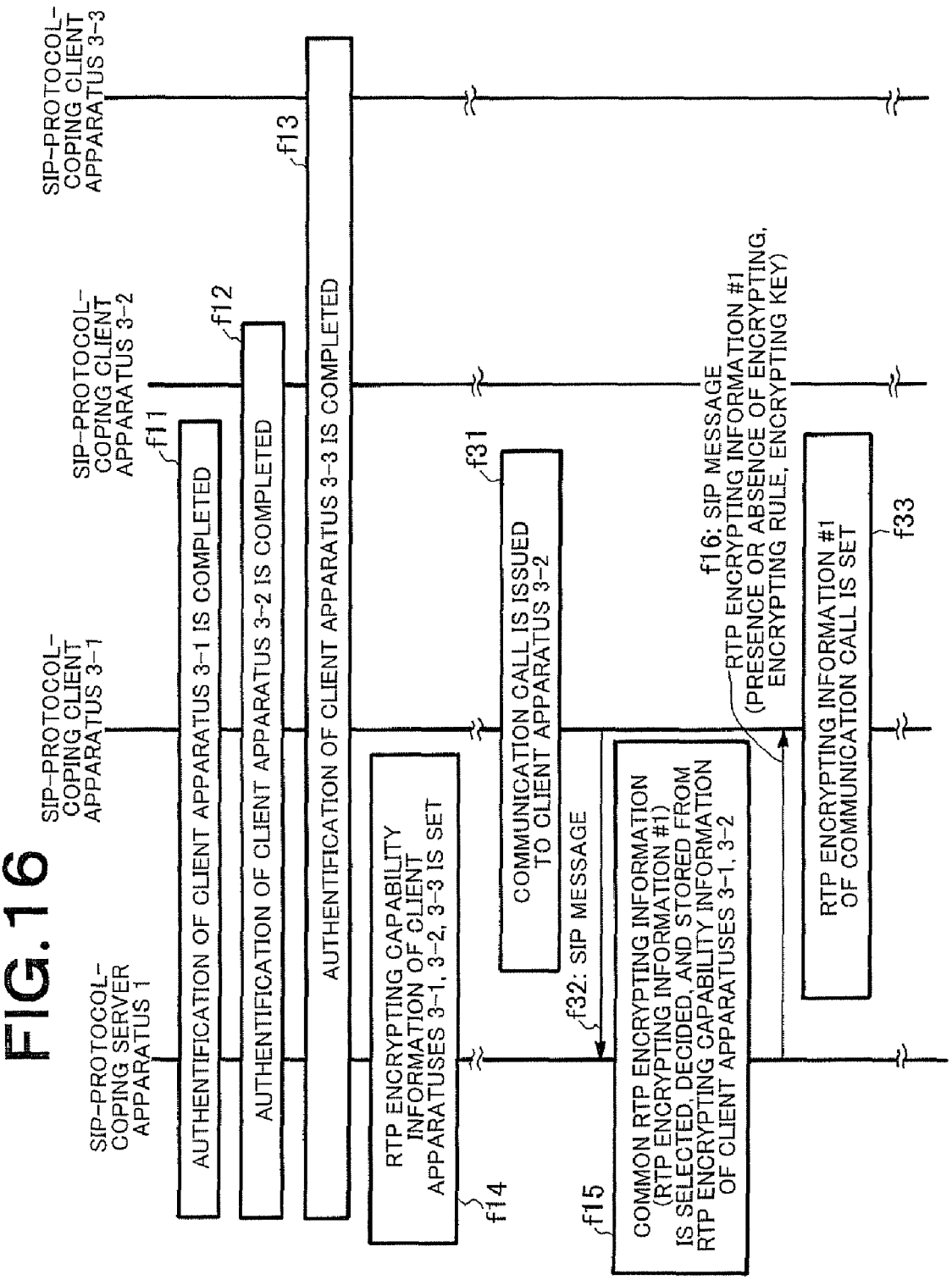
FIG. 16 is a sequence chart showing the operation of a client-server type distributed system according to a sixth embodiment of the present invention.

When a communication call is issued from the client apparatus 3-1 to the client apparatus 3-2 (f31 of FIG. 16), a call controller 36 of the client apparatus 3-1 instructs an SIP message forming unit 34 to create an SIP message for call connection, and the SIP message forming unit 34 creates the SIP message based on the instruction and transmits the created SIP message to an SIP interface unit 13 of the server apparatus 1 through an SIP interface unit 33 (f32 of FIG. 16).

When the SIP interface unit 13 of the server apparatus 1 receives the SIP message for call connection, it transfers the received SIP message to an SIP message analyzing unit 15, and when the SIP message analyzing unit 15 can confirm that the SIP message is normal, the SIP interface unit 13 transfers the SIP message to a call controller 16. The call controller 16 recognizes that an RTP communication is carried out between the client apparatus 3-1 and the client apparatus 3-2 and instructs an encrypting capability management unit 18 to determine RTP encrypting information which is used between the client apparatus 3-1 and the client apparatus 3-2.

The encrypting capability management unit 18 determines the RTP encrypting information between the client apparatus 3-1 and the client apparatus 3-2 by the RTP encrypting capability information of the client apparatuses 3-1, 3-2 stored to the encrypting information table 20 as RTP encrypting information #1 based on the instruction and transfers it to an encrypting information setting unit 11. Further, the encrypting capability management unit 18 stores the determined RTP encrypting information #1 to the encrypting information table 20 as the RTP encrypting information of the respective the client apparatuses 3-1, 3-2 (f15 of FIG. 16).

The encrypting information setting unit 11 notifies the call controller 16 of the determined RTP encrypting information #1 between the client apparatus 3-1 and the client apparatus 3-2, and the call controller 16 instructs an SIP message forming unit 14 to create an SIP message, to which the RTP encrypting information #1 is added, to the client apparatus 3-1. The SIP message forming unit 14 creates the SIP message based on the instruction and transmits the created SIP message to the SIP interface unit 33 of the client apparatus 3-1 through the SIP interface unit 13 (f16 of FIG. 16).

When the SIP interface unit 33 of the client apparatus 3-1 receives the SIP message to which the RTP encrypting information #1 is added, it transfers the SIP message to an SIP message analyzing unit 35, and when the SIP message analyzing unit 35 can confirm that the RTP encrypting information #1 is normal, the SIP interface unit 33 transfers the RTP encrypting information #1 to an encrypting information setting unit 31. The encrypting information setting unit 31 stores the RTP encrypting information #1 to an encrypting information table 40 and sets the RTP encrypting information #1 to an encrypting/decrypting unit 37 (f33 of FIG. 16).

The call controller 16 instructs the SIP message forming unit 14 to create an SIP message, to which the RTP encrypting information #1 between the client apparatus 3-1 and the client apparatus 3-2 is added, to the client apparatus 3-2. The SIP message forming unit 14 creates the SIP message based on the instruction and transmits the created SIP message to the SIP interface unit 33 of the client apparatus 3-2 through the SIP interface unit 13 (f17 of FIG. 17).

When the SIP interface unit 33 of the client apparatus 3-2 receives the SIP message to which the RTP encrypting information #1 is added, it transfers the SIP message to the SIP message analyzing unit 35, and when the SIP message analyzing unit 35 can confirm that the RTP encrypting information #1 is normal, the SIP interface unit 33 transfers the RTP encrypting information #1 to the encrypting information setting unit 31. The encrypting information setting unit 31 stores the RTP encrypting information #1 to the encrypting information table 40 and sets the RTP encrypting information #1 to an encrypting/decrypting unit 37 (f51 of FIG. 17).

Figure 17:
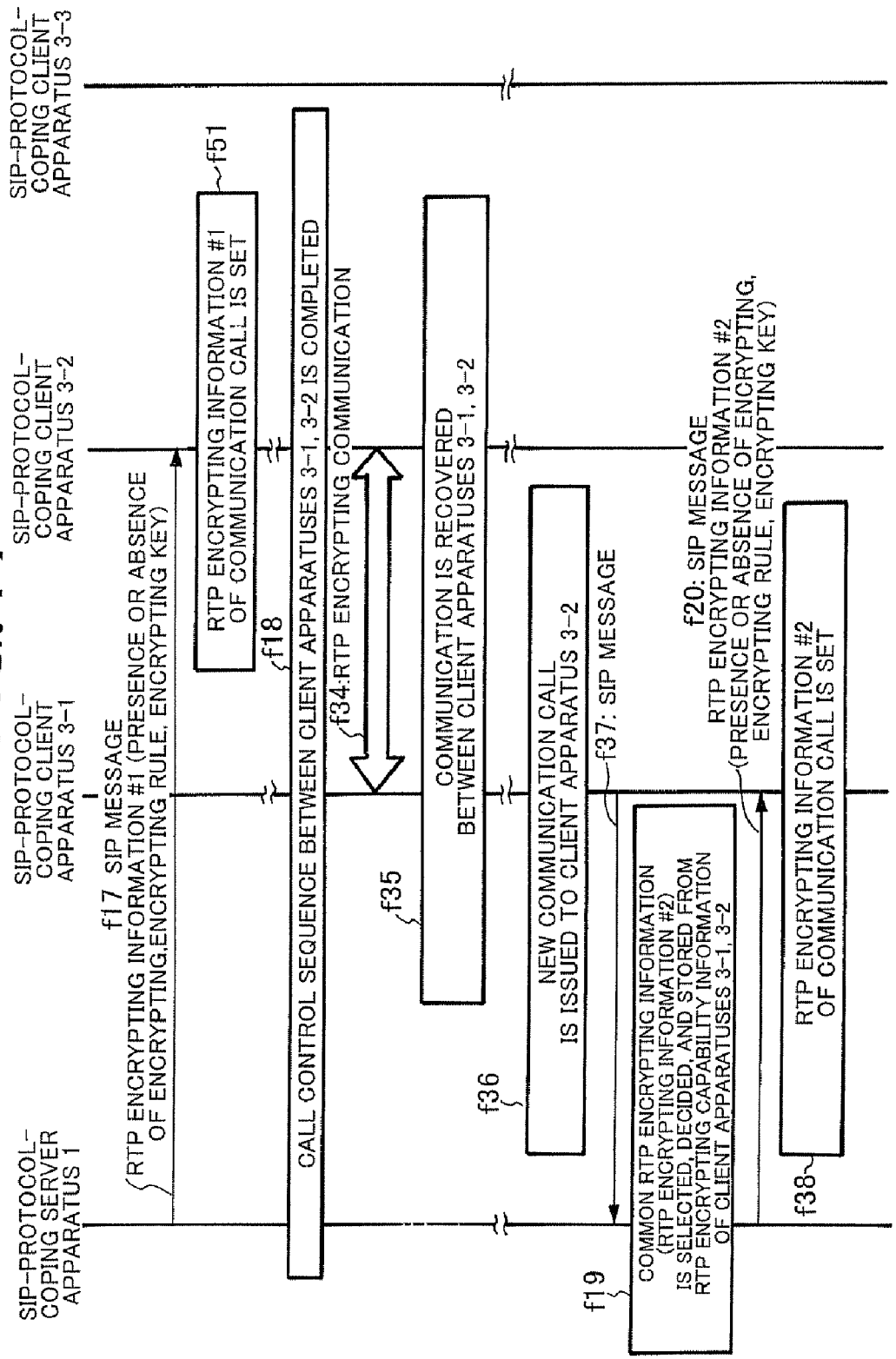
FIG. 17 is a sequence chart showing the operation of the client-server type distributed system according to the sixth embodiment of the present invention.

After the call control sequence between the client apparatus 3-1 and the client apparatus 3-2 is completed (f18 of FIG. 17), an RTP controller 39 of the client apparatus 3-1 and an RTP controller 39 of the client apparatus 3-2 transmit and receive the RTP encrypted using the RTP encrypting information #1 set from the server apparatus 1 (f34 of FIG. 17).

When a new communication call is issued (f36 of FIG. 17) after a communication from the client apparatus 3-1 to the client apparatus 3-2 is recovered once (f35 of FIG. 17), the call controller 36 of client apparatus 3-1 instructs the SIP message forming unit 34 to create an SIP message for call connection, the SIP message forming unit 34 creates the SIP message based on the instruction and transmits the created SIP message to the SIP interface unit 13 of the server apparatus 1 through the SIP interface unit 33 (f37 of FIG. 17).

The SIP interface unit 13 of the server apparatus 1 receives the SIP message for call connection and transfers the received SIP message to the SIP message analyzing unit 15, and when the SIP message analyzing unit 15 can confirm that the SIP message is normal, the SIP interface unit 13 transfers the SIP message to the call controller 16. The call controller 16 recognizes that an RTP communication is carried out between the client apparatus 3-1 and the client apparatus 3-2 and instructs the encrypting capability management unit 18 to determine RTP encrypting information used between the client apparatus 3-1 and the client apparatus 3-2.

The encrypting capability management unit 18 determines the RTP encrypting information between the client apparatus 3-1 and the client apparatus 3-2 as RTP encrypting information #2 by the RTP encrypting capability information of the client apparatuses 3-1, 3-2 stored to the encrypting information table 20 based on the instruction and transfers the RTP encrypting information #2 to the encrypting information setting unit 11. Further, the encrypting capability management unit 18 stores the determined RTP encrypting information #2 to the encrypting information table 20 as the RTP encrypting information of the client apparatuses 3-1, 3-2 (f19 of FIG. 17).

The encrypting information setting unit 11 notifies the call controller 16 of the determined RTP encrypting information #2 between the client apparatus 3-1 and the client apparatus 3-2, and the call controller 16 instructs the SIP message forming unit 14 to create an SIP message, to which the RTP encrypting information #2 is added, to the client apparatus 3-1. The SIP message forming unit 14 creates the SIP message based on the instruction and transmits the created SIP message to the SIP interface unit 33 of the client apparatus 3-1 through the SIP interface unit 13 (f20 of FIG. 17).

When the SIP interface unit 33 of the client apparatus 3-1 receives the SIP message to which the RTP encrypting information #2 is added, it transfers the SIP message to the SIP message analyzing unit 35, and when the SIP message analyzing unit 35 can confirm that the RTP encrypting information #2 is normal, the SIP interface unit 33 transfers the RTP encrypting information #2 to the encrypting information setting unit 31. The encrypting information setting unit 31 stores the RTP encrypting information #2 to the encrypting information table 40 and sets the RTP encrypting information #2 to the encrypting/decrypting unit 37 (f38 of FIG. 17).

The call controller 16 instructs the SIP message forming unit 14 to create an SIP message, to which the RTP encrypting information #2 between the client apparatus 3-1 and the client apparatus 3-2 is added, to the client apparatus 3-2. The SIP message forming unit 14 creates the SIP message based on the instruction and transmits the created SIP message to the SIP interface unit 33 of the client apparatus 3-2 through the SIP interface unit 13 (f21 of FIG. 18).

When the SIP interface unit 33 of the client apparatus 3-2 receives the SIP message to which the RTP encrypting information #2 is added, it transfers the SIP message to the SIP message analyzing unit 35, and when the SIP message analyzing unit 35 can confirm that the RTP encrypting information #2 is normal, the SIP interface unit 33 transfers the RTP encrypting information #2 to the encrypting information setting unit 31. The encrypting information setting unit 31 stores the RTP encrypting information #2 to the encrypting information table 40 and sets the RTP encrypting information #2 to the encrypting/decrypting unit 37 (f52 of FIG. 18).

Figure 18:
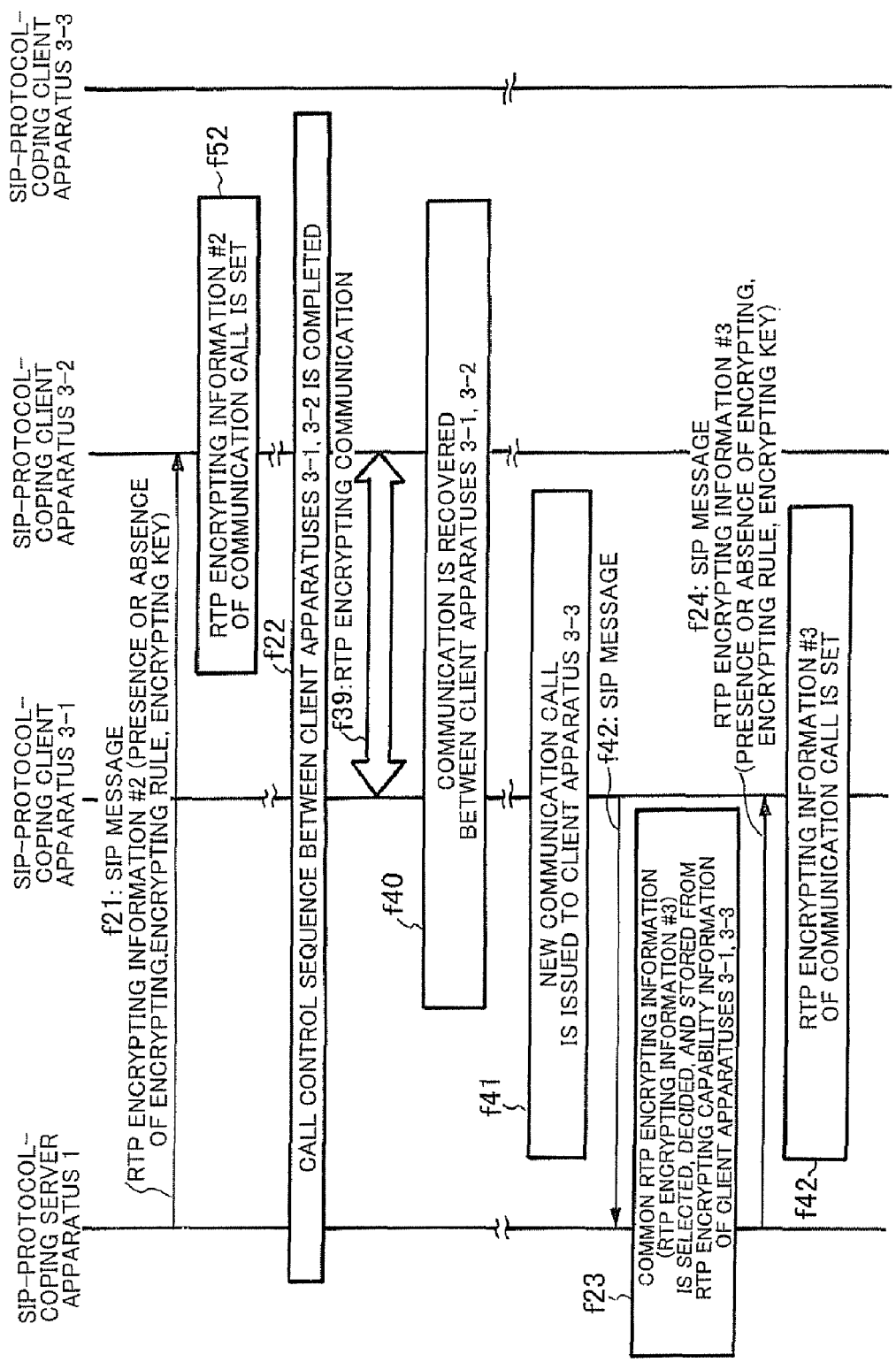
FIG. 18 is a sequence chart showing the operation of the client-server type distributed system according to the sixth embodiment of the present invention.
Figure 19:
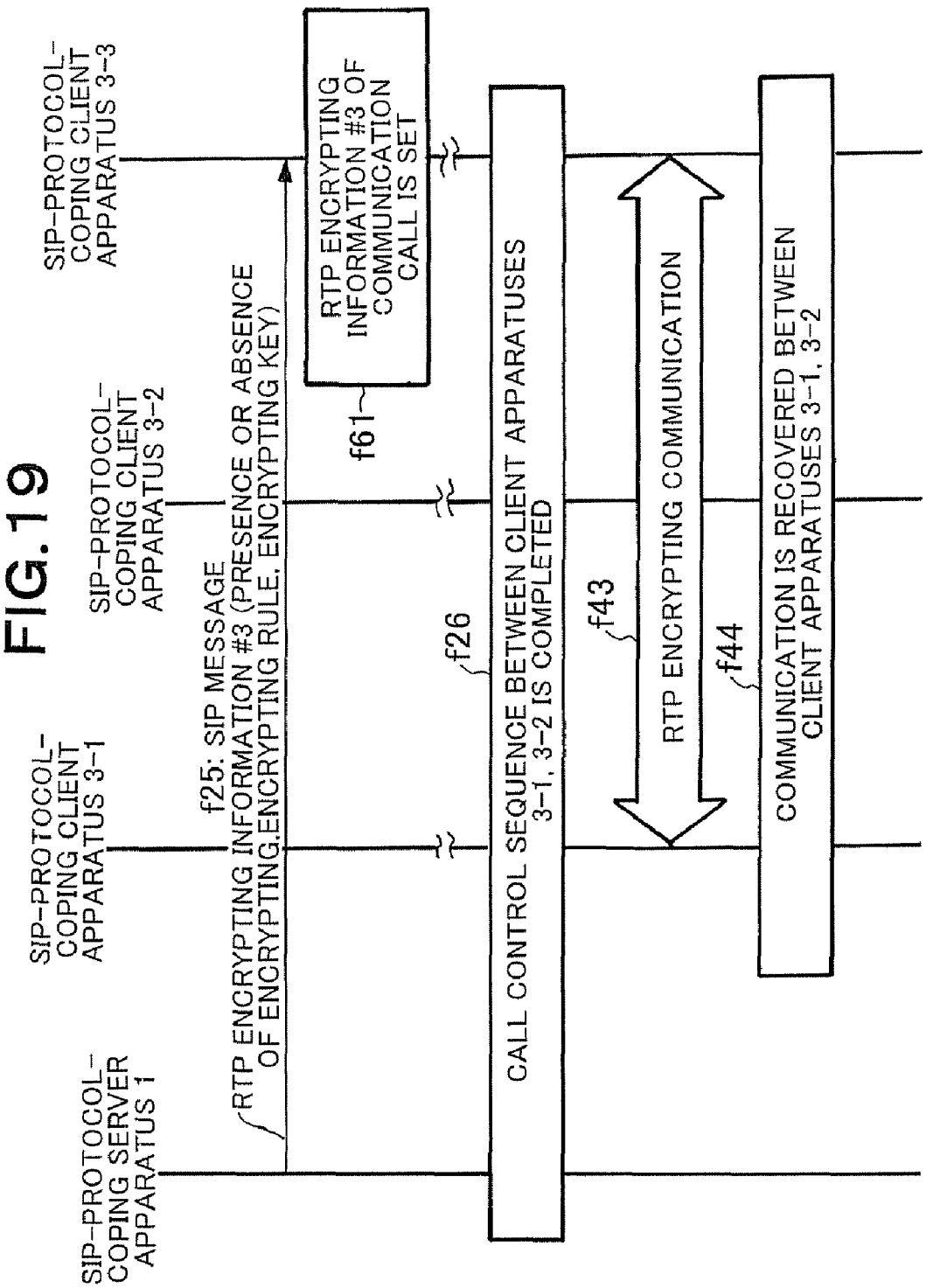
FIG. 19 is a sequence chart showing the operation of the client-server type distributed system according to the sixth embodiment of the present invention.

After the call control sequence between the client apparatus 3-1 and the client apparatus 3-2 is completed (f22 of FIG. 18), the RTP controller 39 of the client apparatus 3-1 and an RTP controller 39 of the client apparatus 3-2 transmit and receive the encrypted RTP set from the server apparatus 1 using the RTP encrypting information #2 (f39 of FIG. 18).

When a communication call is issued from the client apparatus 3-1 to the client apparatus 3-3 (f41 of FIG. 18), the call controller 36 of client apparatus 3-1 instructs the SIP message forming unit 34 to create an SIP message for call connection, the SIP message forming unit 34 creates the SIP message based on the instruction and transmits the created SIP message to the SIP interface unit 13 of the server apparatus 1 through the SIP interface unit 33 (f42 of FIG. 18).

When the SIP interface unit 13 of the server apparatus 1 receives the SIP message for call connection, it transfers the received SIP message to the SIP message analyzing unit 15, and when the SIP message analyzing unit 15 can confirm that the SIP message is normal, the SIP interface unit 13 transfers the SIP message to the call controller 16. The call controller 16 recognizes that an RTP communication is carried out between the client apparatus 3-1 and the client apparatus 3-3 and instructs the encrypting capability management unit 18 to determine RTP encrypting information used between the client apparatus 3-1 and the client apparatus 3-3.

The encrypting capability management unit 18 determines the RTP encrypting information between the client apparatus 3-1 and the client apparatus 3-3 as RTP encrypting information #3 by the RTP encrypting capability information of the client apparatuses 3-1, 3-3 stored to the encrypting information table 20 based on the instruction and transfers the RTP encrypting information #3 to the encrypting information setting unit 11. Further, the encrypting capability management unit 18 stores the determined RTP encrypting information #3 to the encrypting information table 20 as the RTP encrypting information of the client apparatuses 3-1, 3-2 (f23 of FIG. 18).

The encrypting information setting unit 11 notifies the call controller 16 of the RTP encrypting information #3 between the client apparatus 3-1 and the client apparatus 3-3, and the call controller 16 instructs the SIP message forming unit 14 to create an SIP message, to which the RTP encrypting information #3 is added, to the client apparatus 3-1. The SIP message forming unit 14 creates the SIP message based on the instruction and transmits the created SIP message to the SIP interface unit 33 of the client apparatus 3-1 through the SIP interface unit 13 (f24 of FIG. 18).

When the SIP interface unit 33 of the client apparatus 3-1 receives the SIP message to which the RTP encrypting information #3 is added, it transfers the SIP message to the SIP message analyzing unit 35, and when the SIP message analyzing unit 35 can confirm that the RTP encrypting information #3 is normal, the SIP interface unit 33 transfers the RTP encrypting information #3 to the encrypting information setting unit 31. The encrypting information setting unit 31 stores the RTP encrypting information #3 to the encrypting information table 40 and sets the RTP encrypting information #3 to the encrypting/decrypting unit 37 (f42 of FIG. 18).

The call controller 16 instructs the SIP message forming unit 14 to create an SIP message, to which the RTP encrypting information #3 between the client apparatus 3-1 and the client apparatus 3-3 is added, to the client apparatus 3-3. The SIP message forming unit 14 creates the SIP message based on the instruction and transmits the created SIP message to the SIP interface unit 33 of the client apparatus 3-3 through the SIP interface unit 13 (f25 of FIG. 19).

When the SIP interface unit 33 of the client apparatus 3-3 receives the SIP message to which the RTP encrypting information #3 is added, it transfers the SIP message to the SIP message analyzing unit 35, and when the SIP message analyzing unit 35 can confirm that the RTP encrypting information #3 is normal, the SIP interface unit 33 transfers the RTP encrypting information #3 to the encrypting information setting unit 31. The encrypting information setting unit 31 stores the RTP encrypting information #3 to the encrypting information table 40 and sets the RTP encrypting information #3 to the encrypting/decrypting unit 37 (f61 of FIG. 18).

After the call control sequence between the client apparatus 3-1 and the client apparatus 3-3 is completed (f26 of FIG. 18), the RTP controller 39 of the client apparatus 3-1 and an RTP controller 39 of the client apparatus 3-3 transmit and receive the encrypted RTP set from the server apparatus 1 using the RTP encrypting information #3 (f43 of FIG. 18).

In the embodiment, when the RTP communication is carried out between the client apparatuses 3-1 to 3-3, the RTP encrypting information can be changed each time a call is issued by employing the arrangement and operation as described above. As a result, security against interception and the like from the outside can be enhanced by making it difficult to presume the RTP encrypting information from the outside. Further, the embodiment has the same advantage as that of the first embodiment of the present invention described above as an advantage resulting from the set RTP encrypting information.

Embodiment 7

Figure 20:
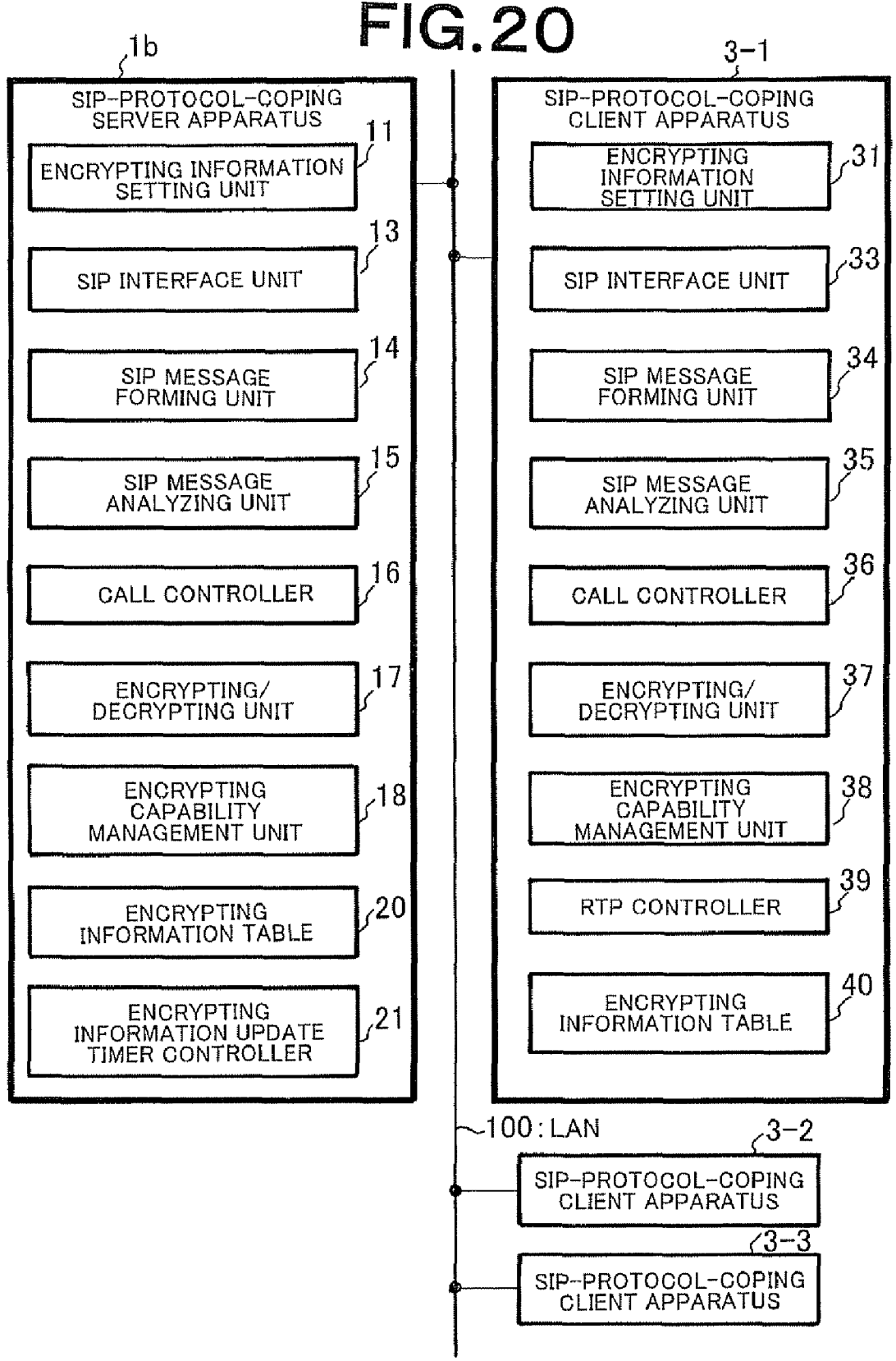
FIG. 20 is a block diagram showing the arrangement of a client-server type distributed system according a seventh embodiment of the present invention.

FIG. 20 is a block diagram showing the arrangement of a client-server type distributed system according to a seventh embodiment of the present invention. In FIG. 20, the client-server type distributed system according to the seventh embodiment of the present invention is arranged similarly to the client-server type distributed system according to the first embodiment of the present invention shown in FIG. 1 except that a server apparatus 1b is additionally provided with an encrypting information update timer controller 21, and the same components are denoted by the same reference numerals.

In the embodiment, since the arrangement and operation as described above are employed, when an RTP communication is carried out between client apparatuses 3-1 to 3-3, RTP encrypting information can be periodically changed using the encrypting information update timer controller 21, As a result, security against interception and the like from the outside can be enhanced by making it difficult to presume the RTP encrypting information from the outside.

Figure 21:
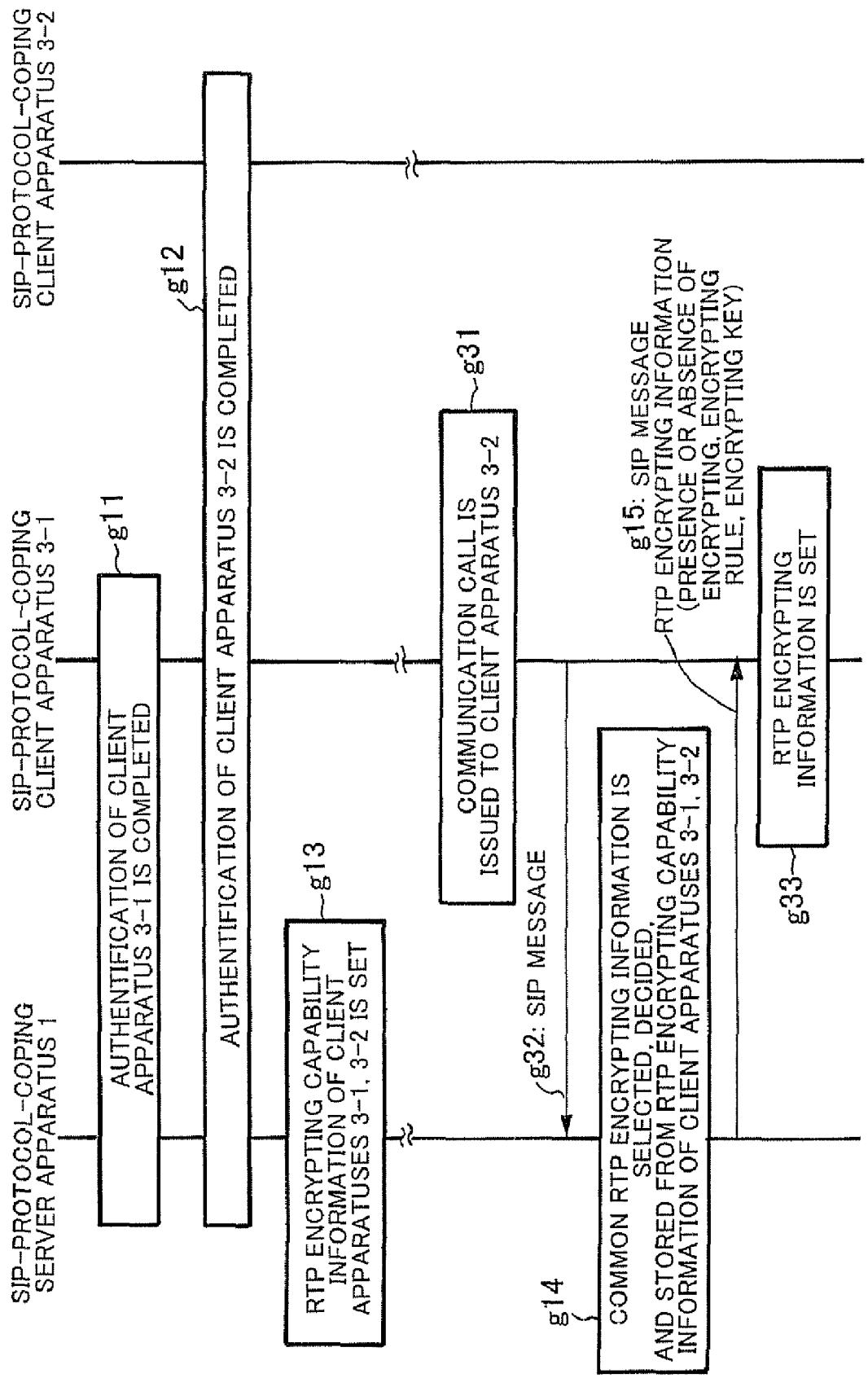
FIG. 21 is a sequence chart showing the operation of the client-server type distributed system according to the seventh embodiment of the present invention.
Figure 22:
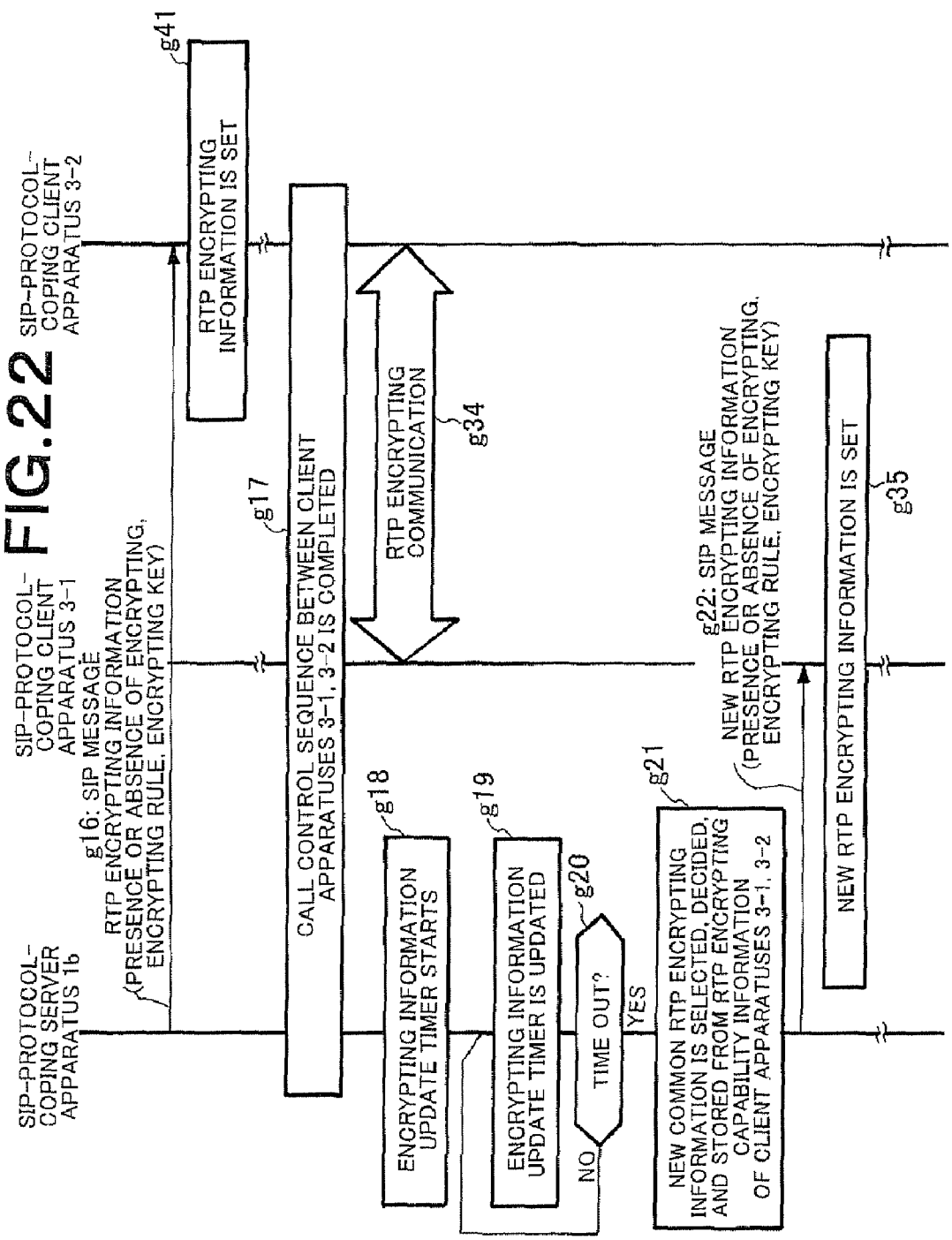
FIG. 22 is a sequence chart showing the operation of the client-server type distributed system according to the seventh embodiment of the present invention.
Figure 23:
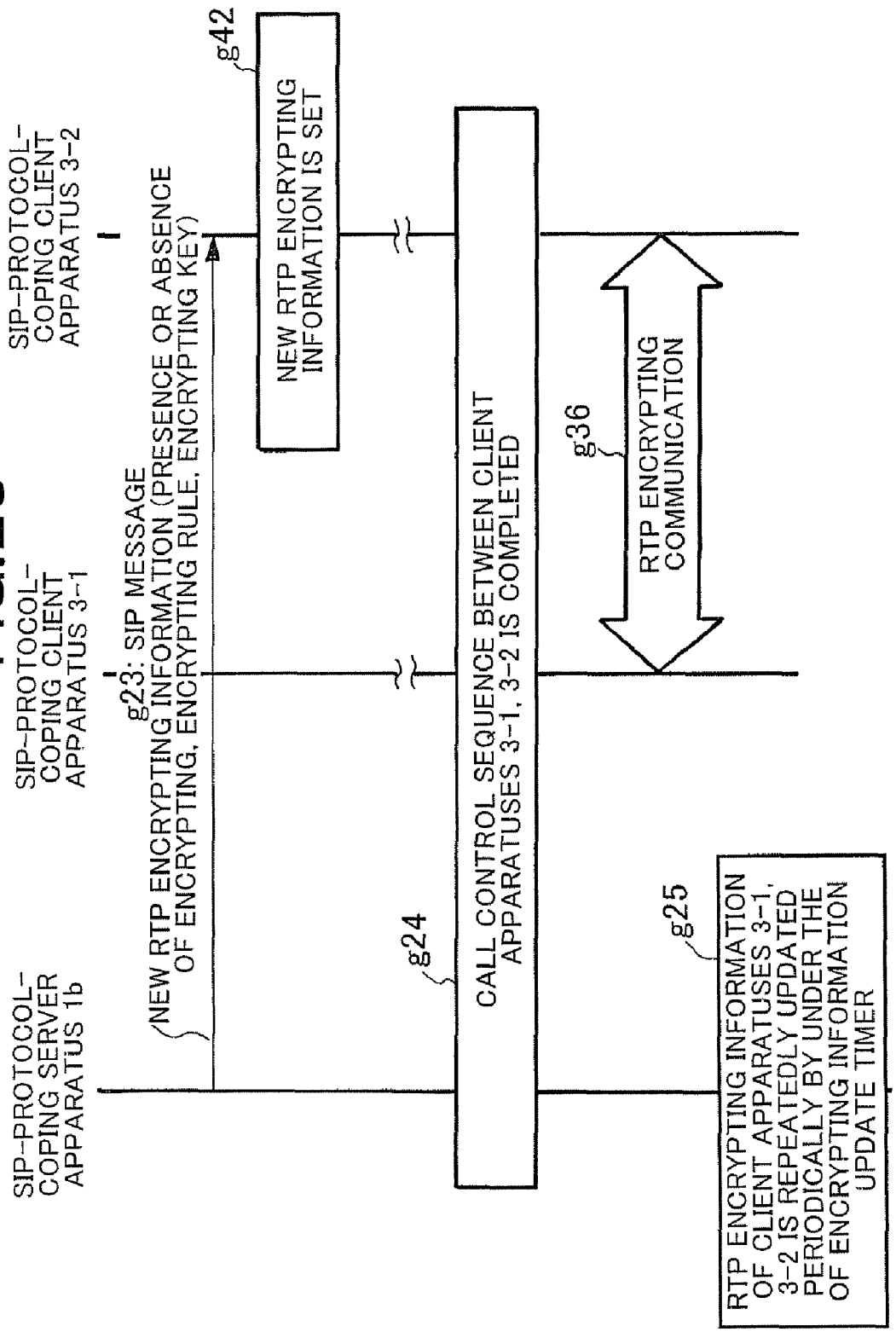
FIG. 23 is a sequence chart showing the operation of the client-server type distributed system according to the seventh embodiment of the present invention.

FIGS. 21 to 23 are sequence charts showing the operation of the client-server type distributed system according to the seventh embodiment of the present invention. The operation of the client-server type distributed system according to the seventh embodiment of the present invention will be explained below referring to FIGS. 20 to 23. Note that A CPU of the server apparatus 1b and CPUs of client apparatuses 3-1, 3-2 carry out the processing of the server apparatus 1b and the processings of the client apparatuses 3-1, 3-2 shown in FIGS. 21 to 23 by executing programs.

An authentification processing between the server apparatus 1b and the client apparatuses 3-1, 3-2 is previously completed (g11, f12 of FIG. 21), SIP message encrypting information is set between the server apparatus 1b and the client apparatus 3-1 and between the server apparatus 1b and the client apparatus 3-2, respectively, and an SIP message encrypting can be securely transmitted and received according to the SIP message encrypting information. In this case, the encrypting capability information of the client apparatuses 3-1, 3-2 is set to an encrypting information table 20 of the server apparatus 1b (g13 of FIG. 21).

When a communication call is issued from the client apparatus 3-1 to the client apparatus 3-2 (g31 of FIG. 21), a call controller 36 of the client apparatus 3-1 instructs an SIP message forming unit 34 to create an SIP message for call connection, and the SIP message forming unit 34 creates the SIP message based on the instruction and transmits the created SIP message to an SIP interface unit 13 of the server apparatus 1b through an SIP interface unit 33 (g32 of FIG. 21).

When the SIP interface unit 13 of the server apparatus 1b receives the SIP message for call connection, it transfers the received SIP message to an SIP message analyzing unit 15, and when the SIP message analyzing unit 15 can confirm that the SIP message is normal, the SIP interface unit 13 transfers the SIP message to a call controller 16. The call controller 16 recognizes that an RTP communication is carried out between the client apparatus 3-1 and the client apparatus 3-2 and instructs an encrypting capability management unit 18 to determine RTP encrypting information which is used between the client apparatus 3-1 and the client apparatus 3-2.

The encrypting capability management unit 18 determines the RTP encrypting information between the client apparatus 3-1 and the client apparatus 3-2 by the RTP encrypting capability information of the client apparatuses 3-1, 3-2 stored to the encrypting information table 20 as RTP encrypting information based on the instruction and transfers it to an encrypting information setting unit 11. Further, the encrypting capability management unit 18 stores the determined RTP encrypting information to the encrypting information table 20 as the RTP encrypting information of the respective the client apparatuses 3-1, 3-2 (g14 of FIG. 21).

The encrypting information setting unit 11 notifies the call controller 16 of the determined RTP encrypting information between the client apparatus 3-1 and the client apparatus 3-2, and the call controller 16 instructs an SIP message forming unit 14 to create an SIP message, to which the RTP encrypting information is added, to the client apparatus 3-1. The SIP message forming unit 14 creates the SIP message based on the instruction SIP message and transmits the created SIP message to the SIP interface unit 33 of the client apparatus 3-1 through the SIP interface unit 13 (g15 of FIG. 21).

When the SIP interface unit 33 of the client apparatus 3-1 receives the SIP message to which the RTP encrypting information is added, it transfers the SIP message to an SIP message analyzing unit 35, and when the SIP message analyzing unit 35 can confirm that the RTP encrypting information is normal, the SIP interface unit 33 transfers the RTP encrypting information to an encrypting information setting unit 31. The encrypting information setting unit 31 stores the RTP encrypting information to an encrypting information table 40 and sets the RTP encrypting information to an encrypting/decrypting unit 37 (g33 of FIG. 21).

The call controller 16 instructs the SIP message forming unit 14 to create an SIP message, to which the RTP encrypting information between the client apparatus 3-1 and the client apparatus 3-2 is added, to the client apparatus 3-2. The SIP message forming unit 14 creates the SIP message based on the instruction and transmits the created SIP message to an SIP interface unit 33 of the client apparatus 3-2 through the SIP interface unit 13 (g16 of FIG. 22).

When the SIP interface unit 33 of the client apparatus 3-2 receives the SIP message to which the RTP encrypting information is added, it transfers the SIP message to the SIP message analyzing unit 35, and when the SIP message analyzing unit 35 can confirm that the RTP encrypting information is normal, the SIP interface unit 33 transfers the RTP encrypting information to an encrypting information setting unit 31. The encrypting information setting unit 31 stores the RTP encrypting information to the encrypting information table 40 and sets the RTP encrypting information to the encrypting/decrypting unit 37 (g41 of FIG. 22).

After the call control sequence between the client apparatus 3-1 and the client apparatus 3-2 is completed (g17 of FIG. 22), an RTP controller 39 of the client apparatus 3-1 and an RTP controller 39 of the client apparatus 3-2 transmit and receive the encrypted RTP set from the server apparatus 1b using the RTP encrypting information (g34 of FIG. 22).

The encrypting information update timer controller 21 of the server apparatus 1b initializes and starts an encrypting information update timer having an arbitrary timer value (g18 of FIG. 22). Thereafter, the encrypting information update timer controller 21 continuously repeats update and monitor of time-out of the encrypting information update timer (g19, g20 of FIG. 22).

When the encrypting information update timer controller 21 recognizes that the encrypting information update timer is time-out, it notifies the encrypting information setting unit 11 that the encrypting information update timer is time-out. The encrypting information setting unit 11 instructs the encrypting capability management unit 18 to determine new RTP encrypting information which is used between the client apparatus 3-1 and the client apparatus 3-2.

The encrypting capability management unit 18 determines the new RTP encrypting information between the client apparatus 3-1 and the client apparatus 3-2 by the RTP encrypting capability information of the client apparatuses 3-1, 3-2 stored to the encrypting information table 20 based on the instruction and transfers it to the encrypting information setting unit 11. Further, the encrypting capability management unit 18 stores the determined new RTP encrypting information to the encrypting information table 20 as the RTP encrypting information of the client apparatuses 3-1, 3-2 (g21 of FIG. 22).

The encrypting information setting unit 11 notifies the call controller 16 of the determined new RTP encrypting information between the client apparatus 3-1 and the client apparatus 3-2, and the call controller 16 instructs the SIP message forming unit 14 to create an SIP message, to which the new RTP encrypting information is added, to the client apparatus 3-1. The SIP message forming unit 14 creates the SIP message based on the instruction and transmits the created SIP message to the SIP interface unit 33 of the client apparatus 3-1 through the SIP interface unit 13 (g22 of FIG. 22).

When the SIP interface unit 33 of the client apparatus 3-1 receives the new SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (g35 of FIG. 22).

The call controller 16 instructs the SIP message forming unit 14 to create an SIP message, to which the new RTP encrypting information between the client apparatus 3-1 and the client apparatus 3-2 is added, to the client apparatus 3-2. The SIP message forming unit 14 creates the SIP message based on the instruction and transmits the created SIP message to the SIP interface unit 33 of the client apparatus 3-2 through the SIP interface unit 13 (g23 of FIG. 23).

When the SIP interface unit 33 of the client apparatus 3-2 receives the SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (g42 of FIG. 23).

After the call control sequence between the client apparatuses 3-1, 3-2 is completed (g24 of FIG. 23), the RTP controller 39 of the client apparatus 3-1 and the RTP controller 39 of the client apparatus 3-2 continue transmission and reception of the encrypted RTP using the new RTP encrypting information set from the server apparatus 1. (g36 of FIG. 23).

Thereafter, in the embodiment, the RTP encrypting information of the client apparatuses 3-1, 3-2 is periodically repeatedly updated by controlling the encrypting information update timer and changing setting to the new RTP encrypting information (g25 of FIG. 23).

In the embodiment, when an RTP communication is carried out between the client apparatuses 3-1, 3-2, since the RTP encrypting information can be periodically changed by employing the arrangement and operation described above, the embodiment is advantageous in that security against interception and the like from the outside can be enhanced by making it difficult to presume the RTP encrypting information from the outside.

Further, the embodiment has the same advantage as that of the first embodiment of the present invention described above as an advantage resulting from the set RTP encrypting information. Although how the client apparatus 3-3 is manipulated and operated is not explained above, the client apparatus 3-3 can obtain the same advantage as that when the client apparatuses 3-1, 3-2 are used.

Embodiment 8

Figure 24:
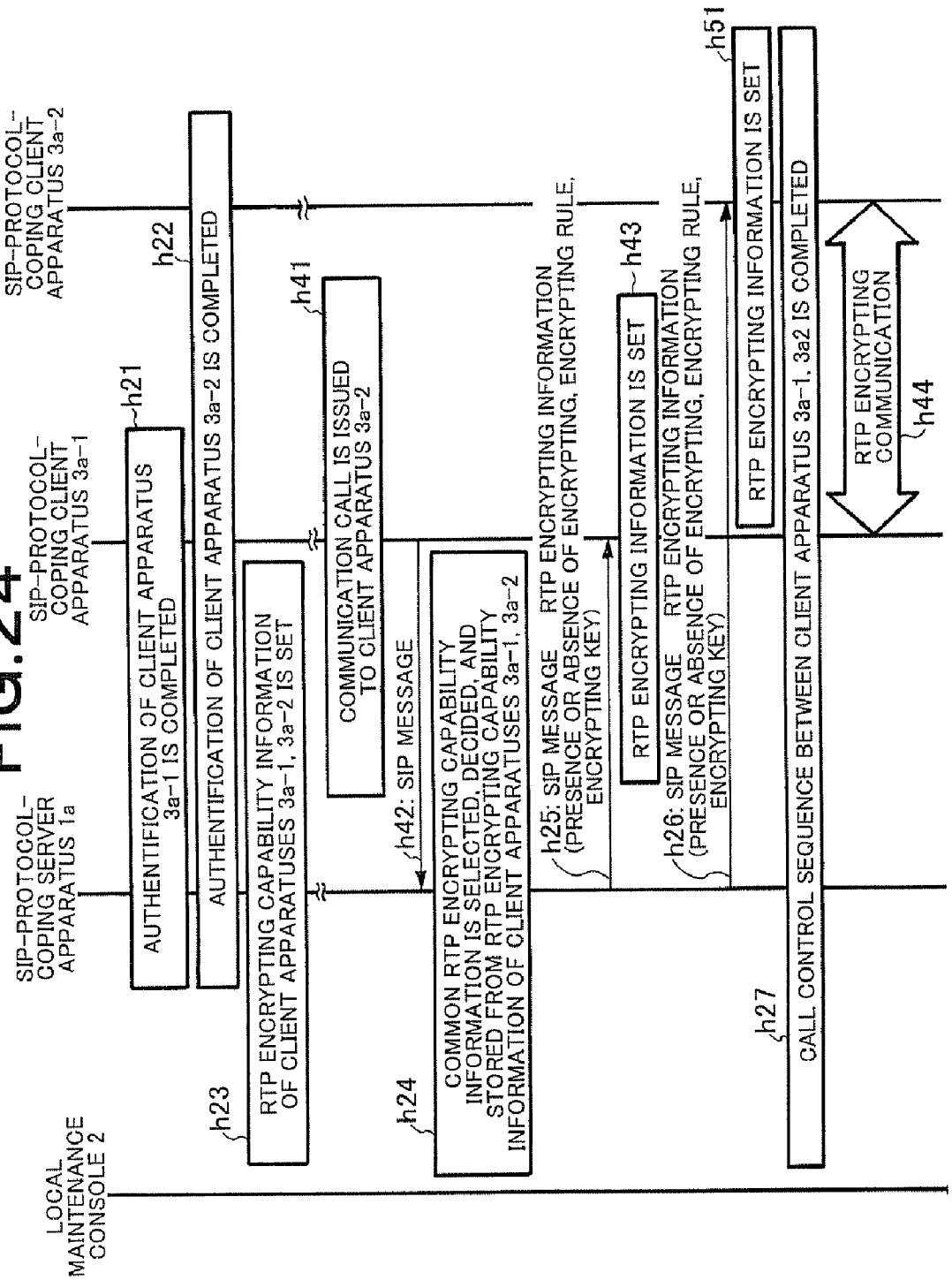
FIG. 24 is a sequence chart showing the operation of a client-server type distributed system according to an eighth embodiment of the present invention.
Figure 25:
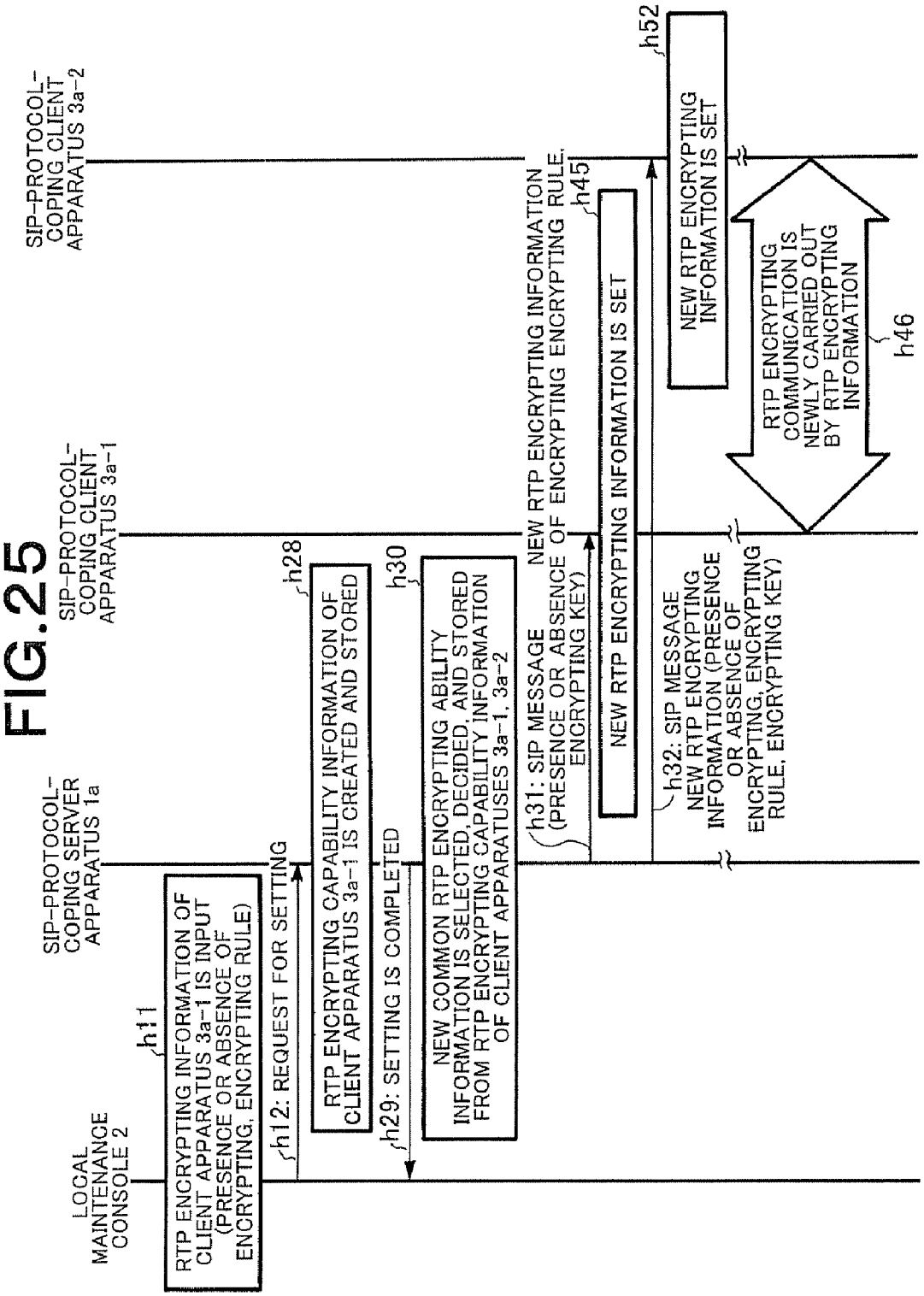
FIG. 25 is a sequence chart showing the operation of the client-server type distributed system according to the eighth embodiment of the present invention.
Figure 26:
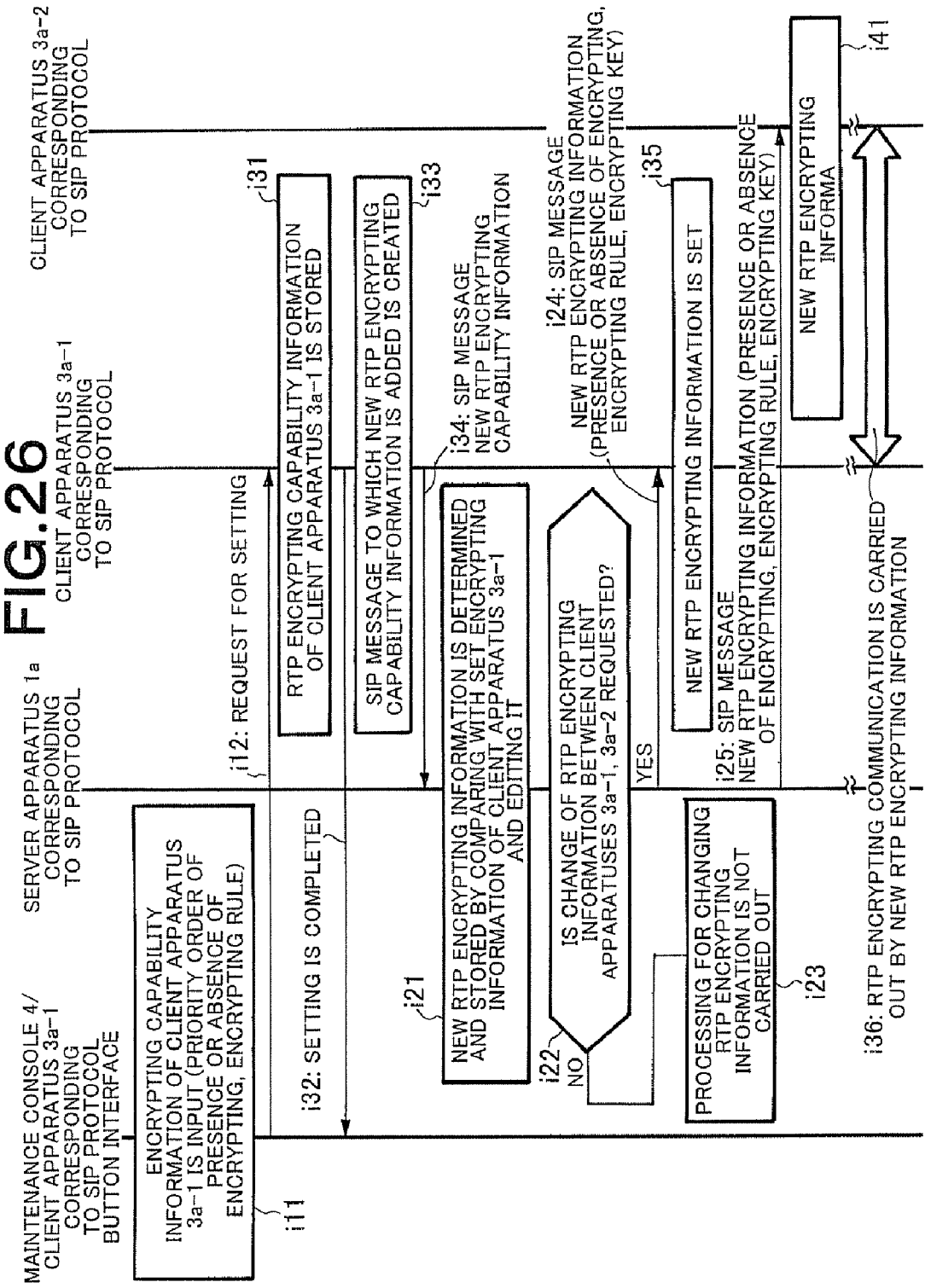
FIG. 26 is a sequence chart showing the operation of the client-server type distributed system according to the eighth embodiment of the present invention.

FIG. 24 to FIG. 26 are sequence charts showing the operation of a client-server type distributed system according to an eighth embodiment of the present invention. Since the client-server type distributed system according to the eighth embodiment of the present invention is arranged similarly to the client-server type distributed system according to the second embodiment of the present invention shown in FIG. 6, explanation of the arrangement thereof is omitted. The operation of the client-server type distributed system according to the eighth embodiment of the present invention will be explained below referring to FIGS. 6 and 24 to 26. Note that a CPU of a server apparatus 1b and CPUs of client apparatuses 3a-1, 3a-2 carry out the processing of the server apparatus 1a and the processings of the client apparatuses 3a-1, 3a-2 shown in FIGS. 24 to 26 by executing programs.

Authentification processings between the server apparatus 1a and the client apparatuses 3a-1, 3a-2 are previously completed (h21, h22 of FIG. 24), SIP message encrypting information is set between the server apparatus 1a and the client apparatus 3a-1 and between the server apparatus 1a and the client apparatus 3a-2, and an SIP message encrypting can be securely transmitted and received according to the SIP message encrypting information. In this case, the encrypting capability information of the client apparatuses 3a-1, 3a-2 is set to an encrypting information table 20 of the server apparatus 1a (h23 of FIG. 24).

When a communication call is issued from the client apparatus 3a-1 to the client apparatus 3a-2 (h41 of FIG. 24), a call controller 36 of the client apparatus 3a-1 instructs an SIP message forming unit 34 to create an SIP message for call connection, and the SIP message forming unit 34 creates the SIP message based on the instruction and transmits the created SIP message to an SIP interface unit 13 of the server apparatus 1a through an SIP interface unit 33 (h42 of FIG. 24).

When the SIP interface unit 13 of the server apparatus 1a receives the SIP message for call connection, it transfers the received SIP message to an SIP message analyzing unit 15, and when the SIP message analyzing unit 15 can confirm that the SIP message is normal, the SIP interface unit 13 transfers the SIP message to a call controller 16. The call controller 16 recognizes that an RTP communication is carried out between the client apparatus 3a-1 and the client apparatus 3a-2 and instructs an encrypting capability management unit 18 to determine RTP encrypting information which is used between the client apparatus 3a-1 and the client apparatus 3a-2.

The encrypting capability management unit 18 determines the RTP encrypting information between the client apparatus 3a-1 and the client apparatus 3a-2 by the respective pieces of the RTP encrypting capability information of the client apparatuses 3a-1, 3a-2 stored to the encrypting information table 20 as RTP encrypting information based on the instruction and transfers it to an encrypting information setting unit 11. Further, the encrypting capability management unit 18 stores the determined RTP encrypting information to the encrypting information table 20 as the RTP encrypting information of the respective client apparatuses 3a-1, 3a-2 (h24 of FIG. 24).

The encrypting information setting unit 11 notifies the call controller 16 of the determined RTP encrypting information between the client apparatus 3a-1 and the client apparatus 3a-2, and the call controller 16 instructs an SIP message forming unit 14 to create an SIP message, to which the RTP encrypting information is added, to the client apparatus 3a-1. The SIP message forming unit 14 creates the SIP message based on the instruction SIP message and transmits the created SIP message to the SIP interface unit 33 of the client apparatus 3a-1 through the SIP interface unit 13 (h25 of FIG. 24).

When the SIP interface unit 33 of the client apparatus 3a-1 receives the SIP message to which the RTP encrypting information is added, it transfers the SIP message to an SIP message analyzing unit 35, and when the SIP message analyzing unit 35 can confirm that the RTP encrypting information is normal, the SIP interface unit 33 transfers the RTP encrypting information to an encrypting information setting unit 31. The encrypting information setting unit 31 stores the RTP encrypting information to an encrypting information table 40 and sets the RTP encrypting information to an encrypting/decrypting unit 37 (h43 of FIG. 24).

The call controller 16 instructs the SIP message forming unit 14 to create an SIP message, to which the RTP encrypting information between the client apparatus 3a-1 and the client apparatus 3a-2 is added, to the client apparatus 3a-2. The SIP message forming unit 14 creates the SIP message based on the instruction and transmits the created SIP message to the SIP interface unit 33 of the client apparatus 3a-2 through the SIP interface unit 13 (h26 of FIG. 24).

When the SIP interface unit 33 of the client apparatus 3a-2 receives the SIP message to which the RTP encrypting information is added, it transfers the SIP message to the SIP message analyzing unit 35, and when the SIP message analyzing unit 35 can confirm that the RTP encrypting information is normal, the SIP interface unit 33 transfers the RTP encrypting information to the encrypting information setting unit 31. The encrypting information setting unit 31 stores the RTP encrypting information to an encrypting information table 40 and sets the RTP encrypting information to the encrypting/decrypting unit 37 (h51 of FIG. 22).

After the call control sequence between the client apparatus 3a-1 and the client apparatus 3a-2 is completed (h27 of FIG. 24), an RTP controller 39 of the client apparatus 3a-1 and an RTP controller 39 of the client apparatus 3a-2 transmit and receive the encrypted RTP set from the server apparatus 1a using the RTP encrypting information (h44 of FIG. 24).

As shown in FIG. 25, when the new RTP encrypting information of the client apparatus 3a-1 is input from a local maintenance console 2 connected to the server apparatus 1a (h11, h12 of FIG. 25) at the time new RTP encrypting information is set by an external input to the server apparatus 1a, an encrypting information input interface unit 12 receives a request for setting including the RTP encrypting information, and when it can be confirmed that the request for setting is normal, the encrypting information input interface unit 12 transfers the RTP encrypting information to the encrypting capability management unit 18.

The encrypting capability management unit 18, which has received the RTP encrypting information, edits the RTP encrypting capability information including the RTP encrypting rule list held by the client apparatus 3a-1, creates new the RTP encrypting capability information, and transfers it to the encrypting information setting unit 11. Further, the encrypting capability management unit 18 stores the new the RTP encrypting capability information to the encrypting information table 20 (h28 of FIG. 25) and notifies the local maintenance console 2 that the setting is completed (h29 of FIG. 25).

Further, the encrypting capability management unit 18 compares the RTP encrypting information, which is set between the client apparatus 3a-1 and the client apparatus 3a-2 with which the client apparatus 3a-1 is being in communication, with new RTP encrypting capability information, determines new RTP encrypting information between the client apparatus 3a-1 and the client apparatus 3a-2, and records it to the encrypting information table 20 (h30 of FIG. 25). In this case, the encrypting capability management unit 18 notifies the encrypting information setting unit 11 of the new RTP encrypting information.

The encrypting information setting unit 11 notifies the call controller 16 of the determined new RTP encrypting information between the client apparatus 3a-1 and the client apparatus 3a-2, and the call controller 16 instructs the SIP message forming unit 14 to create an SIP message, to which the new RTP encrypting information is added, to the client apparatus 3a-1. The SIP message forming unit 14 creates the SIP message based on the instruction and transmits the created SIP message to the SIP interface unit 33 of the client apparatus 3a-1 through the SIP interface unit 13 (h31 of FIG. 25).

When the SIP interface unit 33 of the client apparatus 3a-1 receives the SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (h45 of FIG. 25).

The call controller 16 instructs the SIP message forming unit 14 to create an SIP message, to which the new RTP encrypting information between the client apparatus 3a-1 and the client apparatus 3a-2 is added, to the client apparatus 3a-2. The SIP message forming unit 14 creates the SIP message based on the instruction and transmits the created SIP message to the SIP interface unit 33 of the client apparatus 3a-2 through the SIP interface unit 13 (h32 of FIG. 25).

When the SIP interface unit 33 of the client apparatus 3a-2 receives the SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (h52 of FIG. 25).

After the call control sequence between the client apparatus 3a-1 and the client apparatus 3a-2 is completed, an RTP controller 39 of the client apparatus 3a-1 and an RTP controller 39 of the client apparatus 3a-2 transmit and receive the encrypted RTP using the new RTP encrypting information set from the server apparatus 1a (h46 of FIG. 25).

As shown in FIG. 26, when the new RTP encrypting capability information of the client apparatus 3a-1 is input from a local maintenance console 4 connected to the client apparatus 3a-1 or from a button interface of the client apparatus 3a-1 (i11, a12 of FIG. 26) at the time new RTP encrypting information is set by an external input to the client apparatus 3a-1, an encrypting information input interface unit 32 receives a request for setting including the RTP encrypting capability information and transfers the RTP encrypting capability information to an encrypting capability management unit 38 when it can be confirmed that the request for setting is normal.

The encrypting capability management unit 38, which has received the RTP encrypting capability information, edits the RTP encrypting capability information including the RTP encrypting rule list held by the client apparatus 3a-1, creates new the RTP encrypting capability information, and transfers it to the encrypting information setting unit 31. Further, the encrypting capability management unit 38 stores the new the RTP encrypting capability information to the encrypting information table 40 (i31 of FIG. 26) and notifies the local maintenance console 4 or the button interface of the client apparatus 3a-1 that the setting is completed (i32 of FIG. 26).

Further, the encrypting capability management unit 38 compares the RTP encrypting information, which is between the client apparatus 3a-1 and the client apparatus 3a-2 with which the client apparatus 3a-1 is being in communication, with new RTP encrypting capability information, determines new the RTP encrypting information between the client apparatus 3a-1 and the client apparatus 3a-2, and records it to the encrypting information table 40. Further, the encrypting capability management unit 38 notifies the encrypting information setting unit 31 of the new RTP encrypting information.

The SIP message forming unit 34 of the client apparatus 3a-1 creates an SIP message to which new RTP encrypting capability information is added (i33 of FIG. 26) and transmits the created SIP message to the SIP interface unit 13 of the server apparatus 1a through the SIP interface unit 33 (i34 of FIG. 26).

When the SIP interface unit 13 of the server apparatus 1a receives the SIP message to which the new RTP encrypting capability information is added, it transfers the SIP message to the SIP message analyzing unit 15, and when the SIP message analyzing unit 15 can confirm that the RTP encrypting capability information is normal, the SIP interface unit 13 notifies the encrypting capability management unit 18 of the new RTP encrypting capability information.

The encrypting capability management unit 18 updates the RTP encrypting capability information of the client apparatus 3a-1 in the encrypting information table 40 and compares the RTP encrypting information, which is used between the client apparatus 3a-1 and the client apparatus 3a-2, with the new encrypting capability information of the client apparatus 3a-1 (i22 of FIG. 26) and determines new RTP encrypting information when it is necessary to change the RTP encrypting information. Further, the encrypting capability management unit 18 stores the RTP encrypting information to the encrypting information table 40 and notifies the encrypting information setting unit 11 of it. However, when the encrypting capability management unit 18 need not change the RTP encrypting information, it does not carry out the processing for changing the RTP encrypting information (i23 of FIG. 26).

The encrypting information setting unit 11 notifies the call controller 16 of the determined new RTP encrypting information between the client apparatus 3a-1 and the client apparatus 3a-2, and the call controller 16 instructs the SIP message forming unit 14 to create an SIP message, to which the new RTP encrypting information is added, to the client apparatus 3a-1. The SIP message forming unit 14 creates the SIP message based on the instruction and transmits the created the SIP message to the SIP interface unit 33 of the client apparatus 3a-1 through the SIP interface unit 13 (i24 of FIG. 26).

When the SIP interface unit 33 of the client apparatus 3a-1 receives the SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (i35 of FIG. 26).

The call controller 16 instructs the SIP message forming unit 14 to create an SIP message, to which the new RTP encrypting information between the client apparatus 3a-1 and the client apparatus 3a-2 is added, to the client apparatus 3a-2. The SIP message forming unit 14 creates the SIP message based on the instruction and transmits the created SIP message to the SIP interface unit 33 of the client apparatus 3a-2 through the SIP interface unit 13 (i25 of FIG. 26).

When the SIP interface unit 33 of the client apparatus 3a-2 receives the SIP message to which the new RTP encrypting information is added, it transfers the SIP message to the SIP message analyzing unit 35, and when the SIP message analyzing unit 35 can confirm that the new RTP encrypting information is normal, the SIP interface unit 33 transfers the new RTP encrypting information to the encrypting information setting unit 31. The encrypting information setting unit 31 stores the new RTP encrypting information to the encrypting information table 40 and sets the new RTP encrypting information to the encrypting/decrypting unit 37 (i41 of FIG. 26).

After the new RTP encrypting information is set to both the client apparatus 3a-1 and the client apparatus 3a-2, the RTP controller 39 of the client apparatus 3a-1 and the RTP controller 39 of the client apparatus 3a-2 transmit and receive the encrypted RTP using the new RTP encrypting information set from the server apparatus 1a (i36 of FIG. 26).

When an RTP communication is carried out between the client apparatuses 3a-1 and 3a-2, since the RTP encrypting information can be changed at an arbitrary timing by employing the arrangement and operation described above, the embodiment is advantageous in that security against interception and the like can be enhanced by making it difficult to presume the RTP encrypting information from the outside. Further, since a maintenance person can change the encrypting information at an arbitrary timing, the embodiment is advantageous in that easiness of maintenance can be enhanced.

Further, the embodiment has the same advantage as that of the first embodiment of the present invention described above as an advantage resulting from the set RTP encrypting information. Note that although how the client apparatus 3-3 is manipulated and operated is not explained above, the client apparatus 3-3 can obtain the same advantage as that when the client apparatuses 3-1, 3-2 are used.

Embodiment 9

FIGS. 27 to 29 are sequence charts showing the operation of a client-server type distributed system according to a ninth embodiment of the present invention. Since the client-server type distributed system according to the ninth embodiment of the present invention is arranged similarly to the client-server type distributed system according to the second embodiment of the present invention shown in FIG. 6, explanation of the arrangement thereof is omitted. The operation of the client-server type distributed system according to the ninth embodiment of the present invention will be explained below referring to FIGS. 6 and 27 to 29. Note that a CPU of a server apparatus 1a and CPUs of client apparatus 3a-1, 3a-2 shown in FIGS. 27 to 29 carry out the processing of the server apparatus 1a and the processings of the client apparatus 3a-1, 3a-2 by executing programs.

When the client apparatus 3a-1 instructs an encrypting information input/output interface unit 32 to display the RTP encrypting capability information which can be realized by an encrypting capability information management unit 38 itself in response to an external instruction or at an arbitrary timing (j41 of FIG. 27), the encrypting information input/output interface unit 32 requests a maintenance console 4 to display the encrypting capability information output of the client apparatus 3a-1 (j42 of FIG. 27).

When the presence or absence of encrypting in the encrypting capability information being displayed is changed or the priority order of encrypting rules in use is input from the maintenance console 4 by a maintenance person (j11 of FIG. 27), the maintenance console 4 notifies the encrypting information input/output interface unit 32 of the client apparatus 3a-1 of a request for setting the RTP encrypting capability information (presence or absence of encrypting, the priority order of the encrypting rules) (j12 of FIG. 27).

The encrypting information input/output interface unit 32 transfers the received RTP encrypting capability information to an encrypting capability management unit 38, the encrypting capability management unit 38 creates an encrypting rule list from the received RTP encrypting capability information and notifies an encrypting information setting unit 31 of it. The encrypting information setting unit 31 stores the received RTP encrypting capability information to an encrypting information table 40 (j43 of FIG. 27).

The client apparatus 3a-2 requests the maintenance console 4 to display an encrypting capability information output by the same procedure as above (j51, j52 of FIG. 27), receives the RTP encrypting capability information of itself from the maintenance console 4, and stores it to an encrypting information table 3a(j13, j14, j53 of FIG. 27).

It is assumed that authentification is completed between the server apparatus 1a and the client apparatus 3a-1 and between the server apparatus 1a and the client apparatus 3a-2 at an arbitrary timing up to now from the start of operation of the client apparatuses 3a-1, 3a-2 (j21, j22 of FIG. 28).

An SIP message forming unit 34 of the client apparatus 3a-1 creates an SIP message to which the RTP encrypting capability information is added and transmits the created SIP message to an SIP interface unit 13 of the server apparatus 1a through an SIP interface unit 33 (j44 of FIG. 28).

When the SIP interface unit 13 of the server apparatus 1a receives the SIP message to which the RTP encrypting capability information is added, it transfers the SIP message to an SIP message analyzing unit 15, and when the SIP message analyzing unit 15 can confirm that the RTP encrypting capability information is normal, the SIP interface unit 13 notifies an encrypting capability management unit 18 of the RTP encrypting capability information.

The encrypting capability management unit 18 checks whether or not the RTP encrypting capability information of the client apparatus 3a-1 has been set to an encrypting information table 20 (j23 of FIG. 28). When the encrypting information table 20 includes the RTP encrypting capability information having been set thereto, the encrypting capability management unit 18 compares the RTP encrypting capability information with the received RTP encrypting capability information and edits it, newly creates RTP encrypting capability information by which the client apparatus 3a-1 can be securely operated (j24 of FIG. 28), stores the RTP encrypting capability information to the encrypting information table 20 (j25 of FIG. 28), and notifies the encrypting information setting unit 11 of it. Further, when the encrypting information table 20 includes no RTP encrypting capability information having been set thereof, the encrypting capability management unit 18 stores the RTP encrypting capability information received from the client apparatus 3a-1 to the encrypting information table 20 (j25 of FIG. 28).

Further, since an SIP message forming unit 34 of the client apparatus 3a-2 creates an SIP message to which the RTP encrypting capability information is added and transmits it to the SIP interface unit 13 of the server apparatus 1a by the same procedure as above (j54 of (FIG. 28), the RTP encrypting capability information is stored to the encrypting information table 20 of the server apparatus 1a (j26 to j28 of FIG. 28).

When a communication call is issued from the client apparatus 3a-1 to the client apparatus 3a-2 (j46 of FIG. 29), a call controller 36 of the client apparatus 3a-1 instructs the SIP message forming unit 34 to create an SIP message for call connection, the SIP message forming unit 34 creates the SIP message based on the instruction and transmits the created SIP message to the SIP interface unit 13 of the server apparatus 1a through the SIP interface unit 33 (j47 of FIG. 29).

When the SIP interface unit 13 of the server apparatus 1a receives the SIP message for call connection, it transfers the SIP message to the SIP message analyzing unit 15. When the SIP message analyzing unit 15 can confirm that the SIP message is normal, the SIP interface unit 13 transfers the SIP message to a call controller 16. The call controller 16 recognizes that an RTP communication is carried out between the client apparatus 3a-1 and the client apparatus 3a-2 and instructs an encrypting capability management unit 18 to determine RTP encrypting information which is used between the client apparatus 3a-1 and the client apparatus 3a-2.

The encrypting capability management unit 18 determines the RTP encrypting information between the client apparatus 3a-1 and the client apparatus 3a-2 based on the instruction by the RTP encrypting capability information of the client apparatuses 3a-1, 3a-2 stored to the encrypting information table 20 and transfers the RTP encrypting information to the encrypting information setting unit 11. Further, the encrypting capability management unit 18 stores the determined RTP encrypting information to the encrypting information table 20 as the RTP encrypting information of the client apparatuses 3a-1, 3a-2 (j29 of FIG. 29).

The encrypting information setting unit 11 creates an encrypting key which is used in the RTP encrypting between the client apparatus 3a-1 and the client apparatus 3a-2 and stores to the encrypting information table 1a it as the RTP encrypting information of the client apparatuses 3a-1, 3a-2.

The encrypting information setting unit 11 notifies the call controller 16 of the RTP encrypting information including the created encrypting key between the client apparatus 3a-1 and the client apparatus 3a-2, and the call controller 16 instructs the SIP message forming unit 14 to create an SIP message, to which the RTP encrypting information is added, to the client apparatus 3a-1. The SIP message forming unit 14 creates the SIP message based on the instruction and transmits the created SIP message to the SIP interface unit 33 of the client apparatus 3a-1 through the SIP interface unit 13 (j30 of FIG. 29).

When the SIP interface unit 33 of the client apparatus 3a-1 receives the SIP message which the RTP encrypting information is added, it transfers the SIP message to an SIP message analyzing unit 35, and when the SIP message analyzing unit 35 confirms that the RTP encrypting information is normal, the SIP interface unit 33 transfers the RTP encrypting information to the encrypting information setting unit 31. The encrypting information setting unit 31 stores the RTP encrypting information to the encrypting information table 40 and sets the RTP encrypting information to an encrypting/decrypting unit 37 (j47 of FIG. 29).

The call controller 16 instructs the SIP message forming unit 14 to create an SIP message, to which the RTP encrypting information between the client apparatus 3a-1 and the client apparatus 3a-2 is added, to the client apparatus 3a-2. The SIP message forming unit 14 creates the SIP message based on the instruction and transmits the created SIP message to the SIP interface unit 33 of the client apparatus 3a-2 through the SIP interface unit 13 (j31 of FIG. 29).

When the SIP interface unit 33 of the client apparatus 3a-2 receives the SIP message to which the RTP encrypting information is added, it transfers the SIP message to the SIP message analyzing unit 35. When the SIP message analyzing unit 35 confirms that the RTP encrypting information is normal, the SIP interface unit 33 transfers the RTP encrypting information to the encrypting information setting unit 31. The encrypting information setting unit 31 stores the RTP encrypting information to the encrypting information table 40 and sets the RTP encrypting information to the encrypting/decrypting unit 37 (j56 of FIG. 29).

After the call control sequence between the client apparatus 3a-1 and the client apparatus 3a-2 is completed (j32 of FIG. 29), an RTP controller 39 of the client apparatus 3a-1 and an RTP controller 39 of the client apparatus 3a-2 transmit and receive the encrypted RTP using the RTP encrypting information set from the server apparatus 1a (j48 of FIG. 29).

In the embodiment, a maintenance person or a user can notify the encrypting information, which can be used to the RTP encrypting, from the client apparatus 3a-1 to the server apparatus 1a, and the server apparatus 1a can manage the RTP encrypting capability information between the client apparatuses 3a-1, 3a-2 and automatically instruct the RTP encrypting information, which can be realized by the confronting client apparatuses 3a-1, 3a-2 without fail, to them when an RTP communication is carried out between the client apparatuses 3a-1, 3a-2 by realizing the arrangement and operation described above. As a result, the user can effectively realize an encrypting security function without being conscious of the encrypting rule between the client apparatuses 3a-1, 3a-2 having a plurality of types of encrypting capabilities.

Further, the embodiment has the same advantages as those of the first and second embodiments of the present invention described above as advantages resulting from the set RTP encrypting information. Note that although how the client apparatus 3a-3 is manipulated and operated is not explained above, the client apparatus 3a-3 can obtain the same advantage as that when the client apparatuses 3a-1, 3a-2 are used.

Embodiment 10

FIG. 30 is a sequence chart showing the operation of a client-server type distributed system according to a tenth embodiment of the present invention. Since the client-server type distributed system according to the tenth embodiment of the present invention is arranged similarly to the client-server type distributed system according to the first embodiment of the present invention shown in FIG. 1, explanation of the arrangement thereof is omitted. The operation of the client-server type distributed system according to the tenth embodiment of the present invention will be explained below referring to FIGS. 1 and 30. Note that a CPU of a server apparatus 1 and CPUs of client apparatuses 3-1, 3-2 carry out the processing of the server apparatus 1 and the processings of the client apparatuses 3-1, 3-2 shown in FIG. 30 by executing programs.

Authentification processings between the server apparatus 1 and the client apparatuses 3-1, 3-2 are previously completed (k11, k12 of FIG. 30), SIP message encrypting information is set between the server apparatus 1 and the client apparatus 3-1 and between the server apparatus 1 and the client apparatus 3-2, respectively, and an SIP message encrypting can be securely transmitted and received according to the SIP message encrypting information. In this case, the encrypting capability information of the client apparatuses 3-1, 3-2 is set to an encrypting information table 20 of the server apparatus 1 (k13 of FIG. 30).

When a communication call is issued from the client apparatus 3-1 to the client apparatus 3-2 (k21 of FIG. 30), a call controller 36 of the client apparatus 3-1 instructs an SIP message forming unit 34 to create an SIP message for call connection, and the SIP message forming unit 34 creates the SIP message based on the instruction and transmits the created SIP message to an SIP interface unit 13 of the server apparatus 1 through an SIP interface unit 33 (k22 of FIG. 30).

When the SIP interface unit 13 of the server apparatus 1 receives the SIP message for call connection, it transfers the received SIP message to an SIP message analyzing unit 15. When the SIP message analyzing unit 15 can confirm that the SIP message is normal, the SIP interface unit 13 transfers the SIP message to a call controller 16. The call controller 16 recognizes that an RTP communication is carried out between the client apparatus 3-1 and the client apparatus 3-2 and instructs an encrypting capability management unit 18 to determine RTP encrypting information which is used between the client apparatus 3-1 and the client apparatus 3-2.

When the encrypting capability management unit 18 selects the RTP encrypting information between the client apparatus 3-1 and the client apparatus 3-2 by the RTP encrypting capability information of the client apparatuses 3-1, 3-2 stored to the encrypting information table 20 based on the instruction and determines that no encrypting exists as a result, it transfers the fact that no encrypting exists to an encrypting information setting unit 11. Further, the encrypting capability management unit 18 stores the determined fact that no encrypting exists to the encrypting information table 20 as the RTP encrypting information of the client apparatuses 3-1, 3-2 (k14 of FIG. 30).

The encrypting information setting unit 11 notifies the call controller 16 of the determined information that no encrypting exists between the client apparatus 3-1 and the client apparatus 3-2, and the call controller 16 instructs an SIP message forming unit 14 to create an SIP message, to which the information indicating that no encrypting exists (call connection is impossible) is added, to the client apparatus 3-1. The SIP message forming unit 14 creates the SIP message based on the instruction SIP message and transmits the created SIP message to the SIP interface unit 33 of the client apparatus 3-1 through the SIP interface unit 13 (k15 of FIG. 30).

When the SIP interface unit 33 of the client apparatus 3-1 receives the SIP message to which the information indicating that no encrypting exists (call connection is impossible) is added, it transfers the SIP message to an SIP message analyzing unit 35, and when the SIP message analyzing unit 35 can confirm that the information indicating that no encrypting exists is normal, the SIP interface unit 33 transfers the information indicating that no encrypting exists to an encrypting information setting unit 31. The encrypting information setting unit 31 stores the RTP encrypting information to an encrypting information table 40 and sets the information indicating that no encrypting exists to an encrypting/decrypting unit 37 (k33 of FIG. 30).

The call controller 16 instructs the SIP message forming unit 14 to create an SIP message, to which the information indicating that no encrypting exists (call connection is impossible) between the client apparatus 3-1 and the client apparatus 3-2 is added, to the client apparatus 3-2. The SIP message forming unit 14 creates the SIP message based on the instruction and transmits the created SIP message to an SIP interface unit 33 of the client apparatus 3-2 through the SIP interface unit 13 (k16 of FIG. 30).

When the SIP interface unit 33 of the client apparatus 3-2 receives the SIP message to which the information indicating that no encrypting exists (call connection is impossible) is added, it transfers the SIP message to the SIP message analyzing unit 35, and when the SIP message analyzing unit 35 can confirm that the information indicating that no encrypting exists is normal, the SIP interface unit 33 transfers the information indicating that no encrypting exists to the encrypting information setting unit 31. The encrypting information setting unit 31 stores the information indicating that no encrypting exists to an encrypting information table 40 and sets the information indicating that no encrypting exists to the encrypting/decrypting unit 37 (k31 of FIG. 30).

After the call control sequence between the client apparatus 3-1 and the client apparatus 3-2 is completed (k17 of FIG. 30), an RTP controller 39 of the client apparatus 3-1 and an RTP controller 39 of the client apparatus 3-2 do not carry out an RTP communication because it is notified to them that a call connection is impossible.

In the embodiment, the server apparatus 1 determines whether an encrypting exists or not when an RTP communication is carried out between the client apparatuses 3-1, 3-2 by employing the arrangement and operation described above, and when no encrypting exists, it is notified to the client apparatuses 3-1, 3-2 that a call connection is impossible. As a result, the embodiment is advantageous in that it is possible to easily cope with an environment in which a client apparatus having the function of the present invention and a client apparatus not having the function of the present invention are mixed under the control of the server apparatus 1.

Further, the embodiment has the same advantages as that of the first embodiment of the present invention described above as an advantage resulting from the set RTP encrypting information. Note that although how the client apparatus 3-3 is manipulated and operated is not explained above, the client apparatus 3a-3 can obtain the same advantage as that when the client apparatuses 3-1, 3-2 are used.

Embodiment 11

FIGS. 31 to 33 are sequence charts showing the operation of a client-server type distributed system according to an eleventh embodiment of the present invention. Since the client-server type distributed system according to the eleventh embodiment of the present invention is arranged similarly to the client-server type distributed system according to the second embodiment of the present invention shown in FIG. 6, explanation of the arrangement thereof is omitted. The operation of the client-server type distributed system according to the eleventh embodiment of the present invention will be explained below referring to FIGS. 6 and 31 to 33. Note that a CPU of a server apparatus 1a and CPUs of client apparatus carry out the processing of the server apparatus 1a and the processings of the client apparatus 3a-1, 3a-2 3a-1, 3a-2 shown in FIG. 31 to 33 by executing programs. Further, FIGS. 31 to 33 show an example in which setting is carried out from the server apparatus 1a side.

Authentification processings between the server apparatus 1a and the client apparatuses 3a-1, 3a-2 are previously completed (121, 122 of FIG. 31), SIP message encrypting information is set between the server apparatus 1a and the client apparatus 3a-1 and between the server apparatus 1a and the client apparatus 3a-2, respectively, and an SIP message encrypting can be securely transmitted and received according to the SIP message encrypting information.

When it is previously set from a local maintenance console 2 connected to the server apparatus 1a that the client apparatus 3a-1 is permitted or not permitted to carry out a communication without RTP encrypting (111, 112 of FIG. 31), an encrypting information input interface unit 12 receives a request for setting including the RTP encrypting information, and when it can be confirmed that the request for the setting is normal, the RTP encrypting information is transferred to an encrypting capability management unit 18.

The encrypting capability management unit 18, which has received the RTP encrypting information, creates RTP encrypting capability information including the setting for permitting or not permitting the communication without RTP encrypting of the client apparatus 3a-1 and transmits it to an encrypting information setting unit 11. Further, the encrypting capability management unit 18 stores the RTP encrypting capability information to an encrypting information table 20 (b23 of FIG. 7) and notifies the local maintenance console 2 that the setting is completed through the encrypting information input interface unit 12 (124 of FIG. 31).

Further, when it is set from the local maintenance console 2 that the client apparatus 3a-2 is permitted or not permitted to carry out a communication without RTP encrypting by the same procedure as above (113, 114 FIG. 31), the RTP encrypting capability information of the client apparatus 3a-2 is created and stored to the encrypting information table 20 of the server apparatus 1a (125 of FIG. 31), and it is notified to the local maintenance console 2 through the encrypting information input interface unit 12 that the setting is completed (126 of FIG. 31).

When a communication call is issued from the client apparatus 3a-1 to the client apparatus 3a-2 (141 of FIG. 32), a call controller 36 of the client apparatus 3a-1 instructs an SIP message forming unit 34 to create an SIP message for call connection, and the SIP message forming unit 34 creates the SIP message based on the instruction and transmits the created SIP message to an SIP interface unit 13 of the server apparatus 1a through an SIP interface unit 33 (142 of FIG. 32).

When the SIP interface unit 13 of the server apparatus 1a receives the SIP message for call connection, it transfers the received SIP message to an SIP message analyzing unit 15. When the SIP message analyzing unit 15 can confirm that the SIP message is normal, the SIP interface unit 13 transfers the SIP message to a call controller 16. The call controller 16 recognizes that an RTP communication is carried out between the client apparatus 3a-1 and the client apparatus 3a-2 and instructs the encrypting capability management unit 18 to determine RTP encrypting information which is used between the client apparatus 3a-1 and the client apparatus 3a-2.

The encrypting capability management unit 18 determines the RTP encrypting information between the client apparatus 3a-1 and the client apparatus 3a-2 as information without encrypting by the RTP encrypting capability information of both the client apparatuses 3a-1, 3a-2 stored to the encrypting information table 20 based on the instruction and transfers it to the encrypting information setting unit 11. Further, the encrypting capability management unit 18 stores the determined RTP encrypting information to the encrypting information table 20 as the RTP encrypting information of the respective client apparatuses 3a-1, 3a-2 (127 of FIG. 32).

The encrypting information setting unit 11 determines whether the communication without encrypting of the client apparatuses 3a-1, 3a-2 stored to the encrypting information table 20 is permitted or not (128 of FIG. 32), and when the communication without encrypting of the client apparatus 3a-1 or the client apparatus 3a-2 is permitted, the encrypting information setting unit 11 notifies the call controller 16 of the determined RTP encrypting information (without encrypting) between the client apparatus 3a-1 and the client apparatus 3a-2, and the call controller 16 instructs an SIP message forming unit 14 to create an SIP message, to which the RTP encrypting information (without encrypting) is added, to the client apparatus 3a-1. The SIP message forming unit 14 creates the SIP message based on the instruction and transmits the created SIP message to the SIP interface unit 33 of the client apparatus 3*a*-1 through the SIP interface unit 13 (l29 of FIG. 32).

When the SIP interface unit 33 of the client apparatus 3*a*-1 receives the SIP message to which the RTP encrypting information (without encrypting) is added, it transfers the SIP message to an SIP message analyzing unit 35. When the SIP message analyzing unit 35 can confirm that the RTP encrypting information is normal, the SIP interface unit 33 transfers the RTP encrypting information (without encrypting) to an encrypting information setting unit 31. The encrypting information setting unit 31 stores the RTP encrypting information (without encrypting) to an encrypting information table 40 and sets the RTP encrypting information (without encrypting) to an encrypting/decrypting unit 37 (l43 of FIG. 32).

In contrast, the call controller 16 instructs the SIP message forming unit 14 to create an SIP message, to which the RTP encrypting information (without encrypting) between the client apparatus 3*a*-1 and the client apparatus 3*a*-2 is added, to the client apparatus 3*a*-2. The SIP message forming unit 14 creates the SIP message based on the instruction and transmits the created SIP message to an SIP interface unit 33 of the client apparatus 3*a*-2 through the SIP interface unit 13 (130 of FIG. 32).

When the SIP interface unit 33 of the client apparatus 3*a*-2 receives the SIP message to which the RTP encrypting information (without encrypting) is added, it transfers the SIP message to the SIP message analyzing unit 35. When the SIP message analyzing unit 35 can confirm that the RTP encrypting information is normal, the SIP interface unit 33 transfers the RTP encrypting information (without encrypting) to the encrypting information setting unit 31. The encrypting information setting unit 31 stores the RTP encrypting information (without encrypting) to the client side encrypting information table 40 and sets the RTP encrypting information (without encrypting) to the encrypting/decrypting unit 37 (l51 of FIG. 32).

After the call control sequence between the client apparatus 3*a*-1 and the client apparatus 3*a*-2 is completed (131 of FIG. 32), an RTP controller 39 of the client apparatus 3*a*-1 and an RTP controller 39 of the client apparatus 3*a*-2 carry out an RTP communication using the RTP encrypting information (without encrypting) set from the server apparatus 1*a* (144 of FIG. 32).

The encrypting information setting unit 11 determines whether the RTP communication without encrypting of the client apparatuses 3*a*-1, 3*a*-2 stored to the encrypting information table 20 is permitted or not (128 of FIG. 32), and when the RTP communication without encrypting of the client apparatus 3*a*-1 or 3*a*-2 is not permitted, the encrypting information setting unit 11 notifies the call controller 16 of the determined encrypting information without encrypting between the client apparatus 3*a*-1 and the client apparatus 3*a*-2, and the call controller 16 instructs the SIP message forming unit 14 to create an SIP message, to which the encrypting information without encrypting (call connection is not permitted) is added, to the client apparatus 3*a*-1. The SIP message forming unit 14 creates the SIP message based on the instruction and transmits the created SIP message to the SIP interface unit 33 of the client apparatus 3*a*-1 through the SIP interface unit 13 (l29 of FIG. 32).

When the SIP interface unit 33 of the client apparatus 3*a*-1 receives the SIP message to which the information without encrypting (call connection is not permitted) is added, it transfers the SIP message to the SIP message analyzing unit 35. When the SIP message analyzing unit 35 can confirm that the information without encrypting is normal, the SIP interface unit 33 transfers the information without encrypting to the encrypting information setting unit 31. The encrypting information setting unit 31 stores the RTP encrypting information to the encrypting information table 40 and sets the information without encrypting to the encrypting/decrypting unit 37 (l45 of FIG. 33).

The call controller 16 instructs the SIP message forming unit 14 to create an SIP message, to which the information without encrypting (call connection is not permitted) between the client apparatus 3*a*-1 and the client apparatus 3*a*-2 is added, to the client apparatus 3*a*-2. The SIP message forming unit 14 creates the SIP message based on the instruction and transmits the created SIP message to the SIP interface unit 33 of the client apparatus 3*a*-2 through the SIP interface unit 13 (l33 of FIG. 33).

When the SIP interface unit 33 of the client apparatus 3*a*-2 receives the SIP message to which the information without encrypting (call connection is not permitted) is added, it transfers the received SIP message to the SIP message analyzing unit 35. When the SIP message analyzing unit 35 can confirm that the information without encrypting is normal, the SIP interface unit 33 transfers the information without encrypting to the encrypting information setting unit 31. The encrypting information setting unit 31 stores the information without encrypting to the encrypting information table 40 and sets the information without encrypting to the encrypting/decrypting unit 37 (l52 of FIG. 33).

Since the RTP controller 39 of the client apparatus 3*a*-1 and the RTP controller 39 of the client apparatus 3*a*-2 are notified that the call connection is not permitted after the call control sequence between the client apparatus 3*a*-1 and the client apparatus 3*a*-2 is completed (l34 of FIG. 33), they do not carry of the RTP communication.

In the embodiment, when an RTP communication is carried out between the client apparatuses 3*a*-1, 3*a*-2, whether a communication without encrypting is permitted or not is set to the server apparatus 1 from the local maintenance console 2, and when the communication without encrypting is not permitted, it is notified to the client apparatuses 3*a*-1, 3*a*-2 that a call connection is not permitted by employing the arrangement and operation described above. As a result, the embodiment is advantageous in that it is possible to easily cope with an environment in which a client apparatus having the function of the present invention and a client apparatus not having the function of the present invention are mixed under the control of the server apparatus 1.

Further, the embodiment has the same advantages as that of the first embodiment of the present invention described above as an advantage resulting from the set RTP encrypting information. Note that although how the client apparatus 3*a*-3 is manipulated and operated is not explained above, the client apparatus 3*a*-3 can obtain the same advantage as that when the client apparatuses 3*a*-1, 3*a*-2 are used.

Note that, in the present invention, it is also possible for a client apparatus to display an encrypting state, to display that an RTP encrypting communication is being carried out while the RTP encrypting communication is being carried out, or to display an alarm that warns that an RTP communication without encrypting is being carried out while the RTP communication without encrypting is being carried out.

Further, in the present invention, when a server apparatus determines an RTP communication without encrypting at the beginning of an RTP communication and instructs a client apparatus to carry out the RTP communication without encrypting, a display for requesting permission for beginning the RTP communication without encrypting may be made to the client apparatus, and when permission for beginning the RTP communication is input from the outside, the server apparatus may be notified of the permission for beginning the RTP communication. In contrast, when all the client apparatuses, which are in an RTP connection in response to received permission for beginning the RTP communication, are permitted to carry out the RTP communication, the server apparatus may cause all the client apparatuses to begin the RTP communication, and when any of the client apparatuses, which are in RTP connection, is not permitted to carry out the RTP communication, the client apparatus may cause the client apparatus to fail an RTP call connection so that it cannot carry out the RTP communication.

Further, in the present invention, when the client apparatus simultaneously carries out an RTP communication to a plurality of RTP communication confronting apparatuses, a different type of RTP encrypting information may be set to each of the RTP communication confronting apparatuses. Note that the RTP encrypting information and the SIP message encrypting information, which are set to the client apparatuses and the server apparatus, may be set and changed at an independent timing.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A client-server type distributed system corresponding to the SIP (Session Initiation Protocol) connected to the Internet/intranet/LAN (Local Area Network), wherein when authentication between SIP-protocol-coping client apparatuses and an SIP-protocol-coping server apparatus is completed, and an RTP (Real-time Transport Protocol) connection between the client apparatuses is an SIP call connection through the server apparatus, the server apparatus comprises:
means for setting two or more types of RTP encrypting information used in an RTP packet transmission/reception to one unit of the client apparatuses, setting at least one type of RTP encrypting information used in an RTP packet/transmission/receipt to an other unit of the client apparatuses, and managing the RTP encrypting information as the encrypting capability information of the client apparatuses;
means for determining one type of RTP encrypting information used between the client apparatuses each time an RTP communication occurs between the client apparatuses; and
means for notifying the client apparatuses of the RTP encrypting information, and
each of the client apparatuses comprises:
means for receiving and setting RTP encrypting information used in an RTP packet transmission/reception to other client apparatus; and
a function for encrypting an RTP packet and transmitting the RTP packet to confronting client apparatuses in the P2P (Peer-to-Peer) between the client apparatuses in the RTP communication according to the RTP encrypting information received from the server apparatus as well as for receiving the encrypted RTP packet from the confronting client apparatuses and decrypting the encrypted RTP.

2. A client-server type distributed system according to claim 1 in the RTP communication encrypting system between the client apparatuses, wherein:
the RTP encrypting information includes at least the presence or absence of encrypting and the encrypting rule of an RTP packet that can be input from the outside and the encrypting key of an RTP packet that cannot be input from the outside; and
the encrypting capability information includes at least the presence or absence of the RTP packet that can be input from the outside and an encrypting rule list having the priority order information of at least the presence or absence of encrypting and a plurality of encrypting rules that can be used in the RTP communication.

3. A client-server type distributed system according to claim 1 in the RTP communication encrypting system between the client apparatuses, wherein,
each of the client apparatuses comprises:
means for managing the presence or absence of encrypting and the priority order of the encrypting rules used in the RTP communication as RTP encrypting capability information; and
means for previously notifying the server apparatus of the RTP encrypting capability information of the client apparatus, and
the server apparatus comprises:
a function for comparing the RTP encrypting capability information received from the client apparatus with the RTP encrypting information held by the server apparatus and editing the RTP encrypting capability information; and
a function for selecting the presence or absence of encrypting of an RTP packet and an encrypting rule to be used to encrypting from the RTP encrypting capability information of each of the confronting client apparatuses when an RTP call connection is carried out, determining the RTP encrypting information by creating encrypting key at random, and notifying the client apparatus of the determined RTP encrypting information.

4. A client-server type distributed system according to claim 1, wherein when the transmission/reception of an SIP message between the server apparatus and the client apparatuses in the RTP communication encrypting system between the client apparatuses can be carried out as a bi-directional communication by encrypting the SIP message according to the SIP message encrypting information set to both the server apparatus and the client apparatuses,
the server apparatus comprises a function for encrypting at least the encrypting keys of the RTP encrypting information in call control SIP message data including the RTP encrypting information to be notified to the client apparatuses, and
each of the client apparatuses comprises means for reading out and decrypting the RTP encrypting information that is encrypted from the SIP message received from the server apparatus and setting the decrypted RTP encrypting information.

5. A client-server type distributed system according to claim 1 in the RTP communication encrypting system between the client apparatuses, wherein,
the SIP message encrypting information includes at least the encrypting rule and the encrypting keys; and
the RTP encrypting information set to the client apparatuses and the server apparatus is set independently of the SIP message encrypting information.

6. A client-server type distributed system according to claim 1 in the RTP communication encrypting system between the client apparatuses, wherein,
the RTP encrypting information from the server apparatus to the client apparatuses can be set to each call.

7. A client-server type distributed system according to claim 1 in the RTP communication encrypting system between the client apparatuses, wherein,
the RTP encrypting information from the server apparatus to the client apparatuses can be set and changed at a predetermined cycle.

8. A client-server type distributed system according to claim 1 in the RTP communication encrypting system between the client apparatuses, wherein,
the RTP encrypting information from the server apparatus to the client apparatuses can be set and changed at an arbitrary timing by any of an input from a maintenance console connected to any of the server apparatus and the client apparatuses and an input made by manipulating the external interface buttons of the client apparatuses.

9. A client-server type distributed system according to claim 1 in the RTP communication encrypting system between the client apparatuses, wherein,
the server apparatus comprises means for inputting and setting the presence or absence of encrypting and the priority order of the encrypting rules to be used for encrypting of each of the client apparatuses from the outside as RTP encrypting capability information.

10. A client-server type distributed system according to claim 1 in the RTP communication encrypting system between the client apparatuses, wherein,
each of the client apparatuses comprises:
means for displaying an encrypting rule that can be used for encrypting to the outside; and
means for inputting and setting the presence or absence of encrypting and the priority order of the encrypting rules used for encrypting from the outside as the RTP encrypting capability information.

11. A client-server type distributed system according to claim 1 in the RTP communication encrypting system between the client apparatuses, wherein,
each of the client apparatuses includes a plurality of encrypting rules that can be used by the client apparatuses.

12. A client-server type distributed system according to claim 1 in the RTP communication encrypting system between the client apparatuses, wherein,
the server apparatus comprises a function for selecting, when there are a plurality of encrypting rules that can be selected to determine the RTP encrypting information, the encrypting rules according to a priority order previously set to the server apparatus or at random.

13. A client-server type distributed system according to claim 1 in the RTP communication encrypting system between the client apparatuses, wherein,
the server apparatus comprises a function for causing, when a communication without RTP encrypting is selected between the client apparatuses as a result of determination of the RTP encrypting information, an RTP call connection to fail so that an RTP communication is not carried out between the client apparatuses.

14. A client-server type distributed system according to claim 13 in the RTP communication encrypting system between the client apparatuses, wherein,
the server apparatus comprises a function for setting, when the communication without RTP encrypting is selected between the client apparatuses as a result of determination of the RTP encrypting information, any of execution of the RTP communication without RTP encrypting and non-execution of the RTP communication resulting from that the RTP call connection is caused to fail to the server apparatus from the outside.

15. A client-server type distributed system according to claim 1 in the RTP communication encrypting system between the client apparatuses, wherein,
each of the client apparatuses comprises:
an encrypting state display function for displaying an encrypting state; and
a function for displaying that an RTP encrypting communication is being carried out while the RTP encrypting communication is being carried out.

16. A client-server type distributed system according to claim 1 in the RTP communication encrypting system between the client apparatuses, wherein,
each of the client apparatuses comprises:
an encrypting state display function for displaying an encrypting state; and
a function for displaying an alarm for warning that an RTP communication without encrypting is being carried out while the RTP communication without encrypting is being carried out.

17. A client-server type distributed system according to claim 15 in the RTP communication encrypting system between the client apparatuses, wherein,
each of the client apparatuses comprises a function for carrying out, when the server apparatus determines a communication without RTP encrypting and instructs the RTP communication without encrypting to the client apparatus at the start of an RTP communication, a display for requesting permission of start of the RTP communication without encrypting to the client apparatus; and
a function for inputting a permission of start of the RTP communication from the outside and notifying the server apparatus of the permission of start of the RTP communication, and
the server apparatus comprises a function for causing, when all the client apparatuses, which are in an RTP connection in response to a received permission for start of the RTP communication, are permitted to carry out the RTP communication, the server apparatus to start the RTP communication as well as, when any of the client apparatuses, which are in RTP connection, is not permitted to carry out the RTP communication, for causing the client apparatus to fail an RTP call connection so that the client apparatus does not carry out the RTP communication.

18. A client-server type distributed system according to claim 1 in the RTP communication encrypting system between the client apparatuses, wherein when the client apparatus simultaneously carries out an RTP communication to a plurality of RTP communication confronting apparatuses, a different type of RTP encrypting information can be set to each of the RTP communication confronting apparatuses.

19. A client-server type distributed system according to claim 1 in the RTP communication encrypting system between the client apparatuses, wherein the RTP encrypting information and the SIP message encrypting information, which are set to the client apparatuses and the server apparatus, can be set and changed at an independent timing.

20. A server apparatus according to claim 1.

21. An client apparatus according to claim 1.

22. An inter-client RTP (Real-time Transport Protocol) encrypting method used for a client-server type distributed system corresponding to the SIP (Session Initiation Protocol) connected to the Internet/intranet/LAN (Local Area Network), wherein when authentication between SIP-protocol-coping client apparatuses and an SIP-protocol-coping server apparatus is completed, and an RTP (Real-time Transport Protocol) connection between the client apparatuses is an SIP call connection through the server apparatus, the server apparatus carries out:
a processing for setting two or more types of RTP encrypting information used in an RTP packet transmission/reception to one unit of the client apparatuses, setting at least one type of RTP encrypting information used in an RTP packet transmission/reception to an other unit of the client apparatus, and managing said two or more types of RTP encrypting information as the encrypting capability information of the client apparatuses;
a processing for determining one type of RTP encrypting information used between the client apparatuses each time an RTP communication occurs between the client apparatuses; and
means for notifying the client apparatuses of the RTP encrypting information, and each of the client apparatuses carries out:
a processing for receiving and setting RTP encrypting information used in an RTP packet transmission/reception to other client apparatus; and
a processing for encrypting an RTP packet and transmitting the RTP packet to confronting client apparatuses in the P2P (Peer-to-Peer) between the client apparatuses in the RTP communication according to the RTP encrypting information received from the server apparatus as well as for receiving the encrypted RTP packet from the confronting client apparatuses and decrypting the encrypted RTP packet.

23. An inter-client RTP encrypting method according to claim 22 in the RTP communication encrypting system between the client apparatuses, wherein:
the RTP encrypting information includes at least the presence or absence of encrypting and the encrypting rule of an RTP packet that can be input from the outside and the encrypting key of an RTP packet that cannot be input from the outside; and
the encrypting capability information includes at least the presence or absence of the RTP packet that can be input from the outside and an encrypting rule list having the priority order information of at least the presence or absence of encrypting and a plurality of encrypting rules that can be used in the RTP communication.

24. An inter-client RTP encrypting method according to claim 22 in the RTP communication encrypting system between the client apparatuses, wherein,
each of the client apparatuses carries out:
a processing for managing the presence or absence of encrypting and the priority order of the encrypting rules used in the RTP communication as RTP encrypting capability information; and
a processing for previously notifying the server apparatus of the RTP encrypting capability information of the client apparatus, and
the server apparatus carries out:
a processing for comparing the RTP encrypting capability information received from the client apparatus with the RTP encrypting information held by the server apparatus and editing the RTP encrypting capability information; and
a processing for selecting the presence or absence of encrypting of an RTP packet and an encrypting rule to be used to encrypting from the RTP encrypting capability information of each of the confronting client apparatuses when an RTP call connection is carried out, determining the RTP encrypting information by creating encrypting key at random, and notifying the client apparatus of the determined RTP encrypting information.

25. An inter-client RTP encrypting method according to claim 22, wherein when the transmission/reception of an SIP message between the server apparatus and the client apparatuses in the RTP communication encrypting system between the client apparatuses can be carried out as a bi-directional communication by encrypting the SIP message according to the SIP message encrypting information set to both the server apparatus and the client apparatuses,
the server apparatus carries out a processing for encrypting at least the encrypting keys of the RTP encrypting information in call control SIP message data including the RTP encrypting information to be notified to the client apparatuses, and
each of the client apparatuses carries out a processing for reading out and decrypting the RTP encrypting information that is encrypted from the SIP message received from the server apparatus and setting the decrypted RTP encrypting information.

26. An inter-client RTP encrypting method according to claim 22 in the RTP communication encrypting system between the client apparatuses, wherein,
the SIP message encrypting information includes at least the encrypting rule and the encrypting keys; and
the RTP encrypting information set to the client apparatuses and the server apparatus is set independently of the SIP message encrypting information.

27. An inter-client RTP encrypting method according to claim 22 in the RTP communication encrypting system between the client apparatuses, wherein,
the RTP encrypting information from the server apparatus to the client apparatuses can be set to each call.

28. An inter-client RTP encrypting method according to claim 22 in the RTP communication encrypting system between the client apparatuses, wherein,
the RTP encrypting information from the server apparatus to the client apparatuses can be set and changed at a predetermined cycle.

29. An inter-client RTP encrypting method according to claim 22 in the RTP communication encrypting system between the client apparatuses, wherein,
the RTP encrypting information from the server apparatus to the client apparatuses can be set and changed at an arbitrary timing by any of an input from a maintenance console connected to any of the server apparatus and the client apparatuses and an input made by manipulating the external interface buttons of the client apparatuses.

30. An inter-client RTP encrypting method according to claim 22 in the RTP communication encrypting system between the client apparatuses, wherein,
the server apparatus carries out a processing for inputting and setting the presence or absence of encrypting and the priority order of the encrypting rules to be used for encrypting of each of the client apparatuses from the outside as RTP encrypting capability information.

31. An inter-client RTP encrypting method according to claim 22 in the RTP communication encrypting system between the client apparatuses, wherein,
each of the client apparatuses carries out:
a processing for displaying an encrypting rule that can be used for encrypting to the outside; and
a processing for inputting and setting the presence or absence of encrypting and the priority order of the encrypting rules used for encrypting from the outside as the RTP encrypting capability information.

32. An inter-client RTP encrypting method according to claim 22 in the RTP communication encrypting system between the client apparatuses, wherein,
  each of the client apparatuses includes a plurality of encrypting rules that can be used by the client apparatus.

33. An inter-client RTP encrypting method according to claim 22 in the RTP communication encrypting system between the client apparatuses, wherein,
  the server apparatus carries out a processing for selecting, when there are a plurality of encrypting rules that can be selected to determine the RTP encrypting information, the encrypting rules according to a priority order previously set to the server apparatus or at random.

34. An inter-client RTP encrypting method according to claim 22 in the RTP communication encrypting system between the client apparatuses, wherein,
  the server apparatus carries out a processing for causing, when a communication without RTP encrypting is selected between the client apparatuses as a result of determination of the RTP encrypting information, an RTP call connection to fail so that an RTP communication is not carried out between the client apparatuses.

35. An inter-client RTP encrypting method according to claim 34 in the RTP communication encrypting system between the client apparatuses, wherein,
  the server apparatus carries out a processing for setting, when the communication without RTP encrypting is selected between the client apparatuses as a result of determination of the RTP encrypting information, any of execution of the RTP communication without RTP encrypting and non-execution of the RTP communication resulting from that the RTP call connection is caused to fail to the server apparatus from the outside.

36. An inter-client RTP encrypting method according to claim 22 in the RTP communication encrypting system between the client apparatuses, wherein,
  each of the client apparatuses carries out:
  an encrypting state display processing for displaying an encrypting state; and
  a processing for displaying that an RTP encrypting communication is being carried out while the RTP encrypting communication is being carried out.

37. An inter-client RTP encrypting method according to claim 22 in the RTP communication encrypting system between the client apparatuses, wherein,
  each of the client apparatuses carries out:
  an encrypting state display processing for displaying an encrypting state; and
  a processing for displaying an alarm for warning that an RTP communication without encrypting is being carried out while the RTP communication without encrypting is being carried out.

38. An inter-client RTP encrypting method according to claim 36 in the RTP communication encrypting system between the client apparatuses, wherein,
  each of the client apparatuses carries out a display processing, when the server apparatus determines a communication without RTP encrypting and instructs the RTP communication without encrypting to the client apparatus at the start of an RTP communication, to request permission of start of the RTP communication without encrypting to the client apparatus; and
  a processing for inputting a permission of start of the RTP communication from the outside and notifying the server apparatus of the permission of start of the RTP communication, and
  the server apparatus carries out a processing for causing, when all the client apparatuses, which are in an RTP connection in response to a received permission for start of the RTP communication, are permitted to carry out the RTP communication, the server apparatus to start the RTP communication as well as, when any of the client apparatuses, which are in RTP connection, is not permitted to carry out the RTP communication, for causing the client apparatus to fail an RTP call connection so that the client apparatus does not carry out the RTP communication.

39. An inter-client RTP encrypting method according to claim 22 in the RTP communication encrypting system between the client apparatuses, wherein when the client apparatus simultaneously carries out an RTP communication to a plurality of RTP communication confronting apparatuses, a different type of RTP encrypting information can be set to each of the RTP communication confronting apparatuses.

40. An inter-client RTP encrypting method according to any one of claim 22 in the RTP communication encrypting system between the client apparatuses, wherein the RTP encrypting information and the SIP message encrypting information, which are set to the client apparatuses and the server apparatus, can be set and changed at an independent timing.

41. A computer program product carried out by an SIP-protocol-coping server apparatus (Session Initiation Protocol) in a client-server type distributed system corresponding to the SIP connected to The Internet/intranet/LAN (Local Area Network), wherein when authentication between SIP-protocol-coping client apparatuses and the SIP-protocol-coping server apparatus is completed, and an RTP (Real-time Transport Protocol) connection between the client apparatuses is an SIP call connection through the server apparatus, wherein the computer program product causes a central processing unit of the server apparatus to carry out:
  a processing for setting two or more types of RTP encrypting information used in an RTP packet transmission/reception to one unit of the client apparatuses, setting at least one type of RTP encrypting information used in an RTP packet/transmission/receipt to an other unit of the client apparatuses, and managing the client apparatus as the encrypting capability information of the client apparatuses;
  a processing for determining one type of RTP encrypting information used between the client apparatuses each time an RTP communication occurs between the client apparatuses; and
  a processing for notifying the client apparatuses of the RTP encrypting information.

42. A computer program product carried out by SIP-protocol-coping client apparatuses (Session Initiation Protocol) in a client-server type distributed system corresponding to the SIP connected to the Internet/intranet/LAN (Local Area Network), wherein when authentication between the SIP-protocol-coping client apparatuses and an SIP-protocol-coping server apparatus is completed, and an RTP (Real-time Transport Protocol) connection between the client apparatuses is an SIP call connection through the server apparatus, wherein the computer program product causes a central processing unit of each of the client apparatuses to carry out
  a processing for receiving and setting RTP encrypting information used in an RTP packet transmission/reception to other client apparatus, said encrypting information being selected from among two or more types of RTP encrypting information by the server apparatus; and a processing for encrypting an RTP packet and transmitting the RTP packet to confronting client apparatuses in the P2P (Peer-to-Peer) between the client apparatuses in the RTP communication according to the RTP encrypting information received from the server apparatus as well as for receiving the encrypted RTP packet from the confronting client apparatuses and decrypting the encrypted RTP packet.

* * * * *